US010798188B2

(12) United States Patent
Shin et al.

(10) Patent No.: US 10,798,188 B2
(45) Date of Patent: Oct. 6, 2020

(54) ELECTRONIC DEVICE AND METHOD FOR PROCESSING INFORMATION ASSOCIATED WITH DRIVING

(71) Applicant: SAMSUNG ELECTRONICS CO., LTD., Suwon-si, Gyeonggi-do (KR)

(72) Inventors: Hyunseok Shin, Seongnam-si (KR); Tae-Seon Kim, Suwon-si (KR); Seung-Nyun Kim, Incheon (KR); Yong Sang Yun, Osan-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 109 days.

(21) Appl. No.: 16/011,766

(22) Filed: Jun. 19, 2018

(65) Prior Publication Data

US 2019/0052714 A1 Feb. 14, 2019

(30) Foreign Application Priority Data

Aug. 8, 2017 (KR) ........................ 10-2017-0100336

(51) Int. Cl.
H04L 29/08 (2006.01)
H04W 12/00 (2009.01)
(Continued)

(52) U.S. Cl.
CPC .......... *H04L 67/16* (2013.01); *H04L 67/1095* (2013.01); *H04L 67/125* (2013.01);
(Continued)

(58) Field of Classification Search
CPC ... H04L 67/16; H04L 67/125; H04L 67/1095; H04W 4/48; H04W 8/14;
(Continued)

(56) References Cited

U.S. PATENT DOCUMENTS 10,212,274 B2 * 2/2019 Alghoniem ............. H04W 4/40
10,298,741 B2 * 5/2019 Goren ............... H04M 1/72569
(Continued)

FOREIGN PATENT DOCUMENTS

KR 10-2013-0033121 4/2013
KR 10-2013-0128347 11/2013
(Continued)

OTHER PUBLICATIONS

Search Report dated Sep. 28, 2018 in counterpart International Patent Application No. PCT/KR2018/007643.
(Continued)

*Primary Examiner* — Brandon J Miller
(74) *Attorney, Agent, or Firm* — Nixon & Vanderhye P.C.

(57) ABSTRACT

An electronic device according to various embodiments may include: a communication module comprising communication circuitry; and a processor configured to receive, from an external electronic device functionally connected with the electronic device, a request associated with transferring a portion of one or more rights capable of controlling the electronic device, using the communication module; transfer the portion of the one or more rights to the external electronic device, based at least on the request if the electronic device is performing a function associated with driving; and restrict transferring the portion of the one or more rights to the external electronic device, based at least on the request if the electronic device is performing a function not associated with the driving.

20 Claims, 33 Drawing Sheets

(51) Int. Cl.
*H04W 12/06* (2009.01)
*H04W 8/14* (2009.01)
*H04W 4/48* (2018.01)
*H04W 76/14* (2018.01)
*H04W 4/40* (2018.01)
*H04W 4/02* (2018.01)
*G01C 21/36* (2006.01)

(52) U.S. Cl.
CPC ............ *H04W 4/027* (2013.01); *H04W 4/40* (2018.02); *H04W 4/48* (2018.02); *H04W 8/14* (2013.01); *H04W 12/00508* (2019.01); *H04W 12/06* (2013.01); *H04W 76/14* (2018.02); *G01C 21/3688* (2013.01)

(58) Field of Classification Search
CPC . H04W 12/00508; H04W 4/027; H04W 4/40; H04W 76/14; G01C 21/3688; G01C 21/3664
See application file for complete search history.

(56) References Cited

U.S. PATENT DOCUMENTS

| | | | |
|---|---|---|---|
| 2007/0067635 A1 | 3/2007 | Kiessling et al. | |
| 2012/0289215 A1 | 11/2012 | Elliott et al. | |
| 2013/0078964 A1 | 3/2013 | Jin et al. | |
| 2013/0226401 A1 | 8/2013 | Wang et al. | |
| 2013/0332007 A1 | 11/2013 | Kiukkonen et al. | |
| 2013/0309971 A1 | 12/2013 | Louboutin | |
| 2014/0111138 A1 | 4/2014 | Heckford et al. | |
| 2015/0373479 A1* | 12/2015 | Xia ........................ | B60K 35/00 455/420 |
| 2016/0183069 A1* | 6/2016 | Wilson .................... | H04W 4/14 455/466 |
| 2016/0268833 A1 | 9/2016 | Lee et al. | |
| 2017/0034858 A1 | 2/2017 | Yae et al. | |
| 2017/0054842 A1 | 2/2017 | Choi | |
| 2017/0155720 A1 | 6/2017 | Song et al. | |

FOREIGN PATENT DOCUMENTS

| | | |
|---|---|---|
| KR | 10-2017-0012922 | 2/2017 |
| KR | 10-2017-0022752 | 3/2017 |
| KR | 10-2017-0061489 | 6/2017 |
| WO | 2012/077965 | 6/2012 |

OTHER PUBLICATIONS

Written Opinion dated Sep. 28, 2018 in counterpart International Patent Application No. PCT/KR2018/007643.

* cited by examiner

ELECTRONIC DEVICE AND METHOD FOR PROCESSING INFORMATION ASSOCIATED WITH DRIVING

CROSS-REFERENCE TO RELATED APPLICATION

This application is based on and claims priority under 35 U.S.C. § 119 to Korean Patent Application No. 10-2017-0100336, filed on Aug. 8, 2017, in the Korean Intellectual Property Office, the disclosure of which is incorporated by reference herein in its entirety.

BACKGROUND

1) Field

The disclosure relates to an electronic device and a method of processing information associated with driving.

2) Description of Related Art

For the convenience of a driver or a passenger, the use of an electronic device having mobility, such as a smart phone, a tablet, a personal computer (PC), or the like, in a vehicle has increased. The electronic device may have a function of collecting information associated with the vehicle or driving, a function of displaying a screen, a function of communicating with another electronic device, or the like.

Handling an electronic device while a driver drives a vehicle may be a factor in the increasing occurrence of accidents. There is a desire for a solution that enables the driver to minimally handle the electronic device while driving.

SUMMARY

Various embodiments may provide an electronic device and a method of processing information associated with driving to authorize another electronic device to handle the function of the electronic device which needs to be handled during driving.

The technical subjects pursued in the present disclosure may not be limited to the above mentioned technical subjects, and other technical subjects which are not mentioned may be clearly understood, through the following descriptions, by those skilled in the art of the present disclosure.

An electronic device according to various embodiments may include a communication module comprising communication circuitry and a processor, wherein the processor is configured to: receive, from an external electronic device operably coupled to the electronic device, via the communication module, a request associated with transferring a portion of the right to control the electronic device; if the electronic device is performing a function associated with driving, transfer the portion of the right to the external electronic device, based at least on the request; and if the electronic device is performing a function not associated with the driving, restrict transferring the portion of the right to the external electronic device, based at least on the request.

An electronic device according to various embodiments may include a communication module comprising communication circuitry and a processor, wherein the processor is configured to: receive, from a first external electronic device functionally connected to the electronic device, a request associated with the transfer of a portion of the right to control the electronic device by the electronic device to a second external electronic device functionally connected to the first external electronic device; transfer, if the electronic device is performing a function associated with driving, the portion of the right to the second external electronic device, based at least on the request; and restrict transferring, if the electronic device is performing a function not associated with driving, the portion of the right to the second external electronic device, based at least on the request.

The electronic device according to various embodiments may include a memory for storing instructions, a communication interface comprising communication interface circuitry, a display, and one or more processors that are operably coupled to the communication interface, the memory, and the display, wherein the one or more processors are configured to execute instructions stored in the memory to: determine whether the state of the electronic device is associated with driving, based at least in part on a first signal generated, transmitted, or received by the electronic device; in response to the determination, transmit a request signal for authentication and display first information associated with an application for driving via the display; receive, from another electronic device, a response signal for authentication including identification information of the other electronic device, while displaying the first information; in response to the reception of the response signal, display second information associated with the application via the display; establish a connection between the other electronic device and the electronic device, based at least in part on the identification information of the other electronic device; and transmit, to the other electronic device via the connection, a second signal for controlling at least one function provided via the second information in the other electronic device.

An electronic device according to various embodiments may include a memory for storing instructions, a communication interface comprising communication interface circuitry, a display, and one or more processors operably coupled to the communication interface, the memory, and the display, wherein the one or more processors are configured to execute instructions stored in the memory to: receive a request signal for authentication transmitted from another electronic device in response to determination that the state of the other electronic device is associated with driving; transmit, to the other electronic device, a response signal for authentication including identification information of the electronic device; establish a connection between the electronic device and the other electronic device, based at least in part on the identification information of the electronic device; receive, from the other electronic device via the connection, a signal for enabling the electronic device to control at least one function interoperating with first information associated with an application for driving, which is displayed in the other electronic device; in response to the reception of the signal for controlling the at least one function, displaying second information corresponding to the first information; in response to the detection of at least one input on the second information, transmit the information associated with the at least one input to the other electronic device, based at least in part on the signal for controlling the at least one function, to display third information changed (different) from the first information in the other electronic device, and display fourth information which is changed (different) from the second information and corresponds to the third information.

A method of operating an electronic device according to various embodiments may include: receiving a request associated with the transfer of a portion of the right to control the electronic device from an external electronic device operably coupled to the electronic device; transferring the portion of the right to the external electronic device, based at least on the request, when the electronic device performs a function associated with driving; and restricting the transfer of the portion of the right to the external electronic device, based at least on the request, when the electronic device performs a function not associated with driving.

A method of an operating electronic device according to various embodiments may include: receiving, from a first external electronic device operably coupled to the electronic device, a request associated with the transfer of a portion of the right to control the electronic device by the electronic device to a second external electronic device operably coupled to the first external electronic device; transferring, if the electronic device performs a function associated with driving, the portion of the right to the second external electronic device, based at least on the request; and restricting transferring, if the electronic device perform a function not associated with driving, the portion of the right to the second external electronic device, based at least on the request.

A method of operating an electronic device according to various embodiments may include: determining whether the state of the electronic device is associated with driving, based at least in part on a first signal that is generated, transmitted or received by the electronic device; transmitting a request signal for authentication and displaying first information associated with an application for driving, in response to the determination; receiving, from another electronic device, a response signal for authentication including identification information of the other electronic device while displaying the first information; displaying second information associated with the application and establishing a connection between the other electronic device and the electronic device, based at least in part on the identification information of the other electronic device, in response to the reception; and transmitting, to the other electronic device via the connection, a second signal for controlling at least one function provided via the second information in the other electronic device.

A method of operating an electronic device according to various embodiments may include: receiving a request signal for authentication transmitted from another electronic device in response to determination that the state of the other electronic device is associated with driving; transmitting, to the other electronic device, a response signal for authentication including identification information of the electronic device; establishing a connection between the electronic device and the other electronic device, based at least in part on the identification information of the electronic device; receiving, from the other electronic device via the connection, a signal for enabling the electronic device to control at least one function interoperating with first information associated with an application for driving, which is displayed in the other electronic device; in response to the reception of the signal for controlling the at least one function, displaying second information corresponding to the first information; in response to the detection of at least one input on the second information, transmitting the information associated with the at least one input to the other electronic device, based at least in part on the signal for controlling the at least one function, so as to display third information changed (different) from the first information in the other electronic device, and displaying fourth information which is changed (different) from the second information and corresponds to the third information.

An electronic device according to various embodiments and a method thereof may authorize another electronic device to perform a portion of the functions of the electronic device, thereby providing greater safety.

Effects which can be acquired by the present disclosure are not limited to the above described effects, and other effects that have not been mentioned may be clearly understood by those skilled in the art from the following description.

BRIEF DESCRIPTION OF THE DRAWINGS

The above and other aspects, features, and advantages of certain embodiments of the present disclosure will be more apparent from the following description, taken in conjunction with the accompanying drawings, in which.

DETAILED DESCRIPTION

Figure 1:
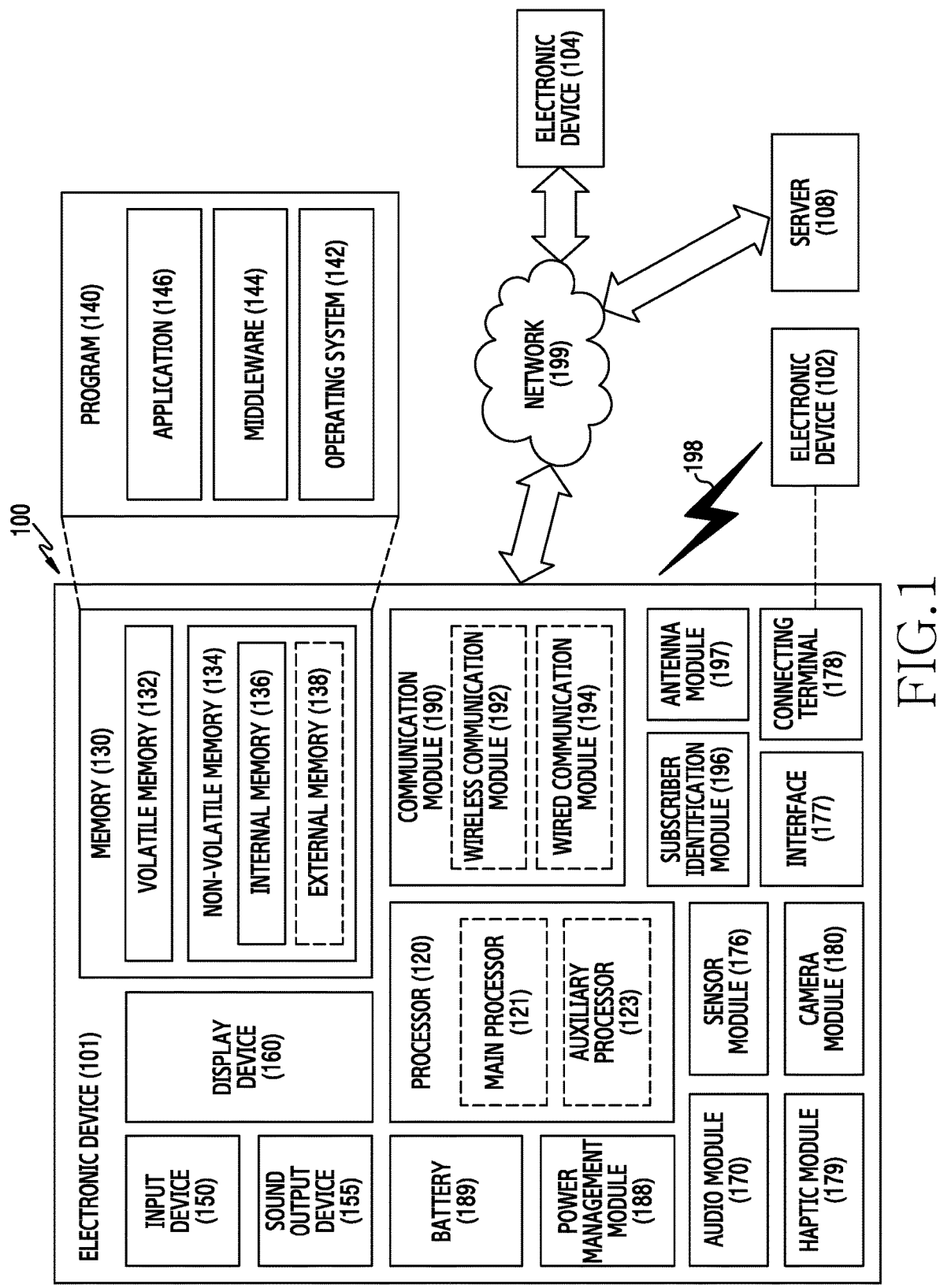
FIG. 1 is a block diagram illustrating an electronic device in a network environment for processing information associated with driving according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor (e.g., including processing circuitry) 120, memory 130, an input device (e.g., including input circuitry) 150, a sound output device (e.g., including sound output circuitry) 155, a display device 160, an audio module (e.g., including audio circuitry) 170, a sensor module 176, an interface (e.g., including interface circuitry) 177, a haptic module (e.g., including haptic circuitry) 179, a camera module 180, a power management module 188, a battery 189, a communication module (e.g., including communication circuitry) 190, a subscriber identification module (SIM) 196, and/or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may include various processing circuitry and execute, for example, software (e.g., a program 140) to control at least one other component (e.g., a hardware or software component) of the electronic device 101 coupled with the processor 120, and may perform various data processing or computation. According to an example embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include various processing circuitry, such as, for example, and without limitation, a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)), or the like, that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may include various processing circuitry and control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, and/or an application 146.

The input device 150 may receive a command or data to be used by other component (e.g., the processor 120) of the electronic device 101, from the outside (e.g., a user) of the electronic device 101. The input device 150 may include various input circuitry, such as, for example, and without limitation, a microphone, a mouse, and/or a keyboard, or the like.

The sound output device 155 may output sound signals to the outside of the electronic device 101. The sound output device 155 may include various sound output circuitry, such as, for example, and without limitation, a speaker and/or a receiver, or the like. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, and without limitation, a display, a hologram device, and/or a projector, or the like, and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may include various audio circuitry and convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., via a wire) or wirelessly coupled with the electronic device 101.

The sensor module 176 may include various sensors and detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include various sensors, such as, for example, and without limitation, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, and/or an illuminance sensor, or the like.

The interface 177 may support one or more specified protocols to be used for the electronic device 101 to be coupled with the external electronic device (e.g., the electronic device 102) directly (e.g., via a wire) or wirelessly. According to an embodiment, the interface 177 may include various interface circuitry, such as, for example, and without limitation, a high definition multimedia interface (HDMI), a universal serial bus (USB) interface, a secure digital (SD) card interface, and/or an audio interface, or the like.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector), The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include various haptic circuitry, such as, for example, and without limitation, a motor, a piezoelectric element, and/or an electric stimulator, or the like.

The camera module 180 may capture a still image or moving images. According to an embodiment, the camera module 180 may include one or more lenses, image sensors, image signal processors, or flashes.

The power management module 188 may manage power supplied to the electronic device 101. According to an example embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may include various communication circuitry and support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include various modules including various communication circuitry, such as, for example, and without limitation, a wireless communication module 192 (e.g., a cellular communication module, a short-range wireless communication module, or a global navigation satellite system (GNSS) communication module) and/or a wired communication module 194 (e.g., a local area network (LAN) communication module and/or a power line communication (PLC) module), or the like. A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smart phone), a computer device, a portable multimedia device, a portable medical device, a camera, a wearable device, and/or a home appliance, or the like, but is not limited thereto. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements.

It should be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order).

It should be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., via a wire), wirelessly, or via a third element.

As used herein, the term "module" may include a unit implemented in hardware, software, and/or firmware, or any combinations thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an example embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
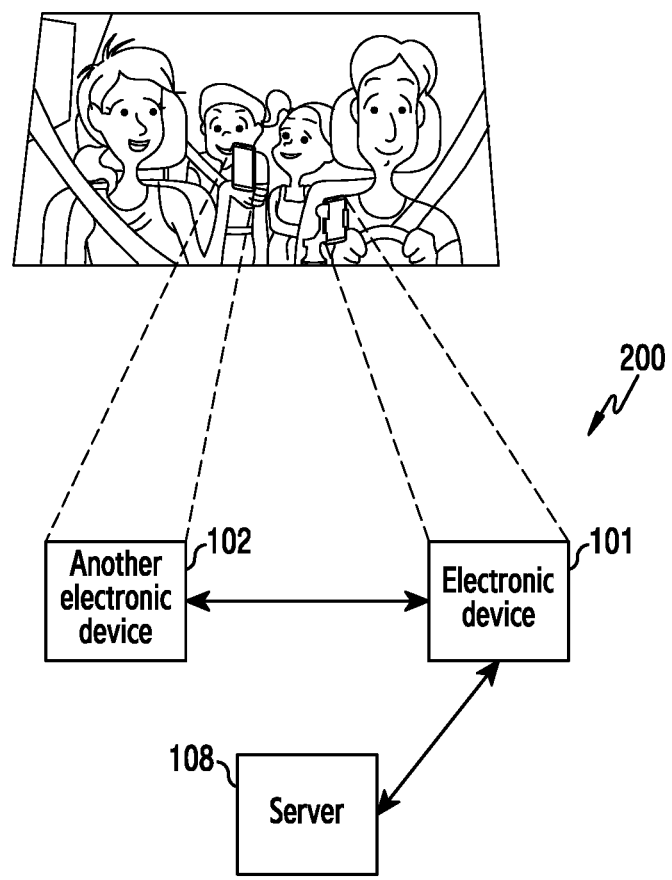
FIG. 2 is a diagram illustrating an example of a network environment including an electronic device according to various embodiments.

FIG. 2 is a block diagram illustrating an example of a network environment including an electronic device according to various embodiments. The network environment may include the electronic device 101, the electronic device 102, the server 108, and the like of FIG. 1.

Referring to FIG. 2, a network environment 200 may include the electronic device 101, another electronic device 102, and the server 108.

The electronic device 101 may be located within a vehicle. The electronic device 101 may be related to a driver. The electronic device 101 may be located within a vehicle so as to provide information to a driver who is driving the vehicle, or the like. For example, the electronic device 101 may be located in proximity to the driver in the vehicle, so as to provide information to the driver.

According to various embodiments, the electronic device 101 may be a device that has mobility and is temporarily fixed to the vehicle. For example, the electronic device 101 may, without limitation, be a smart phone, a tablet, a personal computer (PC), a laptop computer, or the like, which are fixed to a vehicle via an embedded dock. As another example, the electronic device 101 may, without limitation, be a smart phone, a tablet PC, a laptop computer, or the like, which are fixed to a vehicle via an attachable dock.

According to various embodiments, the electronic device 101 may be a fixed device that is embedded in a vehicle. For example, the electronic device 101 may be a computing device that is inserted into a vehicle in the process of manufacturing the vehicle. As another example, the electronic device 101 may be a computing device that is inserted into a vehicle via tuning after the process of manufacturing the vehicle.

The electronic device 101 may provide various functions in a vehicle.

According to various embodiments, the electronic device 101 may communicate with another entity via a communication device (a communication interface, a communication module, a modem, or the like) included in the electronic device 101. For example, the electronic device 101 may transmit traffic related to a navigation service to another entity such as a server (e.g., the server 108 or the like), or may receive traffic related to a navigation service from another entity. As another example, the electronic device 101 may transmit traffic related to a music streaming service or a movie streaming service to another entity, or may receive traffic related to a music streaming service or a movie streaming service from another entity. As another example, the electronic device 101 may transmit traffic related to an outgoing call to another electronic device via another entity such as a base station or the like, or may receive traffic related to an incoming call received from another electronic device via another entity.

According to various embodiments, the electronic device 101 may provide various pieces of information via an output device included in the electronic device 101 or via an output device included in a device (e.g., a device embedded in a vehicle or a device attached to a vehicle) related to the electronic device. For example, the electronic device 101 may provide a navigation service, a music streaming service, a movie streaming service, a call service, or the like via a display or a speaker included in the electronic device 101. As another example, the electronic device 101 may provide a navigation service, a music streaming service, a movie streaming service, a call service, or the like via a display or a speaker of a device related to the electronic device 101.

According to various embodiments, the electronic device 101 may collect information associated with a vehicle or driving in the vehicle. For example, the electronic device 101 may obtain information associated with a vehicle or driving, using an inertial measurement unit (IMU) sensor of the electronic device 101 (e.g., a gyro sensor, an acceleration sensor, a GPS, or the like), or using an IMU sensor of a device related to the electronic device. Another electronic device 102 may be located within the vehicle.

The other electronic device 102 may be associated with a passenger. For example, the other electronic device 102 may, without limitation, be a smart phone, a tablet PC, a laptop computer, or the like, that a passenger may have or carry.

The other electronic device 102 may provide functions that are substantially the same or similar to those of the electronic device 101, in the vehicle.

The server 108 may be located outside the vehicle. According to various embodiments, the server 108 may be located outside the vehicle, and may be a device that is wirelessly or remotely connectable to the electronic device 101.

The server 108 may provide a service to an electronic device (e.g., the electronic device 101) located in the vehicle. For example, the server 108 may receive traffic from the electronic device 101, or may transmit traffic to the electronic device 101, so as to provide a navigation service, a music streaming service, a movie streaming service, a call service, or the like to the electronic device 101 located in the vehicle.

The event in which a driver handles an electronic device while driving a vehicle may cause an accident. Mandatory handsfree service regulations or the like have been established (legislated) to prevent and/or reduce the likelihood of an accident. However, as the functions of the electronic device have been diversified, the regulations are not enough to guarantee the safety.

The electronic device 101 according to various embodiments may authorize the other electronic device 102 to perform the whole or a portion of the functions of the electronic device 101 via signaling between the electronic device 101 related to a driver and the other electronic device 102 related to a passenger, whereby the driver may be prevented from handling the electronic device 101 or may minimally handling the electronic device while driving.

Figure 3:
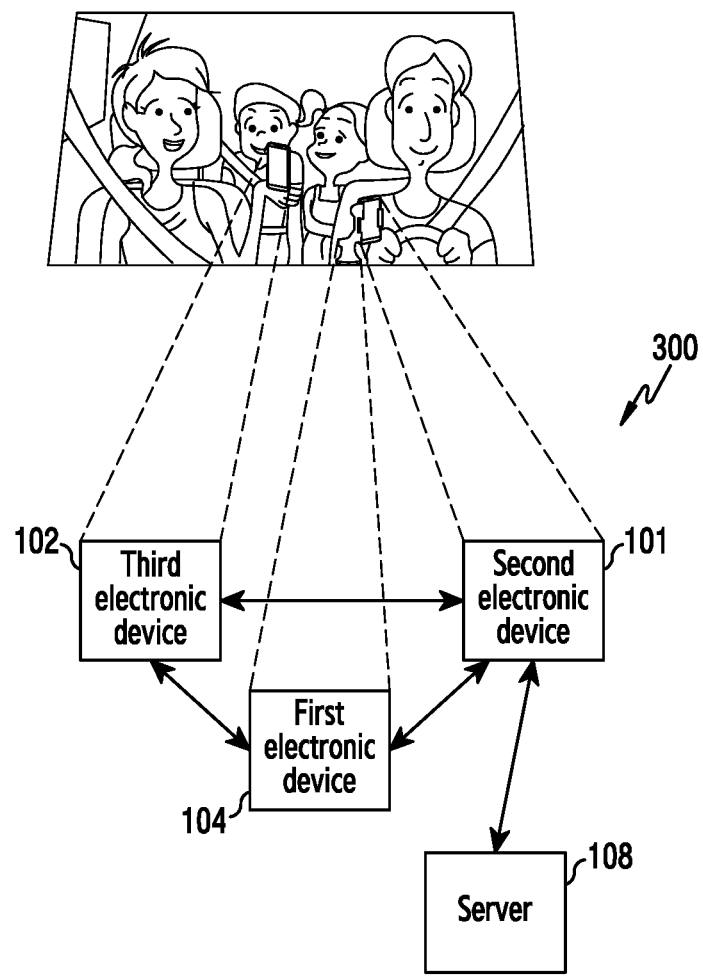
FIG. 3 is a diagram illustrating another example of a network environment including an electronic device according to various embodiments.

FIG. 3 is a block diagram illustrating another example of a network environment including an electronic device according to various embodiments. The network environment 300 may include the electronic device 101, the electronic device 102, the electronic device 104, the server 108, and the like of FIG. 1.

Referring to FIG. 3, a network environment 300 may include the first electronic device 104, the second electronic device 101, the third electronic device 102, and the server 108.

The first electronic device 104 may be located in a vehicle. The first electronic device 104 may be disposed in a location where the first electronic device 104 is allowed to provide information to a driver in the vehicle. According to various embodiments, the first electronic device 104 may be a device embedded in the vehicle. For example, the first electronic device 104 may be a dock embedded in the vehicle. According to various embodiments, the first electronic device 104 may be a device attachable to the internal surface of the vehicle. For example, the first electronic device 104 may be a dock attachable to the internal surface of the vehicle (e.g., the glass inside the vehicle, the board inside the vehicle, or the like).

The first electronic device 104 may provide a signal to an electronic device, such as the second electronic device 101 and the third electronic device 102, via a wireless path or a wired path.

According to various embodiments, the first electronic device 104 may be a wired or wireless charging device that transmits a signal to provide power to an electronic device, such as the second electronic device 101 and the third electronic device 102. When the second electronic device 101 or the third electronic device 102 is a device having mobility, the second electronic device 101 or the third electronic device 102 may be a device that needs to be provided with power for charging a battery. The first electronic device 104 may provide power to the second electronic device 101 or the third electronic device 102, via a signal.

According to various embodiments, the first electronic device 104 may be a beacon device for transmitting a signal, so as to provide a communication service or a location service to an electronic device, such as the second electronic device 101 and the third electronic device 102. For example, the first electronic device 104 may be a beacon device (or transmitter) that periodically transmits a beacon signal including identification information of the first electronic device (e.g., medium access control (MAC) identifier (ID), an address, or the like of the first electronic device 104).

The first electronic device 104 may be a device that is temporarily coupled (or connected) to the second electronic device 101. According to various embodiments, the first electronic device 104 may be a dock that holds the second electronic device 101, so as to fix the second electronic device 101 capable of providing information to a driver.

The first electronic device 104 may collect information associated with a vehicle or driving. According to various embodiments, the first electronic device 104 may obtain information associated with a vehicle or driving using an IMU sensor included in the first electronic device 104 or an IMU sensor in the vehicle electrically coupled to the first electronic device 104.

The first electronic device 104 may communicate with the second electronic device 101 or the third electronic device 102. According to various embodiments, when the first electronic device 104 provides power to the second electronic device 101, the first electronic device 104 may communicate with the second electronic device via a path via which a signal for providing power is transmitted or via another path distinct from the path. According to various embodiments, when the first electronic device 104 is a beacon device, the coverage of a beacon signal transmitted by the first electronic device 104 may be the whole or a portion of the inside of the vehicle. The first electronic device 104 may communicate with the second electronic device 101 or the third electronic device 102 located in the vehicle (e.g., located in the coverage) via a wireless path.

The second electronic device 101 may correspond to the electronic device 101 of FIG. 1, the third electronic device 102 may correspond to the other electronic device 102 of FIG. 1, and the server 108 may correspond to the server 108 of FIG. 1.

To prevent and/or avoid the accident, the second electronic device 101 according to various embodiments may authorize the third electronic device 102 to perform the whole or a portion of the functions of the second electronic device 101. According to various embodiments, the first electronic device 104 may use be used as a hub or a link for providing information associated with the second electronic device 101 to the third electronic device 102. For example, the first electronic device 104 may obtain identification information of the second electronic device 101 in the process of providing power to the second electronic device 101 held by the first electronic device 104, and may provide the obtained identification information of the second electronic device 101 to the wirelessly connected third electronic device 102, thereby operating as a hub or link that leads (guides or incents) the second electronic device 101 and the third electronic device 102 to have a connection for the authorization. As another example, the first electronic device 104 periodically transmits a beacon signal, thereby operating as a hub or link that leads the second electronic device 101 and the third electronic device 102 to notify a beacon server (not illustrated) that the second electronic device 101 and the third electronic device 102 are located in the same vehicle. Via the notification, the beacon server may lead the second electronic device 101 and the third electronic device 102 to have a connection for authorization.

Figure 4:
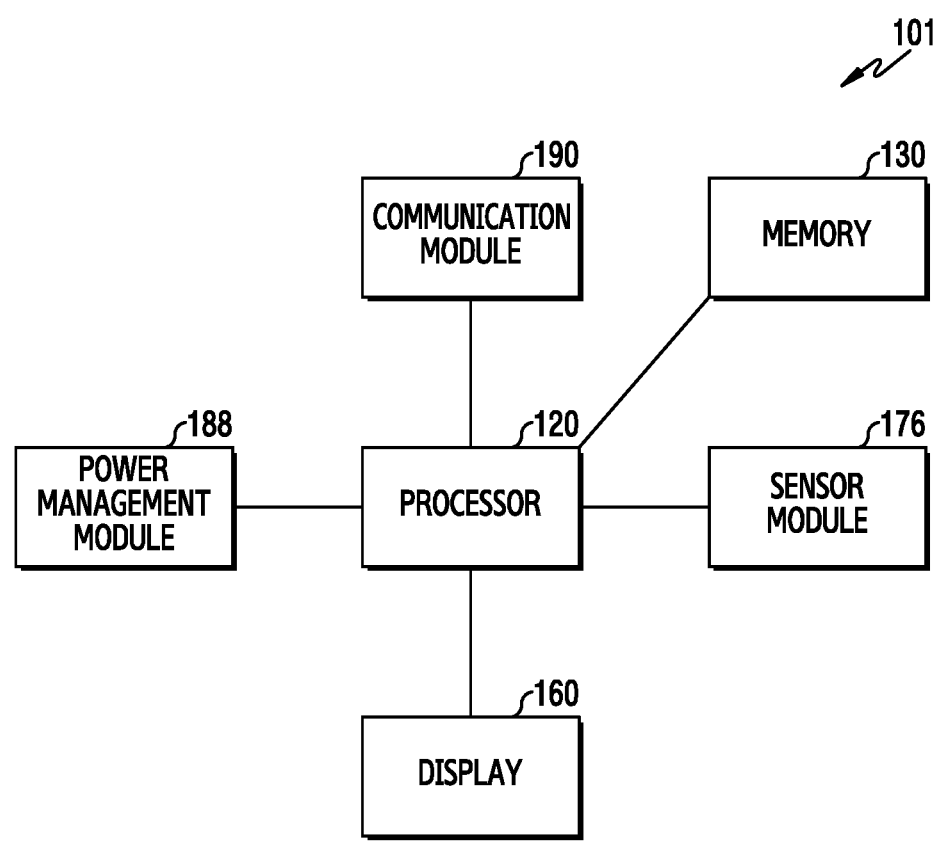
FIG. 4 is a block diagram illustrating an example of the functional configuration of an electronic device 101 according to various embodiments.

FIG. 4 is a block diagram illustrating an example of the functional configuration of the electronic device 101 according to various embodiments. The functional configuration may be included in the electronic device 101 of FIG. 1, the electronic device 101 of FIG. 2, or the second electronic device 101 of FIG. 3.

FIG. 4 illustrates an example of the functional configuration of the electronic device 101, and the functional configuration may be included in the electronic device 102 of FIG. 1, the other electronic device 102 of FIG. 2, the third electronic device 102 of FIG. 3, or the like.

Referring to FIG. 4, the electronic device 101 may include the processor (e.g., including processing circuitry) 120, the memory 130, the display 160, the sensor module 176, the power management module 188, and the communication module (e.g., including communication circuitry) 190.

The processor 120 may include various processing circuitry and control the overall operation of the electronic device 101. The processor 120 may be operably or operatively coupled (or connected) to one or more components of the electronic device 101 (e.g., the memory 130, the display 160, the sensor module 176, the power management module 188, the communication module 190, or the like), thereby controlling the overall operation of the electronic device 101. The processor 120 may execute a plurality of instructions which are stored in the memory 130 and are associated with one or more components of the electronic device 101, thereby controlling the overall operation of the electronic device 101.

The processor 120 may determine the state of the electronic device 101. According to various embodiments, the processor 120 may determine that the state of the electronic device 101 is associated with driving or a vehicle, based on a signal received via the power management module 188 or the communication module 190. For example, the processor 120 may determine that the state of the electronic device 101 is associated with driving or a vehicle, based on a signal for charging which is received via the power management module 188. The signal for charging may include an ID of a charging device, such as the first electronic device 104 of FIG. 3 located in the vehicle. The ID of the charging device may be modulated based on a modulation scheme, such as amplitude shift keying (ASK), frequency shift keying (FSK), phase shift keying (PSK), or the like, and may be included in the signal for charging. The processor 120 may demodulate the signal for charging in a manner corresponding to the modulation scheme, thereby obtaining identification information (e.g., identifier (ID)) of the charging device included in the signal for charging. The processor 120 may identify (determine) that the obtained identification information of the charging device is identification information of a device related to a vehicle, based on information stored in the memory 130 (e.g., reference information, registration information, designated information, or the like) or may identify the same via communication with the server, thereby determining that the state of the electronic device 101 is associated with driving or a vehicle. As another example, the processor 120 may determine that the state of the electronic device 101 is associated with driving or a vehicle, based on a beacon signal received via the communication module 190. The beacon signal may include identification information of a beacon device, such as the first electronic device 101 of FIG. 3 that is located in the vehicle, and has a coverage area having the size corresponding to the whole or a portion of the inside of the vehicle. The electronic device 101 may identity the same via information stored in the memory 130 or communication with the server, thereby determining that the beacon device is associated with driving or a vehicle.

According to various embodiments, the processor 120 may determine that the state of the electronic device 101 is associated with driving or a vehicle, based on a signal transmitted via the communication module 190. For example, when an application for vehicle management is stored in the memory 130 of the electronic device 101, the processor 120 may transmit a signal for vehicle management (e.g., a signal for unlocking a door lock of a vehicle, a signal for ignition of a vehicle, or the like) via the communication module 190. The processor 120 may identify that a path of the signal for vehicle management is associated with the application for vehicle management, or may identify the identification information of a vehicle included in the signal for vehicle management, thereby determining that the state of the electronic device 101 is associated with the vehicle.

According to various embodiments, the processor 120 may determine that the state of the electronic device 101 is associated with driving or a vehicle, based on a signal generated via the sensor module 176. For example, the processor 120 may determine information associated with the state of movement of the electronic device 101 (e.g., the movement velocity of an electronic device) from a signal obtained and generated via a sensor, such as a gyro sensor, an acceleration sensor, a GPS, or the like. In response to identifying that the state of movement of the electronic device 101 is a designated state (e.g., identifying that the movement velocity of the electronic device 101 is 15 m/s that is greater than or equal to a reference velocity of 10 m/s), the processor 120 may determine that the state of the electronic device is associated with driving.

The processor 120 may perform an authentication operation for authorization.

According to various embodiments, the processor 120 may transmit or broadcast a signal (e.g., a request signal for authentication) that requests authentication for authorization via the communication module 190. The authorization may indicate that the electronic device 101 located in a vehicle give the right to control the function of the electronic device 101 to the other electronic device 102 located in the vehicle. The authorization may be implemented by an operation of transmitting, to the other electronic device 102, a signal for controlling the function in the other electronic device 102. The authorization may correspond to an action of approving the other electronic device 102 of a user of the other electronic device 102 to indirectly use the electronic device 101, and thus, authentication may be required. A signal for requesting authentication may be transmitted or broadcasted to guide the other electronic device 102 to perform authentication. The request signal for authentication may be transmitted via various communication schemes. For example, the request signal for authentication may be transmitted via near field communication (NFC) or magnetic secure transmission (MST). As another example, the request signal for authentication may be transmitted via Bluetooth (BT) or Bluetooth low energy (BLE). As another example, the request signal for authentication may be transmitted via Wi-Fi direct or long term evolution (LTE) sidelink. The request signal for authentication may be broadcasted or transmitted during a designated period of time. The designated period of time may be used for inquiring whether to perform the authorization. For example, when the designated period of time is 30 seconds, the processor 120 may broadcast the request signal for authentication during 30 seconds, and may cease broadcasting the request signal for authentication after 30 seconds. In this instance, the processor 120 may operate irrespective of the authorization. As another example, when a response signal to the request signal for authentication is received before 30 seconds elapses, the processor 120 may identify that the authorization is to be performed. The request signal for authentication may include identification information of the electronic device 101. The identification information of the electronic device 101 included in the request signal for authentication may be used for a connection with the other electronic device 102. According to various embodiments, the processor 120 may receive, from at least one other electronic device, a response signal (e.g., a response signal for authentication) to the request for authentication for the authorization via the communication module 190. For example, when the request signal for authentication is transmitted via NFC or MST, the processor 120 may receive a response signal for authentication using the communication module 190 from the other electronic device 102 via NFC or MST. Tagging between the electronic device 101 and the other electronic device 102 may be required for receiving the response signal for authentication via the NFC or MST. NFC or MST may be communication schemes having a limited coverage. In the case of tagging, a user (e.g., a driver) of the electronic device 101 may recognize that a user (e.g., a passenger) of the other electronic device 102 performs tagging off line, whereby the authorization may be performed with security. As another example, when a request signal for authentication is transmitted via BT or BLE, the processor 120 may receive a response signal for authentication using the communication module 190 from the other electronic device 102 via BT or BLE. When the response signal for authentication is received with BT or BLE, the processor 120 may display, on the display 160, a message inquiring of a user of the electronic device 101 about whether to approve (or allow) the authentication (e.g., whether to delegate the right to control all or a portion of the functions of the electronic device to the other electronic device 102). The inquiry message requires acceptance from the user of the electronic device 101, whereby the authorization may be performed with security. As another example, when a request signal for authentication is transmitted via Wi-Fi direct or LTE sidelink, the processor 120 may receive a response signal for authentication using the communication module 190 from the other electronic device 102 via Wi-Fi direct or LTE sidelink. When the response signal for authentication is received via Wi-Fi direct or LTE sidelink, the processor 120 may display the inquiry message on the display 160. The inquiry message requires acceptance from the user of the electronic device 101, whereby the authorization may be performed with security. The response signal for authentication may include identification information of the other electronic device 102. The identification information of the other electronic device 102 included in the response signal for authentication may be used for a connection between the electronic device 101 and the other electronic device 102.

The processor 120 may generate a connection with another electronic device (e.g., the other electronic device 102).

According to various embodiments, the processor 120 may perform authentication for the authorization using the communication module 190, and may generate (or establish) a connection with the other electronic device 102 for the authorization. For example, generating the connection may be triggered by the processor 120. When the identification information of the other electronic device 102 is included in the response signal for authentication, the processor 120 may start an operation of generating the connection with the other electronic device 102 using the identification information. As another example, generating the connection may be triggered by a processor of the other electronic device 102. When the identification information of the electronic device 101 is included in the request signal for authentication, the processor of the other electronic device 102 may start an operation of generating a connection with the electronic device 101 using the identification information of the electronic device 101. Generating the connection may be performed differently depending on a communication scheme used for the connection. Generating the connection may be performed according to a procedure defined by the protocol of a corresponding communication scheme (e.g., the standard of a corresponding communication scheme). The communication scheme may be the same as, or different from, the communication scheme used for the request signal for authentication or the response signal for authentication. For example, the communication scheme used for the authentication may be MST or NFC, and the communication scheme used for the connection may be BT or BLE. As another example, the communication scheme used for the authentication may be BT, and the communication scheme used for the connection may be BT.

The processor 120 may transmit, using the communication module 190, an authorization message (or signal) for delegating the right to control at least a portion of the functions of the electronic device 101 to the other electronic device 102 via the connection with the other electronic device 102. According to various embodiments, the processor 120 may transmit a signal for controlling a portion of the functions provided by the electronic device 101 in the other electronic device 102 via the connection with the other electronic device 102.

According to various embodiments, the processor 120 may transmit an authorization signal (or message) to the other electronic device 102, so as to delegate, to the other electronic device 102, the right to control at least one function provided via information currently displayed on the display 160 of the electronic device 101. For example, when a user interface for a navigation service is displayed, the processor 120 may transmit an authorization signal to the other electronic device 102, so as to delegate the right to control the user interface (e.g., setting a destination, changing a route, or the like) to the other electronic device 102.

According to various embodiments, the processor 120 may transmit an authorization signal to the other electronic device 102, so as to delegate, to the other electronic device 102, the right to control an application (or a user interface of an application) that needs to be handled by a driver while the driver drives. For example, the processor 120 may transmit an authorization signal to the other electronic device 102, so as to delegate, to the other electronic device 102, the right to control a phone call application, the right to control a music service application, the right to control a movie service application, or the like, which are not currently displayed and need to be handled by a driver during driving.

The processor 120 may provide information associated with a signal received from a server (e.g., the server 108) or the like to the other electronic device 102 using the communication module 190. The processor 120 may receive a signal from an entity such as a server or the like. The processor 120 may identify whether the signal is associated with the authorization. When the signal is associated with the authorization, the processor 120 may transmit information associated with the signal to the other electronic device 102 so that the other electronic device 102 may process the information associated with the signal. For example, when the electronic device 101 delegates a part of the right to control a phone call application (the right to control a video call) to the other electronic device 102, the processor 120 may transmit, to the other electronic device 102, information associated with traffic associated with a video call received from an external electronic device.

The processor 120 may receive a signal associated with authorization from the other electronic device 102 using the communication module 190. The signal associated with authorization may change the state of the electronic device 101 in association with authorization. For example, when the electronic device 101 authorizes the other electronic device 102 to control a user interface of an application for a navigation service, the processor 120 may receive, from the other electronic device 102, a signal associated with authorization including information (e.g., setting a destination, changing a route, or the like) controlled by the other electronic device 102. The processor 120 may process the received signal associated with authorization, thereby providing the user interface of which the destination is set or the user interface of which a route is change without driver's direct input (e.g., touch input) on the user interface.

The processor 120 may release or terminate (or cease) the connection with the other electronic device 102 for the authorization, based on the change of the state of the electronic device 101. According to various embodiments, the processor 120 may monitor (or identify) whether the state of the electronic device 101 associated with driving or a vehicle is changed, based on a signal generated, transmitted, or received by the electronic device 101. For example, when a signal generated via the sensor module 176 of the electronic device 101 indicates that the movement velocity of the electronic device 101 is less than a reference velocity, the processor 120 may identify that the electronic device 101 is located outside a vehicle. The processor 120 may identify that the state of the electronic device 101 is not associated with a vehicle or driving (e.g., the state associated with a vehicle or driving is changed), based on the identification. In response to identifying that the state of the electronic device 101 is not associated with a vehicle or driving, the processor 120 may transmit a signal for terminating (or releasing) the authorization to the other electronic device 102. The processor 120 transmits the signal for terminating the authorization, and releases the connection with the other electronic device 102. As another example, when a signal for locking a door lock of a vehicle is transmitted from the electronic device 101, the processor 120 may identify that the state of the electronic device 101 associated with driving or the vehicle is changed, based on the transmission of the signal. The processor 120 may identify that the state of the electronic device 101 is not associated with the vehicle or driving, based on the identification. In response to identifying that the state of the electronic device 101 is not associated with the vehicle or driving, the processor 120 may transmit a signal for releasing the authorization to the other electronic device 102. The processor 120 transmits the signal for releasing the authorization, and releases the connection with the other electronic device 102.

The processor 120 may be changed to one of the various modes depending on the state of the electronic device 101. According to various embodiments, the processor 120 may change the mode of the electronic device 101 from a default mode to a driving mode, in response to determination that the electronic device 101 is associated with driving or a vehicle. The driving mode may be a mode for minimizing the occurrence of an event in which a user directly handles the electronic device 101. For example, a user interface related to the driving mode may have a simplified screen configuration (e.g., a screen configuration having a smaller number of icons than that of the default mode). As another example, the electronic device 101 that operates in the driving mode may operate via gesture recognition or voice recognition. As another example, when the electronic device 101 enters the driving mode, the processor 120 may execute an application for a navigation service without separate input, in response to identifying the entry.

The processor 120 may display various types of information on the display 160. According to various embodiments, the processor 120 may display a user interface for authentication (or information for authentication), in response to determination that the electronic device 101 is associated with driving or a vehicle. The authentication may be used for authorization, and the user interface for the authentication may include one or more of an image and text for providing guidance for the authentication. According to various embodiments, in response to identifying (determining) that authentication is completed (or executed), the processor 120 may display a message indicating successful authentication, and may display a user interface of an application for a navigation service. According to various embodiments, the processor 120 may update the currently displayed user interface, in response to reception of a signal associated with authorization from the other electronic device 102. For example, in response to reception of a signal associated with authorization from the other electronic device 102, the processor 120 may change the state of the currently displayed user interface from a first state to a second state. As another example, the processor 120 may display another user interface superimposed on the currently displayed user interface, in response to reception of a signal associated with authorization from the other electronic device 102. As another example, the processor 120 may terminate displaying the currently displayed user interface and may display another user interface, in response to reception of a signal associated with authorization from the other electronic device 102.

The processor 120 may receive a signal from an external electronic device (e.g., the first electronic device 104 of FIG. 3 or the like) which is distinct from the other electronic device 102. The external electronic device may be a device that is attachable to or embedded in a vehicle. The signal may include identification information of the external electronic device.

The processor 120 may generate a connection with the external electronic device, based on the identification information of the external electronic device included in the received signal. Via the connection, the processor 120 may request the external electronic device to provide data obtained using a sensor of the external electronic device to the electronic device 101. The data may indicate a state associated with a vehicle or driving. Via the connection, the processor 120 may request the external electronic device to change the operating frequency of a sensor of the external electronic device. For example, the processor 120 may request the external electronic device to increase or decrease the operating frequency of the sensor of the external electronic device.

The processor 120 may obtain data indicating the state of a vehicle or driving via the sensor module 176. For example, the processor 120 may obtain data associated with the velocity of a vehicle, the location of a vehicle, or the like via a gyro sensor, an acceleration sensor, a GPS, or the like included in the sensor module 176. According to various embodiments, the operating frequency of the sensor module 176 may be different from the operating frequency of the sensor of the external electronic device.

The processor 120 may determine a state associated with the movement of a vehicle, based on data obtained via a sensor of the external electronic device and provided from the external electronic device and data obtained via the sensor module 176 of the electronic device 101. For example, when a difference between the data provided from the external electronic device and the data obtained via the sensor module 176 of the electronic device 101 falls outside a designated range, the processor 120 may determine that an accident associated with the vehicle has occurred.

The processor 120 may provide the determined state associated with the movement of the vehicle to another entity. According to various embodiments, the processor 120 may transmit information associated with the determined state associated with the movement of the vehicle to a big data server, for analyzing user's driving habit, and providing vehicle state information, or the like. The transmission of the information may be performed based on a designated periodicity, or may be performed every time the information is generated. According to various embodiments, the processor 120 may transmit information associated with the state of the movement of the vehicle to a server associated with a disaster-related organization or to a predetermined electronic device designated by a user, in order to report an emergency situation as an accident occurs.

The processor 120 may correspond to the processor 120 of FIG. 1.

The memory 130 may operate according to a read command or a write command from the processor 120. The memory 130 may include a plurality of instructions to perform the operations of the present disclosure. The plurality of instructions may be executed by the processor 120. The memory 130 may correspond to the memory 130 of FIG. 1.

The display 160 may be used for providing various types of information. The display 160 may correspond to the display device 160 of FIG. 1.

The sensor module 176 may be used for obtaining information associated with the state of the electronic device 101, or the state of an environment where the electronic device 101 is located. The sensor module 176 may correspond to the sensor module 176 of FIG. 1.

The power management module 188 may provide a signal associated with wiredly or wirelessly received power to components of the electronic device 101. For example, the power management module 188 may transfer power wirelessly provided from the first electronic device 104 of FIG. 3 to the processor 120 or the like. As another example, the power management module 188 may transfer power wiredly provided from the first electronic device 104 of FIG. 3 to the processor 120 or the like. The power management module 188 may correspond to the power management module 188 of FIG. 1.

The communication module 190 may include various communication circuitry and be used for communication with another electronic device. The communication module 190 may be configured to implement various communication schemes. For example, the communication module 190 may be configured to support wide range communication such as cellular communication, and short range communication such as WLAN communication (e.g., Wi-Fi), Bluetooth, BLE, NFC, MST, QR code. The communication module 190 may correspond to the communication module 190 of FIG. 1.

As described above, the electronic device 101 according to various embodiments delegate the right to control the electronic device to another electronic device, thereby providing higher safety when the state of the electronic device 101 is associated with driving. The electronic device 101 according to various embodiments may use data obtained from a sensor of an external electronic device and data obtained from a sensor of the electronic device, may identify the accurate state of a vehicle, and may provide information associated with the state of the vehicle.

An electronic device according to various embodiments, as described above, may include: a communication module comprising communication circuitry; and a processor configured to: receive, from an external electronic device operably coupled to the electronic device, a request associated with transferring a portion of one or more rights capable of controlling the electronic device using the communication module; if the electronic device is performing a function associated with a driving based at least on the request, transfer the portion of the one or more rights to the external electronic device; and if the electronic device is performing a function not associated with the driving based at least on the request, restrict transferring the portion of the one or more rights to the external electronic device.

According to various example embodiments, the processor is configured to receive, from another external electronic device embedded in a vehicle or attachable to the vehicle, a first signal, and identify, based at least on receiving the first signal, that the electronic device is performing the function associated with the driving. For example, the first signal is received from the other external electronic device to provide power to the electronic device, and includes information associated with the vehicle or the other external electronic device. For example, the other external electronic device includes a beacon device that transmits the first signal based on a designated periodicity if power is provided from the other external electronic device to the electronic device, and the processor is configured to: determine, based on identification information of the beacon device included in the first signal, that the electronic device is located within the vehicle; and identify, based on determining that the electronic device is located within the vehicle, that the electronic device is performing the function associated with the driving.

According to various example embodiments, the processor is configured to: transmit, toward a vehicle, a first signal for releasing a door lock of the vehicle; and identify, based on transmitting the first signal, that the electronic device is performing the function associated with the driving.

According to various example embodiments, the electronic device may include one or more sensors, and the processor is configured to: identify movement velocity of the electronic device by using the one or more sensors; generate a first signal associated with the movement velocity; and if the movement velocity is higher than or equal to a designated value, identify that the electronic device is performing the function associated with the driving.

According to various example embodiments, the processor is configured to: receive, from another external electronic device including at least one sensor, a first signal associated with identification information of the other external electronic device, the other external electronic device being embedded in a vehicle or attachable to the vehicle; generate a connection between the other external electronic device and the electronic device, based at least in part on the identification information of the other external electronic device; transmit, to the other external electronic device via the connection, a second signal requesting first data obtained via the at least one sensor; receive, from the other external electronic device via the connection, a third signal including the first data obtained via the at least one sensor; determine a state of movement of the vehicle, based at least in part on the first data and second data obtained via one or more sensors of the electronic device; and transmit, to another electronic device, information associated with the state of the movement of the vehicle.

For example, the processor is configured to: identify whether the state of the movement of the vehicle corresponds to a designated state; and transmit, if identifying that the state of the movement of the vehicle corresponds to the designated state, the information associated with the state of the movement of the vehicle to the other electronic device. For example, the processor is configured to: if identifying that a difference between the first data and the second data falls outside a designated range, identify that the state of the movement of the vehicle corresponds to the designated state; and transmit, to the other electronic device, the information associated with the state of the movement of the vehicle that includes data indicating that an accident associated with the vehicle occurs, if identifying that the state of the movement of the vehicle corresponds to the designated state. According to various embodiments, the processor is configured to: identify whether the electronic device performs the function associated with the driving; and if identifying that the electronic device does not perform the function associated with the driving, restrict transferring the portion of the one or more rights to the external electronic device.

According to various example embodiments, the electronic device may further include a display, and the processor is configured to: determine, based at least in part on a first signal generated, transmitted, or received by the electronic device, that the electronic device is performing the function associated with the driving; in response to the determination, transmit a request signal for authentication and display, via the display, first information and second information associated with an application for driving; receive, while displaying the first information, a response signal for the authentication including identification of the external electronic device from the external electronic device; generate a connection between the external electronic device and the electronic device, based at least in part on the identification information of the external electronic device, in response to receiving the response signal; and transfer, by transmitting to the external electronic device a second signal for controlling at least one function provided via the second information in the external electronic device, the portion of the one or more rights to the external electronic device.

For example, the processor is further configured to: receive, based at least in part on the second signal, a third signal transmitted from the external electronic device via the connection; and display, via the display, third information changed from the second information, based on the third signal. For example, a first communication scheme used for the transmission of the request signal for the authentication and the reception of the response signal for the authentication is at least partially distinct from a second communication scheme used for the reception of the second signal and the third signal. For example, the first information includes one or more of text and an image for providing guidance for the authentication, and the second information includes one or more of text and an image for providing a navigation service. For example, the second signal is used for controlling one or more functions of another application distinct from the application in the external electronic device, and the processor is configured to: receive a fourth signal via the other application from another external electronic device; identify that the fourth signal is associated with at least a portion of the one or more functions; and transmit, to the external electronic device via the connection, a signal including information regarding the fourth signal, in response to identifying that the fourth signal is associated with at least a portion of the one or more functions. For example, each of the transmission of the request signal for the authentication and the reception of the response signal for the authentication is performed via near field communication (NFC) or magnetic secure transmission (MST). An electronic device according to various embodiments may include a communication module; and a processor is configured to: receive, from a first external electronic device functionally connected to the electronic device, a request associated with transferring a portion of the right to control the electronic device by the electronic device to a second external electronic device functionally connected to the first external electronic device; transfer, if the electronic device is performing a function associated with driving, the portion of the right to the second external electronic device, based at least on the request; and restrict transferring, if the electronic device is performing a function not associated with the driving, the portion of the right to the second external electronic device, based at least on the request. The electronic device 101 according to various embodiments may include a memory (e.g., the memory 130) for storing instructions, a communication interface (e.g., the communication module 190), a display (e.g., the display 160), and one or more processors (e.g., the processor 120) that are operably coupled to the communication interface, the memory, and the display, and are configured to execute the stored instructions so as to: determine that the state of the electronic device is associated with driving, based at least in part on a first signal generated, transmitted, or received by the electronic device; in response to the determination, transmitting a request signal for authentication and displaying first information associated with an application for driving via the display; receiving, from another electronic device, a response signal for authentication including identification information of the other electronic device, while displaying the first information; in response to the reception of the response signal, displaying second information associated with the application via the display; generating a connection between the other electronic device and the electronic device, based at least on the identification information of the other electronic device; and transmitting, to the other electronic device via the connection, a second signal for controlling at least one function provided via the second information in the other electronic device.

According to various example embodiments, the one or more processors may be further configured to execute the store instructions to perform: receiving, based at least in part on the second signal, a third signal transmitted from the other electronic device via the connection; and displaying third information changed from the second information, based on the third signal. A first communication scheme used for the transmission of the request signal for the authentication and the reception of the response signal for the authentication may be different from a second communication scheme used for the reception of the second signal and the third signal.

According to various example embodiments, the first information includes one or more of text and an image for providing guidance for the authentication, and the second information includes one or more of text and an image for providing a navigation service.

According to various example embodiments, the second signal is further used for controlling one or more functions of another application distinct from the application in the other electronic device, and the one or more processors may be further configured to execute the stored instruction so as to perform: receiving a fourth signal via the other application from an external electronic device; identifying that the fourth signal is associated with at least a portion of the one or more functions; and transmitting, to the other electronic device via the connection, a signal including information associated with the fourth signal, in response to the identification.

According to various example embodiments, the one or more processors may be configured to execute the stored instructions so as to perform: receiving the first signal from an external electronic device that is embedded in the vehicle or attachable to the vehicle; and in response to the reception of the first signal, determining that the state of the electronic device is associated with driving. The first signal is received from the other external electronic device so as to provide power to the battery of the electronic device, and includes information for identifying the vehicle or the external electronic device. The external electronic device may be a beacon device that periodically transmits the first signal when power is provided to the external electronic device, and the one or more processors may be configured to execute the stored instructions so as to perform: determining, based on identification information of the beacon device included in the first signal, that the electronic device is located within the vehicle; and determining, based on determining that the electronic device is located within the vehicle, that the state of the electronic device is associated with driving.

According to various example embodiments, the one or more processors may be configured to execute the stored instructions so as to perform: transmitting the first signal for releasing door lock of the vehicle toward the vehicle; and in response to the transmission of the first signal, determining that the state of the electronic device is associated with driving.

According to various example embodiments, the electronic device may further include one or more sensors, and the one or more processors may be configured to execute the stored instructions so as to perform: generating the first signal indicating the movement velocity of the electronic device using the one or more sensor; and in response to identifying that the movement velocity is greater than or equal to a reference velocity, determining that the state of the electronic device is associated with driving.

According to various example embodiments, the first signal is received from an external electronic device that includes at least one sensor and is embedded in the vehicle or attachable to the vehicle, and includes identification information of the external electronic device, and the one or more processors may be further configured to execute the stored instructions so as to perform: generating another connection between the external electronic device and the electronic device, based at least in part on the identification information of the external electronic device; transmitting, to the external electronic device via the other connection, a third signal requesting first data obtained via the at least one sensor; receiving, from the external electronic device via the other connection, a fourth signal including the first data obtained via the at least one sensor; determining the state of movement of the vehicle, based at least in part on the first data and second data obtained via one or more sensors of the electronic device; and transmitting, to another external electronic device, information associated with the state of the movement of the vehicle. The one or more processors may be configured to execute the stored instructions so as to perform: identifying whether the state of movement of the vehicle corresponds to a designated state; and transmitting information associated with the state of movement of the vehicle to the other external electronic device in response to identifying that the state of movement of the vehicle corresponds to the designated state. The one or more processor may be configured to execute the stored instructions so as to perform: in response to identifying that a difference between the first data and the second data falls outside a designated range, identifying that the state of the movement of the vehicle corresponds to the designated state; and transmitting, to the other external electronic device, the information associated with the state of the movement of the vehicle that includes data indicating that an accident associated with the vehicle occurs, in response to identifying that the state of the movement of the vehicle corresponds to the designated state.

According to various example embodiments, the one or more processors may be further configured to execute the stored instructions so as to perform: determining that the state of the electronic device associated with driving is changed, based at least on the first signal, after transmitting the second signal to the other electronic device; and in response to the determination that the state of the electronic device associated with driving is changed, transmitting, to the other electronic device via the connection, a third signal for ceasing that the at least one function is controlled in the other electronic device; and releasing the connection.

According to various example embodiments, each of the transmission of the request signal for the authentication and the reception of the response signal for the authentication is performed via near field communication (NFC) or magnetic secure transmission (MST).

An electronic device according to various example embodiments may include a memory storing instructions, a communication interface, a display, and one or more processors operably coupled to the communication interface, the memory and the display, and the one or more processor are configured to execute the stored instructions to: in response to determining that a state of another electronic device is associated with driving, receive a request signal for authentication transmitted from the other electronic device; transmit, to the other electronic device, a response signal for the authentication including identification information of the electronic device; generate a connection between the electronic device and the other electronic device, based at least in part on the identification information of the electronic device; receive, from the other electronic device via the connection, a signal for controlling at least one function that is associated with first information in the electronic device, the first information being associated with an application for driving and being displayed in the other electronic device; display second information corresponding to the first information, in response to receiving, the signal for controlling the at least one function; and in response to detecting at least one input on the second information: transmit, to the other electronic device, information associated with the at least one input, based at least in part on a signal for controlling the at least one function to display third information changed from the first information in the other electronic device; and display fourth information which corresponds to the third information and is changed from the second information.

According to various example embodiments, each of the first information, the second information, the third information, and the fourth information includes one or more of an image or a text for providing a navigation service, and one or more processors are configured to execute the stored instructions to: display a virtual keypad superimposed on the second information; and in response to detecting the at least one input on the virtual keypad: transmit, to the other electronic device, the information regarding the at least one input based at least in part on the signal for controlling the at least one function to display the third information changed from the first information in the other electronic device; and display the fourth information, corresponding to the third information, changed from the second information.

According to various example embodiments, the signal for controlling the at least one function is used for controlling one or more functions of another application distinct from the application in the electronic device, and the one or more processors are configured to execute the stored instructions to receive, in response to identifying that another signal received at the other electronic device via the other application from an external electronic device is associated with at least a portion of the one or more functions, signal including information regarding the other signal transmitted from the other electronic device.

According to various example embodiments, the one or more processors may be further configured to execute the stored instructions so as to perform: receiving a signal for ceasing that the at least one function is controlled in the electronic device from the other electronic device via the connection, and the signal for ceasing that the at least one function is controlled may be transmitted from the other electronic device in response to the fact that the state of the other electronic device associated with driving is changed.

According to various example embodiments, each of the reception of the request signal for the authentication and the transmission of the response signal for the authentication is performed via near field communication (NFC) or magnetic secure transmission (MST).

Figure 5:
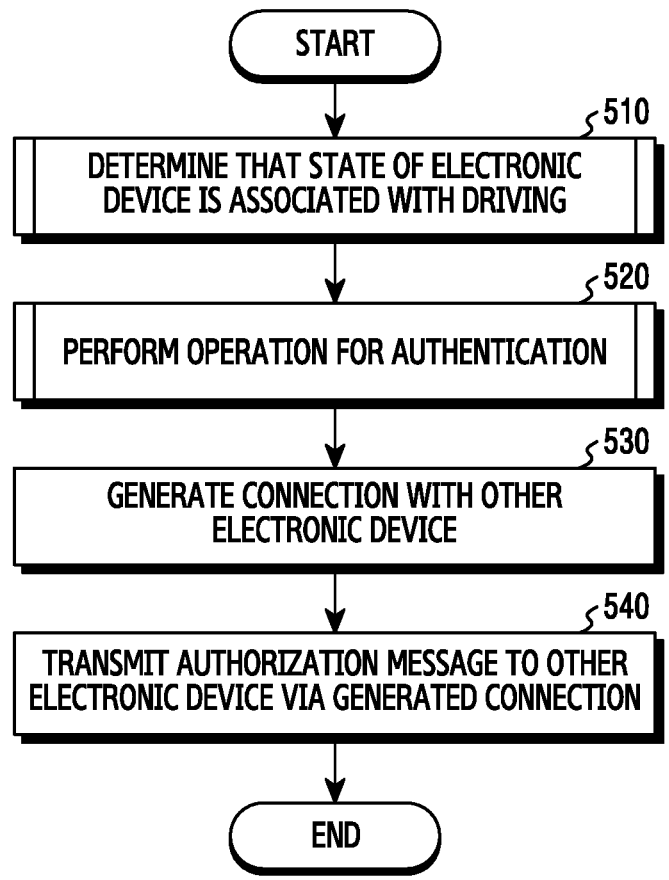
FIG. 5 is a flowchart illustrating an example of an operation of an electronic device according to various embodiments.

FIG. 5 is a flowchart illustrating an example of an operation of an electronic device according to various embodiments. Such operation may, for example, and without limitation, be performed by the electronic device 101 or the processor 120 of FIG. 1, or may be performed by the electronic device 101 or the processor 120 of FIG. 4.

Referring to FIG. 5, in operation 510, the processor 120 may determine that the state of the electronic device 101 is associated with driving. According to various embodiments, the processor 120 may determine that the state of the electronic device is associated with driving, based at least in part on a signal that is transmitted from the electronic device 101, is generated in the electronic device 101, or is received by the electronic device 101. For example, the processor 120 may determine that the state of the electronic device is associated with driving, based on a signal for releasing door lock of a vehicle, which is transmitted via an application that is associated with vehicle control and is stored in the memory 130 of the electronic device 101. As another example, the processor 120 may identify the state of movement of the electronic device, based on a signal generated using the sensor module 176 of the electronic device 101, and may determine that the state of the electronic device is associated with driving, based on the determination that the state of movement of the electronic device corresponds to a designated state. As another example, the processor 120 may determine that the state of the electronic device 101 is associated with driving, based on a beacon signal or a signal for charging which is received from the first electronic device 104 related to the vehicle.

In operation 520, the processor 120 may perform authentication so as to perform authorization.

According to various embodiments, to perform the authorization, the processor 120 may transmit a request signal for authentication using the communication module 190, in response to the determination that the state of the electronic device 101 is associated with driving. The request signal for authentication may be transmitted via NFC or MST which requires an event (e.g., tagging) in which the other electronic device 102 is located close to the electronic device 101, for reception. The signal for authentication may be transmitted via Bluetooth, BLE, Wi-Fi direct, or LTE sidelink. The signal for authentication is transmitted via Bluetooth, BLE, Wi-Fi direct, LTE side link, and the like, the processor 120 may perform an additional operation for authentication. For example, to authenticate the other electronic device 102 which transmits a response signal to the request signal for authentication, the processor 120 may display, on the display 160, a message inquiring about whether to accept the authentication. The display of the message may be bypassed when the other electronic device 102 has a record of previous authentication, or when the other electronic device 102 is registered in the electronic device 101 for authorization. The processor 120 may transmit the request signal for authentication during a predetermined period of time. For example, to determine whether the authorization is intended by a user related to the electronic device 101, the processor 120 may configure a designated time (or timer). When the response signal to the request signal is not received during the designated period of time, the processor 120 may determine that the authorization is not intended by the user related to the electronic device 101. When the response signal to the request signal is received during the designated period of time, the processor 120 may determine that the authorization is intended by the user related to the electronic device 101, whereby operations for the authorization may be continuously performed.

According to embodiments, the request signal for authentication may include identification information of the electronic device 101. The identification information of the electronic device 101 may be used for an operation of generating a connection with the other electronic device 102 for the authorization.

According to various embodiments, the processor 120 may identify (or monitor) whether the response signal to the request signal for authentication is received. For example, in response to the transmission of the request signal for authentication, the processor 120 may activate (or drive) a timer for identifying whether the response signal to the request signal is received during the designated period of time. Using the timer, the processor 120 may identify whether the response signal to the request signal is received.

According to various embodiments, the processor 120 may receive the response signal for authentication, which corresponds to the request signal, from the other electronic device 102. The response signal for authentication may include identification information of the other electronic device 102. The identification information of the other electronic device 102 included in the response signal for authentication may be used for the electronic device 101 to determine whether to authorize the other electronic device 102. The identification information of the other electronic device 102 included in the response signal for authentication may be used for generating a connection with the other electronic device 102 for the authorization. For example, the processor 120 may access the other electronic device 102 based on the identification information of the other electronic device 102, so as to request connection from the other electronic device 102.

Although not illustrated in FIG. 5, according to various embodiments, the processor 120 may provide (or display) information that provides guidance for authentication via the display 160, in response to the determination that the electronic device 101 is associated with driving. The provision of the information may be performed in parallel with an operation of transmitting the request signal for authentication, or may be performed irrespective of the order of the operations. According to various embodiments, in response to reception of the response signal for authentication, the processor 120 may provide, via the display 160, information indicating that authentication is successfully performed. In response to the reception of the response signal for authentication, the processor 120 may display a user interface of an application related to a driving mode (or information associated with the application related to a driving mode) via the display 160. For example, the user interface may be a user interface of an application for a navigation service. The user interface may have a configuration that restricts a portion of the functions provided in a default mode such that the user (e.g., a driver) related to the electronic device 101 handles the electronic device 101 less. For example, the user interface may be displayed in the state in which an area capable of receiving a user touch input or the like is deactivated.

In operation 530, the processor 120 may generate a connection with the other electronic device 102. The processor 120 may generate a connection with the other electronic device 102 that transmits the response signal for authentication. A communication scheme used for the connection may be different from the communication scheme used for signaling for the authentication. The connection may be a path via which a signal for the authorization is transmitted or received. Via the connection, the electronic device 101 may transmit information associated with a function of the electronic device 101 that is delegated to the other electronic device 102 (e.g., information associated with an application delegated to the other electronic device 102 or information associated with a function of the application). The other electronic device 102 may transmit a signal for controlling a portion of the functions of the electronic device 101 via the connection. The electronic device 101 may receive a signal for controlling a portion of the functions of the electronic device 101 from the other electronic device 102 via the connection.

In operation 540, the processor may transmit an authorization message to the other electronic device 102 via the generated connection. The authorization message may be used for specifying a function to be controlled by the other electronic device 102. The authorization message may be used for indicating that the other electronic device 102 is allowed to control the function. The authorization message may include information required when the other electronic device 102 controls the function. For example, the authorization message may include configuration information required for executing a function of the application that is delegated to the other electronic device 102 by the electronic device 101. As another example, the authorization message may include information associated with a user interface (or screen) that is currently displayed in the electronic device 101. After transmitting the authorization message, the whole or a portion of the functions of the electronic device 101 may be controlled by the other electronic device 102. By transmitting the authorization message, the electronic device 101 may divert input for the electronic device 101 to the other electronic device 102, whereby higher safety may be provided.

According to various embodiments, the authorization message may include information for controlling, by the other electronic device 102, at least one function which is provided via a user interface of an application that is currently displayed by the electronic device 101. According to various embodiments, the authorization message may include information for controlling, by the other electronic device 102, at least one function provided via a user interface distinct from a user interface currently displayed in the electronic device or via an application distinct from an application currently executed in the electronic device 101.

When the other electronic device 102 has been authorized in advance, or when the other electronic device 102 has been registered in advance for the authorization, it should be noted that operations 520 and 540 may be omitted or bypassed. For example, the whole or a portion of the functions of the electronic device 101 may be controlled by the other electronic device 102 without transmitting a separate message, such as the authorization message, when the other electronic device 102 has been authorized in advance or when the other electronic device 102 has been registered in advance for the authorization.

As described above, the electronic device 101 according to various embodiments may perform an operation of monitoring the state of the electronic device 101 for the authorization, an operation of authenticating the authorization, an operation of generating a connection for the authorization, or an operation of transmitting a message for the authorization, whereby a driver may less handle the electronic device 101 during driving. The electronic device 101 according to various embodiments may perform authorization such that the driver handles the electronic device 101 less, thereby providing higher safety.

Figure 6:
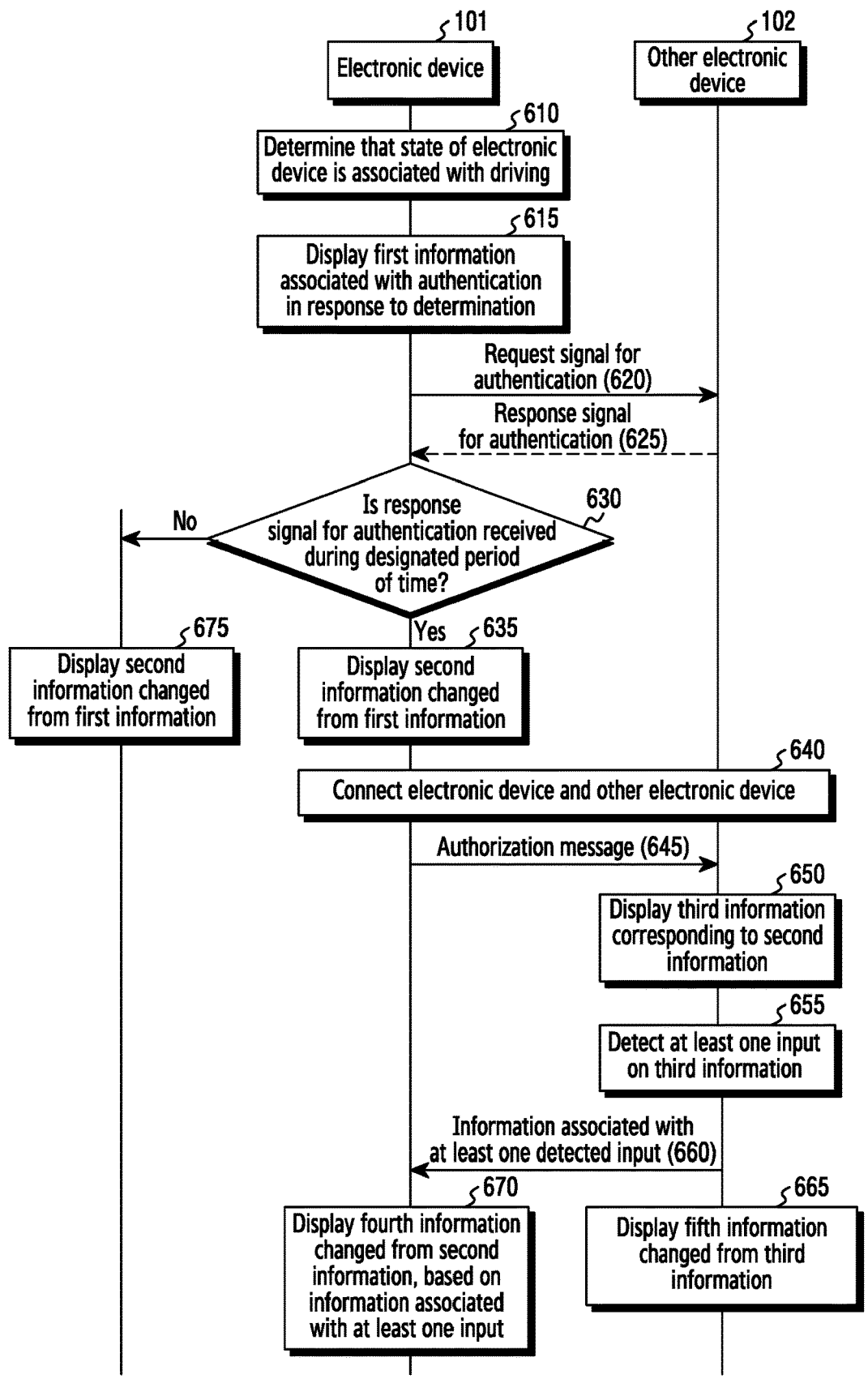
FIG. 6 is a flowchart illustrating an example of signaling between an electronic device and another electronic device according to various embodiments.

FIG. 6 is a flowchart illustrating an example of signaling between an electronic device and another electronic device according to various embodiments. Such signaling may, for example, and without limitation, be performed by the electronic device 101 and the other electronic device 102 of FIG. 2.

Figure 7:
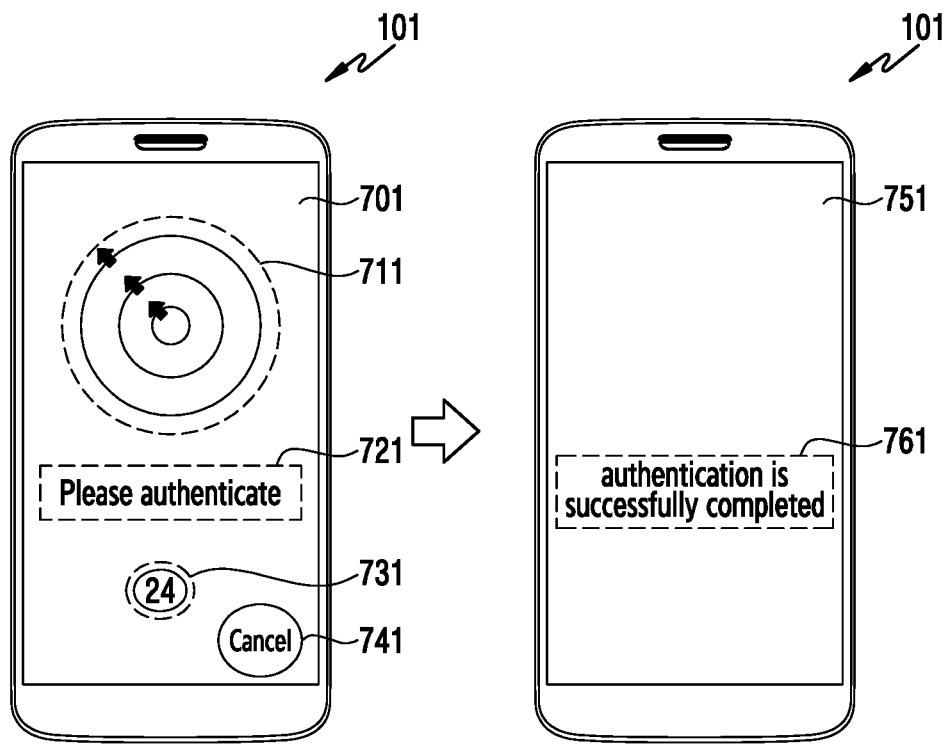
FIG. 7 is a diagram illustrating an example of information displayed in an electronic device according to various embodiments.
Figure 8:
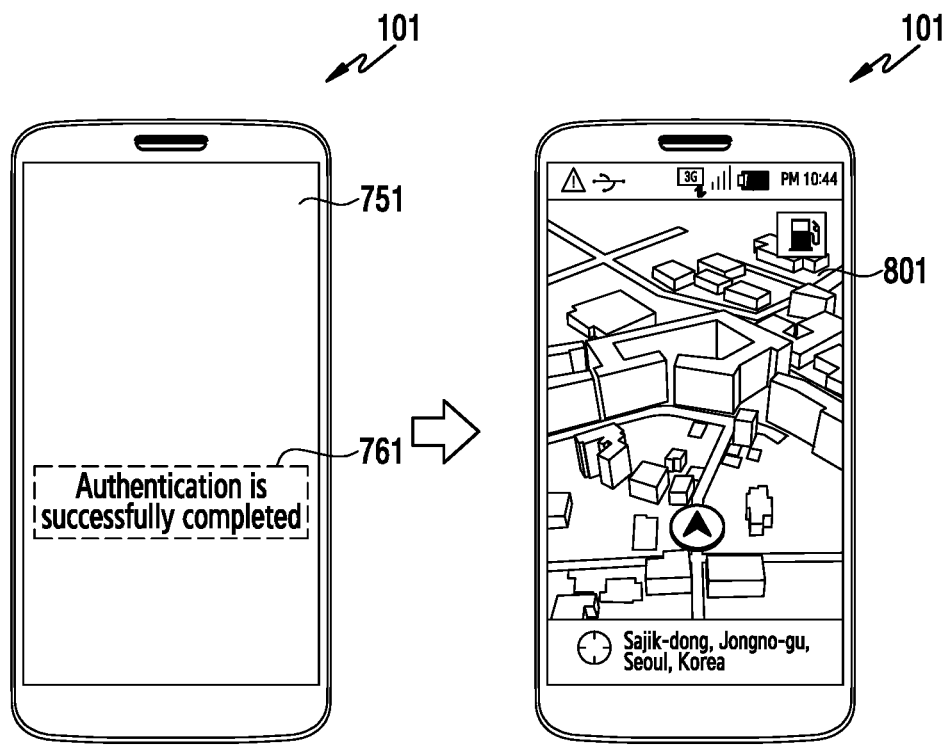
FIG. 8 is a diagram illustrating another example of information displayed in an electronic device according to various embodiments.
Figure 9:
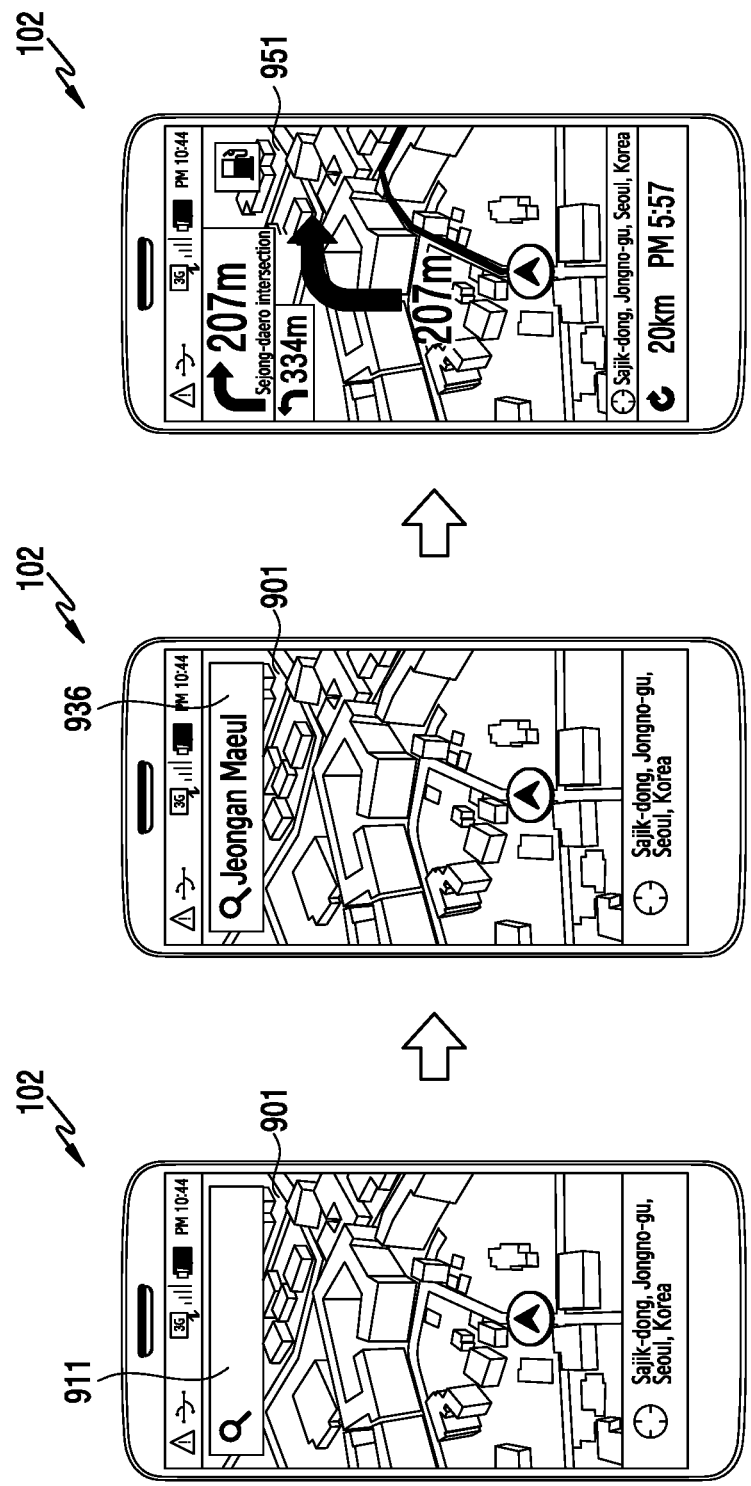
FIG. 9 is a diagram illustrating an example of information displayed in another electronic device according to various embodiments.
Figure 10:
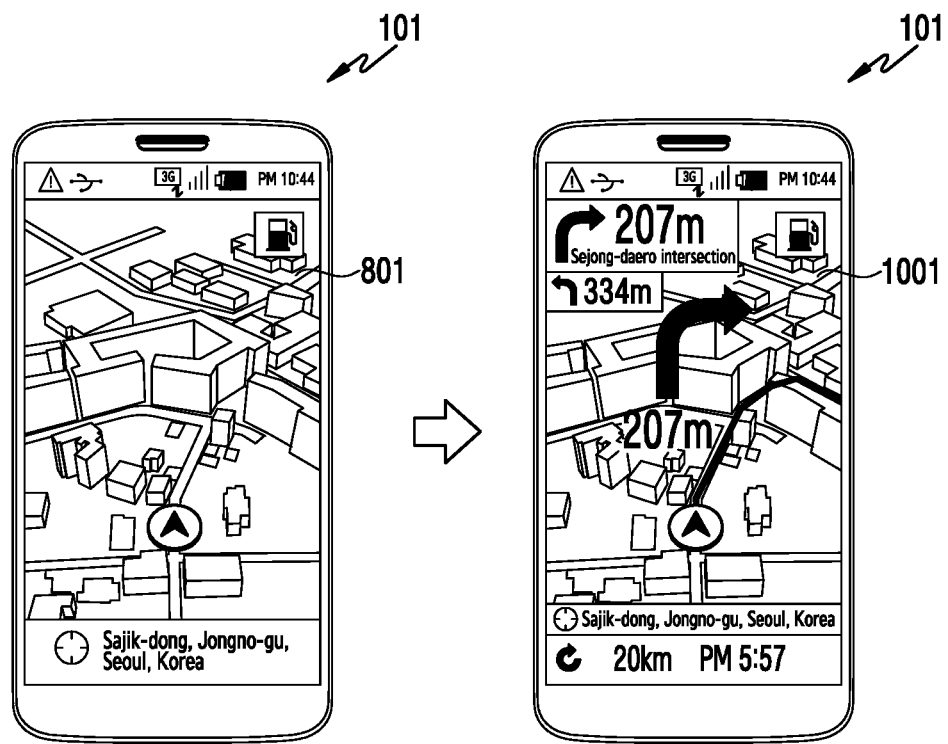
FIG. 10 is a diagram illustrating another example of information displayed in an electronic device according to various embodiments.

FIG. 7 is a diagram illustrating an example of information displayed in an electronic device according to various embodiments. FIG. 8 is a diagram illustrating another example of information displayed in an electronic device according to various embodiments. FIG. 9 is a diagram illustrating an example of information displayed in another electronic device according to various embodiments. FIG. 10 is a diagram illustrating another example of information displayed in an electronic device according to various embodiments.

Referring to FIG. 6, in operation 610, the electronic device 101 (e.g., the processor 120) may determine that the state of the electronic device is associated with driving. For example, the electronic device 101 may determine that the state of the electronic device is associated with driving or a vehicle, based on a signal that is transmitted from the electronic device 101, is generated in the electronic device 101, or is received by the electronic device 101.

In operation 615, the electronic device 101 may display first information in response to the determination. The first information may include one or more of text and an image for providing guidance (or leading) authentication for the authorization. The first information may be configured as a user interface. For example, referring to FIG. 7, the electronic device 101 may display the first information 701. According to various embodiments, the first information 701 may include an animation 711 (or visual effect) indicating that a request signal for authentication is transmitted (or an authentication procedure is in progress), in order to provide guidance for the authentication. According to various embodiments, the first information 710 may display text 721 for providing guidance for the authentication. The text 721 may be highlighted over time. According to various embodiments, the first information 710 may display a timer 731 indicating a designated time. The timer 731 may indicate the amount of time remaining until transmission of the request signal for authentication is ceased, or may indicate the amount of time remaining until the authentication is successfully completed. For example, a number displayed by the timer 731 may decrease over time. According to various embodiments, the first information 710 may include an object 741 for cancelling (or ceasing) a procedure for authorization. When input on the object 741 is detected, the electronic device 101 may cease or terminate the procedure for authorization.

In operation 620, the electronic device 101 may transmit a request signal for authentication. The request signal for authentication may be transmitted to an unspecified electronic device. In other words, the request signal for authentication may be broadcasted. An area at which the request signal for authentication may arrive (e.g., the coverage of the request signal for authentication) may correspond to an area that the vehicle occupies (possess). The electronic device 101 may control transmission power of the request signal for authentication such that the coverage of the request signal for authentication corresponds to the area that the vehicle occupies, thereby filtering out an event in which an electronic device located outside the vehicle receives the request signal for authentication. The request signal for authentication may be transmitted via various transmission schemes. The request signal for authentication may be transmitted periodically (or repeatedly) during a designated period of time. The designated period of time may be set to implicitly inquire of a user about whether to proceed with the authorization. The designated period of time may be set to a fixed value, or may be set to a value that varies depending on the state of the electronic device 101. For example, when the amount of charge remaining in the battery of the electronic device 101 is less than a reference capacity, the designated period of time may be reduced. When the request signal for authentication is periodically transmitted, the periodicity of transmission of the request signal for authentication may be fixed or may vary depending on the state of the electronic device. For example, when the amount of charge remaining in the battery of the electronic device 101 is less than a reference capacity, the periodicity of transmission may be increased. The request signal for authentication may include identification information of the electronic device 101. The other electronic device 102 located in the vehicle may receive the request signal for authentication transmitted from the electronic device 101.

Operation 615 and operation 620 may be performed by the electronic device 101 in parallel or in reverse order. In other words, operation 615 and operation 620 may be performed irrespective of the order of operations.

In operation 625, the other electronic device 102 may transmit a response signal for authentication to the electronic device 101. For example, when the electronic device 101 transmits the request signal for authentication via NFC or MST, a user (e.g., a passenger) of the other electronic device 102 may check the first information provided via operation 615 and may tag the other electronic device 102 to the electronic device 101. Based on tagging, the other electronic device 102 may receive the request signal for authentication from the electronic device 101 in operation 620, and may transmit the response signal for authentication, which indicates that the request signal is received, to the electronic device 101 in operation 625. The electronic device 101 may receive the response signal for authentication. As another example, when the electronic device 101 transmits the request signal for authentication via Bluetooth or BLE, the other electronic device 102 may display a message indicating that the request signal for authentication is received. The user of the other electronic device 102 performs inputting to the message, thereby transmitting the response signal for authentication to the electronic device 101. The response signal for authentication may include identification information of the other electronic device 102.

As shown in operation 625, the other electronic device 102 may not transmit the response signal for authentication according to handling by the user of the other electronic device 102 (e.g., an action of not performing tagging or an action of disregarding a displayed message).

In operation 630, the electronic device 101 may determine whether the response signal for authentication is received during the designated period of time. If the signal for authentication is received during the designated period of time, the electronic device 101 may perform operation 635. If the signal for authentication is not received during the designated period of time, the electronic device 101 may perform operation 675.

When the response signal for authentication is received during (or within) the designated period of time, the electronic device 101 may display second information which is changed from the first information in operation 635. The second information may be information associated with driving or a vehicle. For example, the second information may be a user interface of an application for a navigation service. According to embodiments, another piece of information may be displayed between display of the first information and display of the second information. For example, referring to FIG. 7, the electronic device 101 may display another piece of information 751. The other piece of information 751 may include at least one of text and an image for indicating the result of the authentication. According to various embodiments, the other piece of information 751 may include text 761 indicating that the authentication is successfully performed. The display of the other piece of information 751 may be ceased after a predetermined period of time elapses. In other words, the other piece of information 751 may be changed (or switched) to the second information.

For example, referring to FIG. 8, the electronic device 101 may display second information 801 after displaying the other piece of information 751, or may display the second information 801 without displaying the other piece of information in response to reception of the response signal for authentication within the designated period of time. The second information 801 may be a user interface of an application for a navigation service. The second information 801 may restrictively include an area capable of receiving a user input, so as to prevent a driver from handling the second information 801 during driving.

In operation 640, the electronic device 101 and the other electronic device 102 may generate a connection between (e.g., connect) the electronic device 101 and the other electronic device 102. According to various embodiments, when identification information of the electronic device 101 is included in the request signal for authentication, the generation of the connection may be initiated by the other electronic device 102. According to various embodiments, when identification information of the other electronic device 102 is included in the response signal for authentication, the generation of the connection may be initiated by the electronic device 101. The connection may be used for signaling associated with the authorization. The connection may be generated based on a communication scheme that is distinct from the communication scheme used for signaling for the authentication, or may be generated based on the communication scheme same as the communication scheme used for signaling for the authentication.

In operation 645, the electronic device 101 may transmit an authorization message to the other electronic device 102 via the generated connection. The authorization message may include one or more from among information indicating a function of the electronic device 101 of which controlling is delegated to the other electronic device 102, configuration information required for controlling the function, and information indicating an expiration condition of the authorization. When the function that the electronic device 101 delegates to the other electronic device 102 via the authorization message is associated with the second information 635 that is currently displayed by the electronic device 101, the authorization message may be transmitted together with information for sharing the display of the second information (e.g., information for mirroring or casting). The other electronic device 102 may receive the authorization message from the electronic device 101. By receiving the authorization message, the other electronic device 102 may identify that the authorization is approved.

In operation 650, the other electronic device 102 may display third information corresponding to the second information, in response to the reception of the authorization message. The third information may provide data corresponding to data provided via the second information. For example, the configuration of display of the third information may be the same as the configuration of display of the second information. As another example, although the third information provides content the same as the second information, the configuration of display of the third information may be different from the configuration of display of the second information. For example, referring to FIG. 9, the other electronic device 102 may display third information 901 in response to reception of the authorization message. The third information 901 may further include an area 911 capable of receiving a user input, compared with (relative to) the second information 801. The electronic device 101 may be switched to a driving mode in response to the determination that the state of the electronic device 101 is associated with driving in operation 610, and thus, the second information 801 displayed in the electronic device 101 may not include the area 911. Conversely, the other electronic device 102 is authorized by the electronic device 101 to perform control associated with the second information 801, and thus, the third information 901 displayed in the other electronic device 102 may include the area 911.

In operation 655, the other electronic device 102 may detect at least one input associated with the third information. The at least one input may be associated with a function delegated by the electronic device 101. For example, referring to FIG. 9, the other electronic device 102 may detect at least one input on the area 911 included in the third information 901. For example, the at least one input may be an input for setting a destination. In response to the detection of the input for inputting text to the area 911, the other electronic device 102 may display an area 936 including text (e.g., Jeongan Maeul) in the third information 901. The other electronic device 102 may further detect input for approving (or confirming) the text.

In operation 660, the other electronic device 102 may transmit information associated with the at least one input to the electronic device 101 via the generated connection. The at least one input may be used for changing the state of the electronic device 101 (changing a screen currently displayed by the electronic device 101 or the like). For example, in response to the detection of the input for approving the text included in the area 936, the other electronic device 102 may transmit, to the electronic device 101, information associated with the at least one input generated by the other electronic device 102 until the input for approving the text is detected. The electronic device 101 may receive information associated with the at least one input.

In operation 665, the other electronic device 102 may display fifth information changed from the third information, in response to the detection of the at least one input. The fifth information may be information changed from the third information based on the at least input. For example, referring to FIG. 9, the other electronic device 102 may display the fifth information 951 which is changed from the third information 901, in response to reception of input for confirming the text included in the area 936 (e.g., completing setting of a destination). The fifth information 951 may be the state in which the destination is completely set (or a route is completely set) as illustrated in FIG. 9.

Operation 660 and operation 665 may be performed in parallel, or in reverse order, unlike the example of FIG. 6. In other words, operation 660 and operation 665 may be performed irrespective of the order of operations.

In operation 670, the electronic device 101 may display fourth information changed from the second information, based on information associated with the received at least one input. In other words, the electronic device 101 may change an object to be displayed from the second information to the fourth information according to the control of the other electronic device 102. For example, referring to FIG. 10, the electronic device 101 may display fourth information 1001 which is changed from the second information 801, based on reception of information associated with the at least one input in operation 660 while the second information 801 is displayed. The fourth information may be the state in which a destination is completely set as illustrated in FIG. 10. According to various embodiments, via authorization, the electronic device 101 may display the fourth information changed from the second information, without user input to the electronic device 101.

When the response signal for authentication is not received during (or within) the designated period of time, the electronic device 101 may display second information which is changed from the first information in operation 675. In response to the determination that the response signal for authentication is not received during the designated period of time, the electronic device 101 may determine that a user does not intend to perform authorization. Based on the determination, the electronic device 101 may display the second information changed from the first information. The second information may be associated with a driving mode.

As described above, the electronic device 101 according to various embodiments may perform authorization via signaling with the other electronic device 102, thereby preventing a user (e.g., a driver) of the electronic device 101 who is driving from providing input to the electronic device 101. The other electronic device 102 according to various embodiments may provide various interactions to the electronic device 101 via the authorization, in the state of being spaced apart from the electronic device 101.

Figure 11:
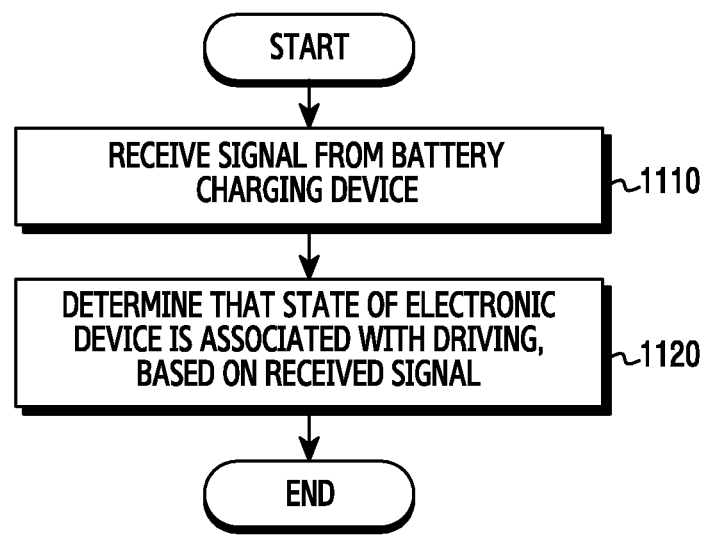
FIG. 11 is a flowchart illustrating an example of an operation of an electronic device for determining the state of the electronic device according to various embodiments.

FIG. 11 is a flowchart illustrating an example of an operation of an electronic device for determining the state of the electronic device according to various embodiments. Such operation may, for example, and without limitation, be performed by the electronic device 101 or a component (e.g., the processor 120 or the like) of the electronic device 101 illustrated in FIG. 1 or FIG. 4.

In FIG. 11, operation 1110 and operation 1120 may be associated with operation 510.

Referring to FIG. 11, in operation 1110, the processor 120 may receive a signal from a battery charging device. For example, the battery charging device may correspond to the first electronic device 104 illustrated in FIG. 3. The battery charging device may be embedded in a vehicle or may be attached to the internal surface of the vehicle. The battery charging device may provide power to a battery of the electronic device 101 that has mobility. According to various embodiments, the processor 120 may receive a signal for charging power from the battery charging device via the power management module 188. The received signal may include identification information of the battery charging device. Identification information of the battery charging device may be modulated by various modulation schemes such as ASK, FSK, PSK, or the like, and may be included in the signal. The signal may be provided to the electronic device 101 via wire or wirelessly.

In operation 1120, the processor 120 may determine that the state of the electronic device 101 is associated with driving, based on the received signal. According to various embodiments, when the received signal includes the identification information of the battery charging device, the electronic device 101 may compare the identification information of the battery charging device with information stored in the memory 130. Based on the determination that information corresponding to the identification information of the battery charging device is included in the information stored in the memory 130, as a result of the comparison, the electronic device 101 may determine that the state of the electronic device 101 is associated with driving. According to various embodiments, when the received signal includes the identification information of the battery charging device, the processor 120 may collect data associated with the identification information of the battery charging device via signaling with a server. Based on the determination that the battery charging device is associated with the vehicle as a result of the collection, the processor 120 may determine that the state of the electronic device 101 is associated with driving. According to various embodiments, when the received signal does not include the identification information of the battery charging device, the processor 120 may identify the battery charging device by communicating with the battery charging device via a communication scheme usable by the electronic device 101 (e.g., a beaconing scheme of BLE, an LED flicking scheme, an NFC scheme, a QR code scheme, or the like). The processor 120 may determine that the state of the electronic device 101 is associated with driving, based on the identification. According to various embodiments, when the received signal does not include the identification information of the battery charging device, the processor 120 may determine that the state of the electronic device 101 is associated with driving via waveform analysis, frequency feature analysis, amplitude analysis, or the like associated with the received signal.

As described above, the electronic device 101 according to various embodiments may determine that the state of the electronic device 101 is associated with driving, based on a signal for charging received from the battery charging device. Via such operation, the electronic device 101 switches the mode of the electronic device 101 to a driving mode, thereby providing higher safety to a user.

Figure 12:
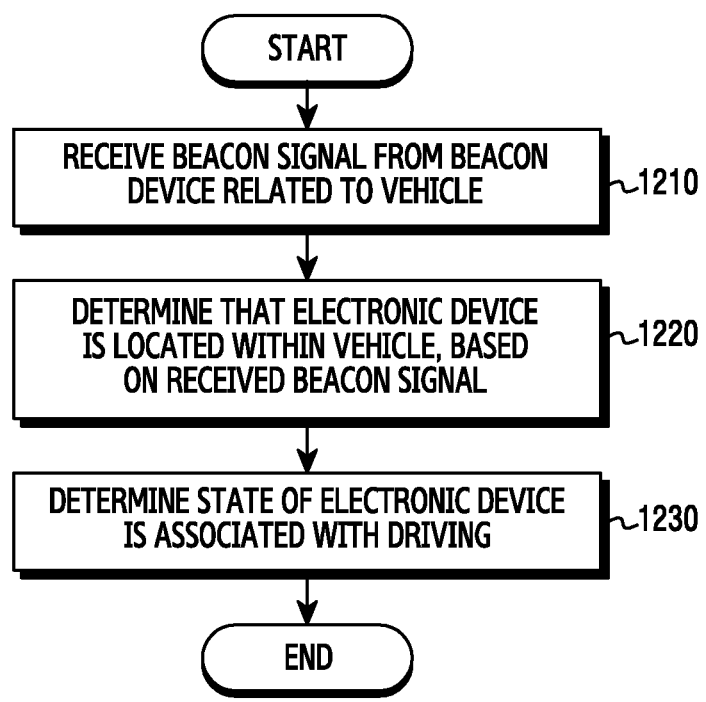
FIG. 12 is a flowchart illustrating another example of an operation of an electronic device for determining the state of the electronic device according to various embodiments.

FIG. 12 is a flowchart illustrating another example of an operation of an electronic device for determining the state of the electronic device according to various embodiments. Such operation may, for example, and without limitation, be performed by the electronic device 101 or a component (e.g., the processor 120 or the like) of the electronic device 101 illustrated in FIG. 1 or FIG. 4.

In FIG. 12, operations 1210, 1220, and 1230 may be associated with operation 510.

Referring to FIG. 12, in operation 1210, the processor 120 may receive a beacon signal from a beacon device related to a vehicle. For example, the beacon device related to the vehicle may correspond to the first electronic device 104 of FIG. 3. The beacon device related to the vehicle may be embedded in the vehicle or may be attached to the internal surface of the vehicle. The beacon device may be a device that is provided with power from the vehicle. The beacon device may operate based on power provided from the vehicle. For example, the beacon device may operate when the battery in the vehicle is in an active state. The beacon signal may include identification information of the beacon device. The coverage of the beacon signal may correspond to an area that the vehicle occupies. The beacon signal may be transmitted periodically.

In operation 1220, the processor 120 may determine that the electronic device 101 is located within the vehicle, based on the received beacon signal. According to various embodiments, the processor 120 may provide identification information of the beacon device included in the received beacon signal to a server related to the beacon device. The server that is provided with the identification information of the beacon device may transmit a signal indicating that the beacon device is related to the vehicle to the electronic device 101. The processor 120 may receive the signal transmitted from the server, and may determine that the electronic device 101 is located within the vehicle. According to various embodiments, when signaling with the above-described server has already been performed, the processor 120 may determine that the electronic device 101 is located within the vehicle, based on the identification information of the beacon device, without separate signaling with an external electronic device.

In operation 1230, the processor 120 may determine that the state of the electronic device 101 is associated with driving, in response to the determination that the electronic device 101 is located within the vehicle.

As described above, the electronic device 101 according to various embodiments may determine that the state of the electronic device 101 is associated with driving, based on the beacon signal received from the beacon device. Via such operation, the electronic device 101 switches the mode of the electronic device 101 to a driving mode, thereby providing higher safety to a user.

Figure 13:
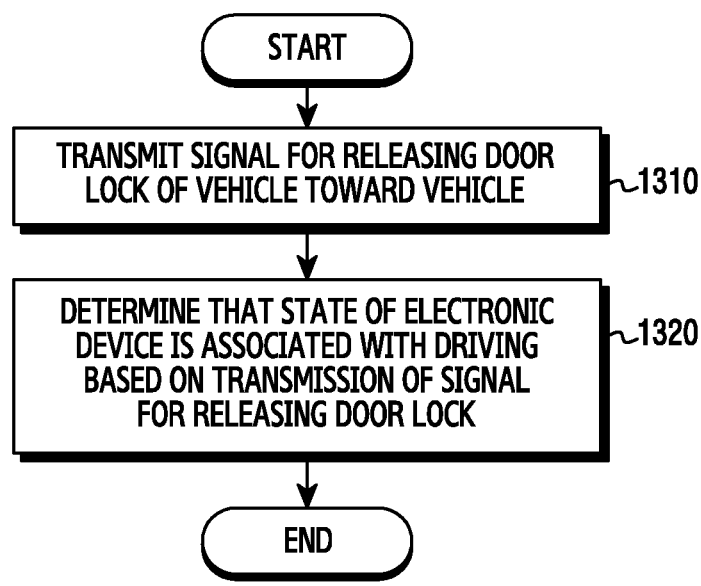
FIG. 13 is a flowchart illustrating another example of an operation of an electronic device for determining the state of the electronic device according to various embodiments.

FIG. 13 is a flowchart illustrating another example of an operation of an electronic device for determining the state of the electronic device according to various embodiments. Such operation may, for example, and without limitation, be performed by the electronic device 101 or a component (e.g., the processor 120 or the like) of the electronic device 101 illustrated in FIG. 1 or FIG. 4.

Figure 14:
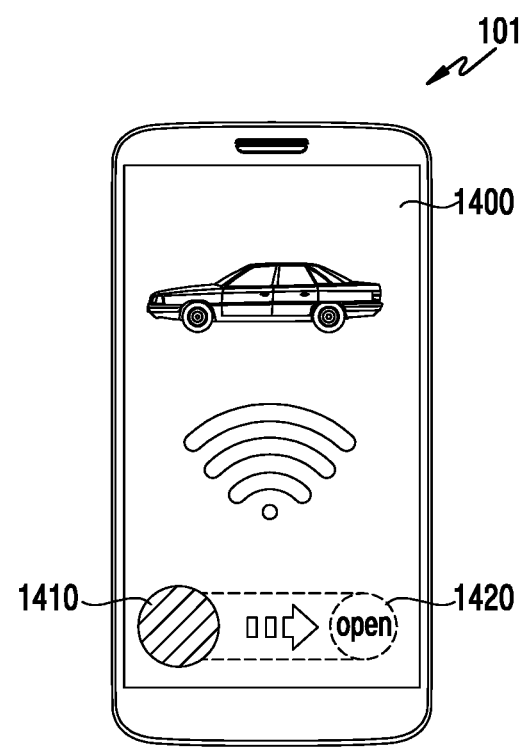
FIG. 14 is a diagram illustrating another example of information displayed in an electronic device according to various embodiments.

FIG. 14 is a diagram illustrating another example of information displayed in an electronic device according to various embodiments.

In FIG. 13, operation 1310 and operation 1320 may be associated with operation 510.

Referring to FIG. 13, in operation 1310, the processor 120 may transmit a signal for releasing door lock of a vehicle toward the vehicle. According to various embodiments, the electronic device 101 may store, in the memory 130, an application for controlling or monitoring the vehicle. The processor 120 may transmit a signal for releasing door lock of the vehicle via the application, based on user input. For example, referring to FIG. 14, the processor 120 may display a user interface 1400 associated with the application via the display 160. According to various embodiments, the user interface 1400 may include one or more images indicating releasing door lock of the vehicle. According to various embodiments, the user interface 1400 may display one or more objects for transmitting a signal for releasing door lock of the vehicle. For example, the user interface 1400 may include an object 1410 for transmitting a signal for releasing door lock of the vehicle. The processor 120 may transmit the signal for releasing door lock of the vehicle to the vehicle, in response to detection of drag-and-drop input for moving the object 1410 to an image 1420.

In operation 1320, the processor 120 may determine that the state of the electronic device 101 is associated with driving, based on the transmission of the signal for releasing door lock of the vehicle. Unlike FIG. 13, according to embodiments, when the vehicle and the electronic device 101 interoperate, the processor 120 may identify whether a signal indicating that the vehicle moves is received via an application for controlling or monitoring the vehicle, based on the transmission of the signal for releasing door lock of the vehicle. In this instance, the processor 120 may determine that the state of the electronic device 101 is associated with driving, in response to the determination that the signal indicating that the vehicle moves is received.

As described above, the electronic device 101 according to various embodiments may determine that the state of the electronic device 101 is associated with driving, based on the determination that the signal associated with the vehicle is transmitted from the electronic device 101. Via such operation, the electronic device 101 switches the mode of the electronic device 101 to a driving mode, thereby providing higher safety to a user.

Figure 15:
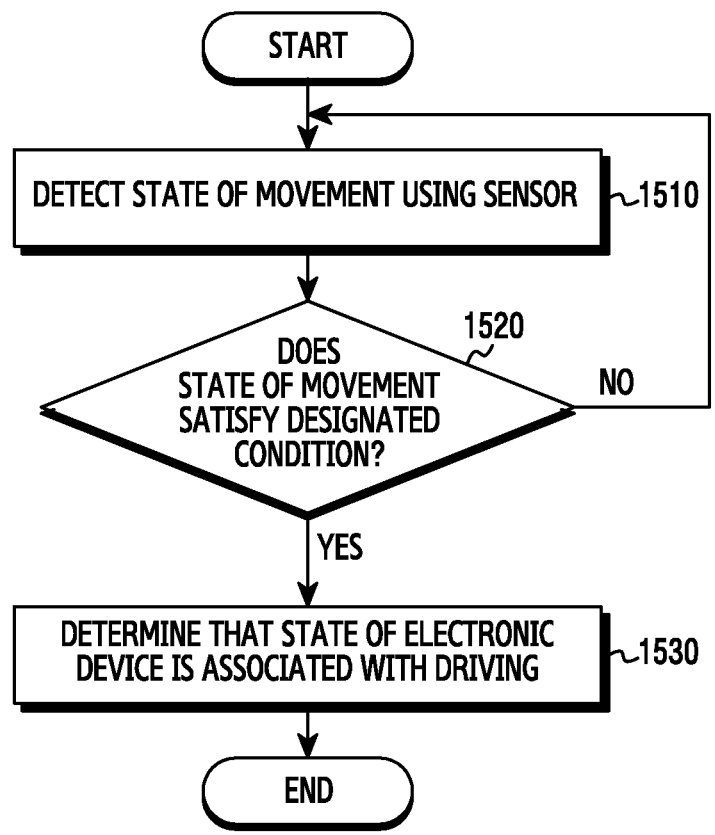
FIG. 15 is a flowchart illustrating another example of an operation of an electronic device for determining the state of the electronic device according to various embodiments.

FIG. 15 is a flowchart illustrating another example of an operation of an electronic device for determining the state of the electronic device according to various embodiments. Such operation may, for example, and without limitation, be performed by the electronic device 101 or a component (e.g., the processor 120 or the like) of the electronic device 101 illustrated in FIG. 1 or FIG. 4.

In FIG. 15, operations 1510, 1520, and 1530 may be associated with operation 510.

Referring to FIG. 15, in operation 1510, the processor 120 may detect the state of movement of the electronic device 101, using the sensor module 176. According to various embodiments, the processor 120 may detect the state of movement of the electronic device 101 using the sensor module 176 that includes one or more of a gyro sensor, an acceleration sensor, and a GPS. For example, the processor 120 may determine the movement velocity of the electronic device 101 using the sensor module 176.

In operation 1520, the processor 120 may identify (determine) whether the state of movement of the electronic device 101 satisfies a designated condition. The designated condition may be set to identify (determine) whether the state of the electronic device 101 is associated with driving or a vehicle. For example, the designated condition may be an event in which the electronic device 101 moves at a velocity greater than or equal to a designated velocity, an event in which the electronic device 101 is located on a driveway, or the like. In response to identifying that the state of movement of the electronic device 101 satisfies the designated condition, the processor 120 may perform operation 1530. In response to identifying that the state of movement of the electronic device 101 does not satisfy the designated condition, the processor 120 may perform operation 1510 again.

In operation 1530, the processor 120 may determine that the state of the electronic device 101 is associated with driving, in response to the determination that the state of movement of the electronic device 101 satisfies the designated condition. For example, when the movement velocity of the electronic device 101 is greater than or equal to a reference velocity, the processor 120 may determine that the state of the electronic device 101 is associated with driving.

As described above, the electronic device 101 according to various embodiments may determine that the state of the electronic device 101 is associated with driving, based on a signal generated using one or more sensors. Via such operation, the electronic device 101 switches the mode of the electronic device 101 to a driving mode, thereby providing higher safety to a user.

It should be noted that combinations of the examples of the operations described in FIGS. 11, 12, 13, and 15 may be allowed. For example, the processor 120 may determine that the state of the electronic device is associated with driving, based on a signal received from the battery charging device and a signal generated via the sensor module 176.

Figure 16:
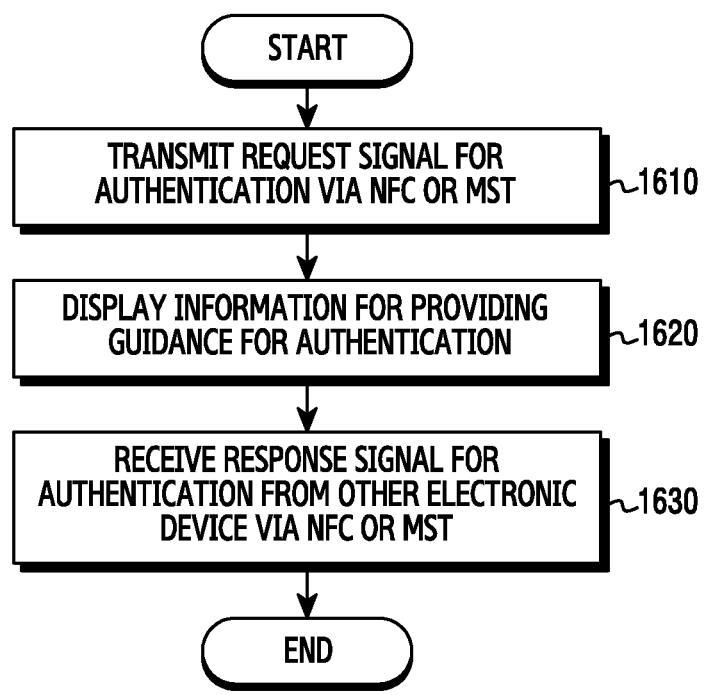
FIG. 16 is a flowchart illustrating an example of an operation of an electronic device for performing authentication according to various embodiments.

FIG. 16 is a flowchart illustrating an example of an operation of an electronic device for performing authentication according to various embodiments. Such operation may, for example, and without limitation, be performed by the electronic device 101 or a component (e.g., the processor 120 or the like) of the electronic device 101 illustrated in FIG. 1 or FIG. 4.

Figure 17:
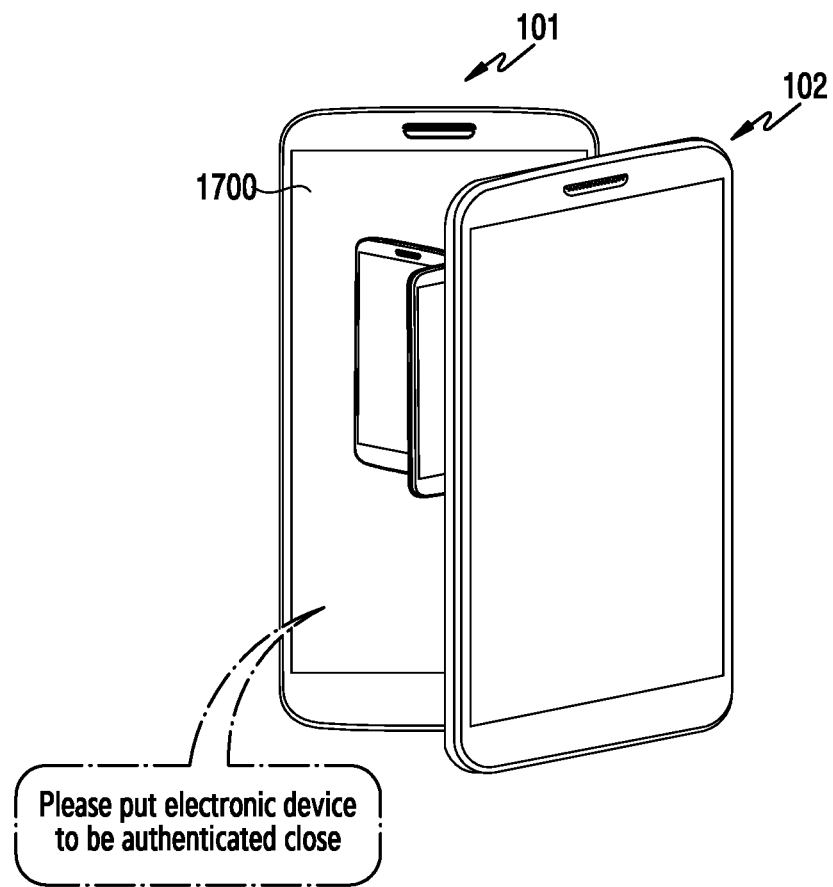
FIG. 17 is a diagram illustrating an example of the positional relationship between an electronic device and another electronic device, which perform authentication according to various embodiments.

FIG. 17 is a diagram illustrating an example of the positional relationship between an electronic device and another electronic device, which perform authentication according to various embodiments.

In FIG. 16, operations 1610, 1620, and 1630 may be associated with operation 520.

Referring to FIG. 16, in operation 1610, the processor 120 may transmit a request signal for authentication via NFC or MST. According to various embodiments, the processor 120 may transmit the request signal for authentication via NFC or MST during a designated period of time. An area for receiving the transmitted request signal for authentication may have a limited area. The signal transmitted via NFC or MST has coverage of a limited area and thus, tagging between the electronic device 101 and the other electronic device 102 may be required for receiving the response signal for authentication.

In operation 1620, the processor 120 may display information for providing guidance for the authentication while the request signal for authentication is transmitted. As described above, tagging may be required for receiving the request signal for authentication and thus, the processor 120 may display information for providing guidance for the tagging. For example, referring to FIG. 17, the processor 120 may display, via the display 160, information 1700 for providing guidance for the authentication. The information 1700 may include content for providing guidance for the tagging. For example, the content may include one or more from among a still image, a dynamic image (e.g., an animation), and text. The information 1700 may disappear without separate input, when a designated period of time for transmitting the request signal for authentication elapses. In this instance, the processor 120 may determine that the authorization is not requested by the electronic device 101.

Although FIG. 16 illustrates an example of performing operation 1620 after performing operation 1610, this merely an example for ease of description. Operations 1610 and 1620 may be performed in parallel, or in reverse order.

In operation 1630, the processor 120 may receive a response signal for authentication via NFC or MST from the other electronic device 102. According to various embodiments, the processor 120 may receive a response signal for authentication via NFC or MST from the other electronic device 102. In the same manner as the request signal for authentication, the response signal for authentication may have limited coverage. Tagging may be required when the electronic device 101 receives the response signal for authentication. For example, referring to FIG. 17, the other electronic device 102 may be tagged to the electronic device 101 such that the electronic device 101 may receive the response signal for authentication. By receiving the response signal for authentication, the processor 120 may complete an operation for authentication.

As described above, the electronic device 101 according to various embodiments may transmit a request signal for authentication via MST or NFC, and may receive a response signal for authentication. Signaling for authentication via MST or NFC requires tagging, which is physically shown, and thus, the user of the electronic device 101 may prevent the right to control the electronic device 101 from being unintentionally exposed to an electronic device of an undesired user.

Figure 18:
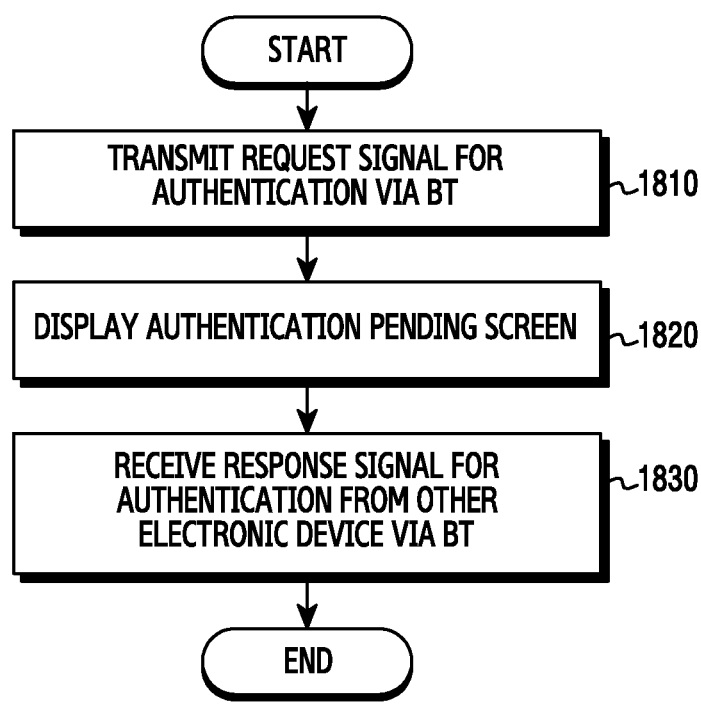
FIG. 18 is a flowchart illustrating another example of an operation of an electronic device for performing authentication according to various embodiments.

FIG. 18 is a flowchart illustrating another example of an operation of an electronic device for performing authentication according to various embodiments. Such operation may, for example, and without limitation, be performed by the electronic device 101 or a component (e.g., the processor 120 or the like) of the electronic device 101 illustrated in FIG. 1 or FIG. 4.

Figure 19:
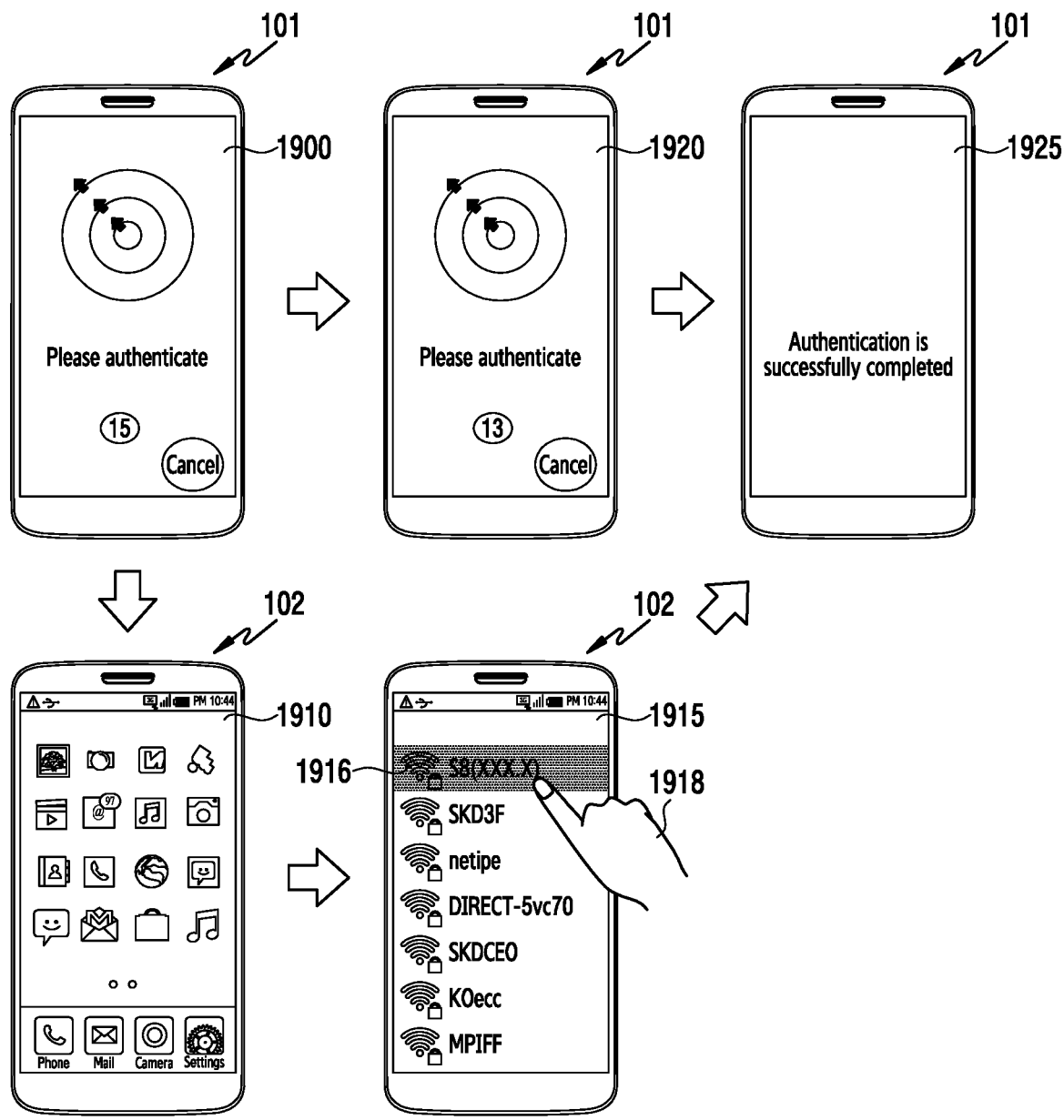
FIG. 19 is a diagram illustrating an example of screen display of an electronic device and another electronic device, which perform authentication according to various embodiments.

FIG. 19 is a diagram illustrating an example of screen display of an electronic device and another electronic device, which perform authentication according to various embodiments.

In FIG. 18, operations 1810, 1820, and 1830 may be associated with operation 520.

Referring to FIG. 18, in operation 1810, the processor 120 may transmit a request signal for authentication via Bluetooth. The request signal for authentication which is transmitted via Bluetooth may have wider coverage compared with (relative to) a request signal for authentication which is transmitted via MST or NFC. In other words, the request signal for authentication which is transmitted via Bluetooth may not require tagging or the like for reception. The request signal for authentication which is transmitted via Bluetooth may have coverage having an area corresponding an area that a vehicle occupies. The coverage may be configured by controlling the strength of transmission power of the request signal for authentication which is transmitted via Bluetooth.

In operation 1820, the processor 120 may display an authentication pending screen while the request signal for the authentication is transmitted. The authentication pending screen may include information for providing guidance for authentication. For example, referring to FIG. 19, the processor 120 may cause display an authentication pending screen 1900 via the display 160. The authentication pending screen 1900 may include one or more from among an animation providing guidance for authentication and indicating that a request signal for authentication is currently transmitted, text providing guidance for authentication, an indicator indicating the amount of time remaining until authentication is completed, and an object for cancelling authentication.

When the other electronic device 102 is located within the vehicle where the electronic device 101 is located, the other electronic device 102 may receive the request signal for authentication. In response to the reception of the request signal for authentication, the other electronic device 102 may include objects indicating a subject that transmits a signal related to Bluetooth together with an image indicating the received signal strength (RSS) of the signal related to Bluetooth, as illustrated in FIG. 19, and may display a screen 1915 changed from a home screen 1910. While the changed screen 1915 is displayed by the other electronic device 102, the electronic device 101 may display a screen 1920. The screen 1920 may be a screen changed from the screen 1900, and may include a smaller number of indicators when compared to those of the screen 1900. The objects in the screen 1915 may be capable of receiving input.

In operation 1830, the processor 120 may receive a response signal for authentication via Bluetooth from the other electronic device 102. For example, referring to FIG. 19, the other electronic device 102 may detect input 1918 on an object 1916 indicating the electronic device 101 from among the objects included in the screen 1915. In response to the detection of the input, the other electronic device 102 may transmit the response signal for authentication to the electronic device 101. The processor 120 may receive the response signal for authentication. In response to the reception of the response signal for authentication, the processor 120 may be changed to an authentication pending screen, and may display an authentication complete screen indicating that the authentication is successfully performed. For example, referring to FIG. 19, the processor 120 may display an authentication complete screen 1925 changed from the authentication pending screen 1920, in response to the reception of the response signal for authentication. The authentication complete screen 1925 may include text or an image indicating that authentication is successfully performed. The authentication complete screen 1925 may be switched to another screen (e.g., an idle screen, a home screen, a screen associated with an application for a navigation service, or the like) after being displayed during a predetermined period of time.

Although not illustrated in FIGS. 18 and 19, when a request signal for authentication and a response signal for authentication are exchanged via BT, the processor 120 may display a screen for inquiring about whether to authenticate a device that transmits the response signal for authentication, in response to reception of the response signal for authentication. The screen may include an executable object for approving authentication, and an executable object for not approving authentication. In other words, the processor 120 may further display a screen to confirm whether to perform authentication, whereby the right to control the electronic device 101 is prevented from being unintentionally transmitted to an electronic device of an unintended user.

As described above, the electronic device 101 according to various embodiments may transmit a request signal for authentication and may receive a response signal for authentication via Bluetooth. Signaling for authentication via Bluetooth may have relatively wider coverage, whereby higher convenience may be provided.

Figure 20:
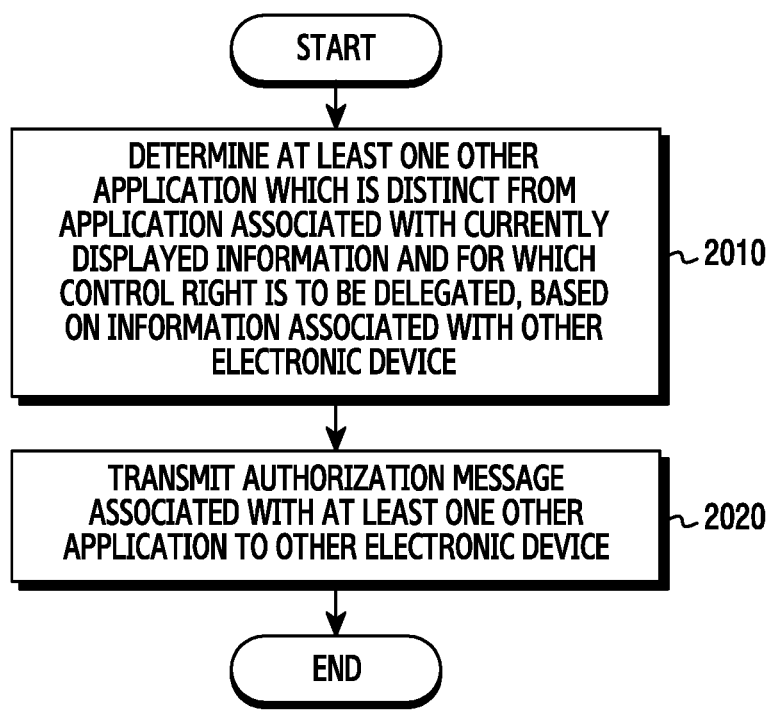
FIG. 20 is a flowchart illustrating an example of an operation of an electronic device for transmitting an authorization message according to various embodiments.

FIG. 20 is a flowchart illustrating an example of an operation of an electronic device for transmitting an authorization message according to various embodiments. Such operation may, for example, and without limitation, be performed by the electronic device 101 or a component (e.g., the processor 120 or the like) of the electronic device 101 illustrated in FIG. 1 or FIG. 4.

Figure 21:
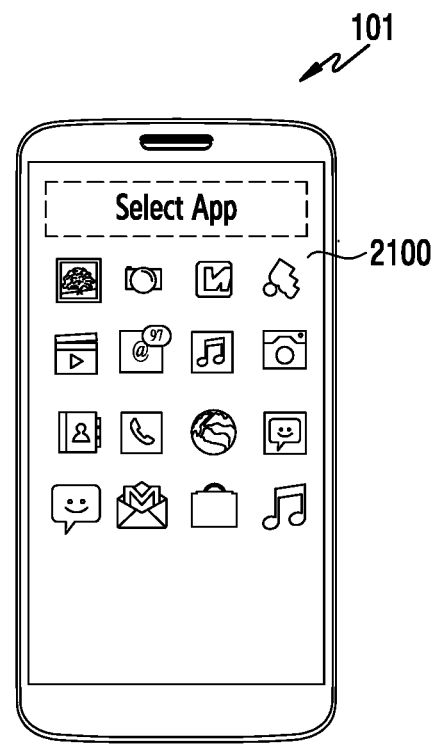
FIG. 21 is a diagram illustrating an example of a screen of an electronic device for selecting an item to be delegated according to various embodiments.

FIG. 21 is a diagram illustrating an example of a screen of an electronic device for selecting an item to be delegated according to various embodiments.

In FIG. 20, operation 2010 and operation 2020 may be associated with operation 540.

Referring to FIG. 20, in operation 2010, the processor 120 may determine at least one other application which is distinct from an application associated with currently displayed information, and for which control right is to be delegated, based on information associated with the other electronic device 102. For example, when the electronic device 101 currently displays information associated with an application for a navigation service, the processor 120 may delegate, to the other electronic device 102, the whole or a portion of the functions of at least one other application that is distinct from the application for navigation service. For example, referring to FIG. 21, the processor 120 may display a window 2100 for determining at least one other application from among other applications that are distinct from the application that provides the current service. The window 2100 may include objects indicating the other applications, and may include text providing guidance for selecting an application. The processor 120 may detect input on an object for selecting at least one other application from among the other applications. FIG. 21 illustrates an example of a window for selecting at least one application which is to be delegated from among a plurality of applications. However, a window displayed by the electronic device 101 may not be limited thereto. For example, the processor 120 may display a sub-menu indicating a function of each application in response to input on an object indicating each application. Based on user selection on the sub-menu, the processor 120 may set an item to be delegated based on a function.

In operation 2020, the processor 120 may transmit an authorization message associated with the at least one determined other application to the other electronic device 102. The authorization message may be transmitted at the initial authorization, or may be transmitted in the state in which another authorization has been performed. The authorization message may be transmitted in response to detection of input for selecting at least one other application in the window 2100.

Figure 22:
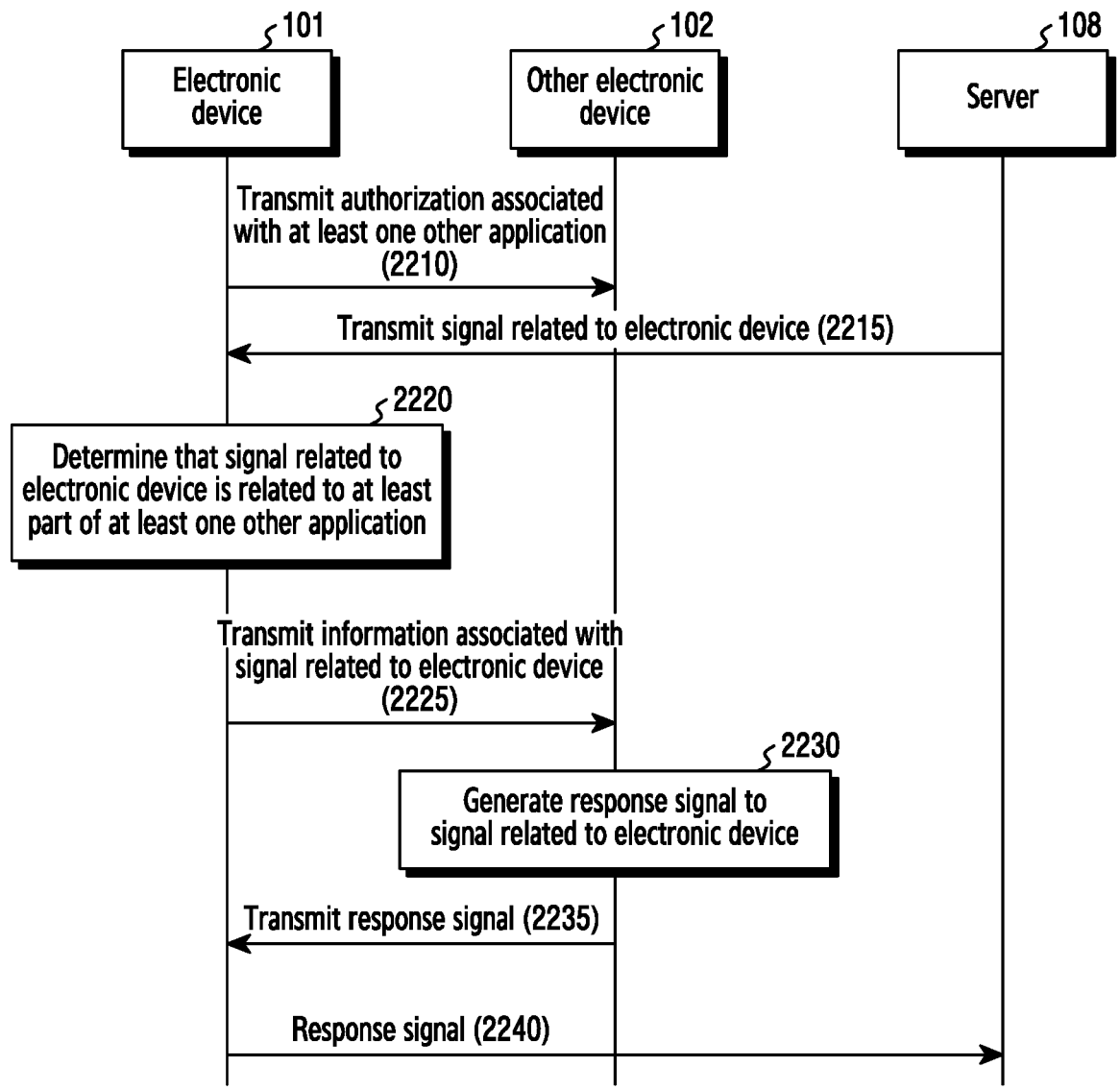
FIG. 22 is a signal flow diagram illustrating an example of a signal flow between an electronic device and other entities according to various embodiments.

FIG. 22 is a signal flow diagram illustrating an example of a signal flow between an electronic device and other entities according to various embodiments. Such signal flow may, for example, and without limitation, be performed by the electronic device 101, the other electronic device 102, and the server 108 of FIG. 2.

Referring to FIG. 22, in operation 2210, the electronic device 101 may transmit an authorization message associated with at least one other application to the other electronic device 102. The authorization message may be an authorization message that is initially transmitted after authentication is completed, or may be a message transmitted in the state in which authorization is in progress. The authorization message may include resource information or the like which is required for controlling the at least one other application (or a portion of the functions of the at least one other application). The other electronic device 102 may receive the authorization message.

In operation 2215, the server 108 may transmit a signal related to the electronic device 101 to the electronic device 101. For example, the signal related to the electronic device 101 may be traffic related to an incoming call service, a short message service (SMS), a messenger service transmitted from an external electronic device. The electronic device 101 may receive the signal related to the electronic device 101 in the state in which the electronic device 101 is located within a vehicle currently driving.

In operation 2220, the electronic device 101 may determine that the signal related to the electronic device 101 is associated with at least a part of the at least one other application for which control right is delegated to the other electronic device 102. For example, when the electronic device 101 delegates the right to control a reception call service to the other electronic device 102 in operation 2210, the electronic device 101 may identify or determine that traffic related to an incoming call service received in operation 2215 is traffic for which control right is delegated to the other electronic device 102 in operation 2220.

In operation 2225, the electronic device 101 may transmit information associated with the signal related to the electronic device 101 to the other electronic device 102, based on the determination. According to various embodiments, based on the determination, the electronic device 101 may transmit information associated with the signal related to the electronic device 101 to the other electronic device 102 such that the other electronic device 102 may control the signal related to the electronic device 101. The other electronic device 102 may receive information associated with the signal related to the electronic device.

In operation 2230, the other electronic device 102 may generate a response signal to the signal related to the electronic device 101. In order to generate the response signal according to embodiments, a passenger may be required to provide input to the other electronic device 102.

In operation 2235, the other electronic device 102 may transmit the response signal to the electronic device 101. The electronic device 101 may receive the response signal from the other electronic device 102.

In operation 2240, the electronic device 101 may provide, to the server 108, the response signal received from the other electronic device 102.

As described above, the electronic device 101 according to various embodiments may control a portion of the functions of the electronic device 101 via the other electronic device 102 via signaling between the electronic device 101 and the other electronic device 102 after transmitting an authorization message, without a driver's interaction to the electronic device 101. Via controlling performed in this manner, the electronic device 101 may provide higher safety to a driver and a passenger.

Figure 23:
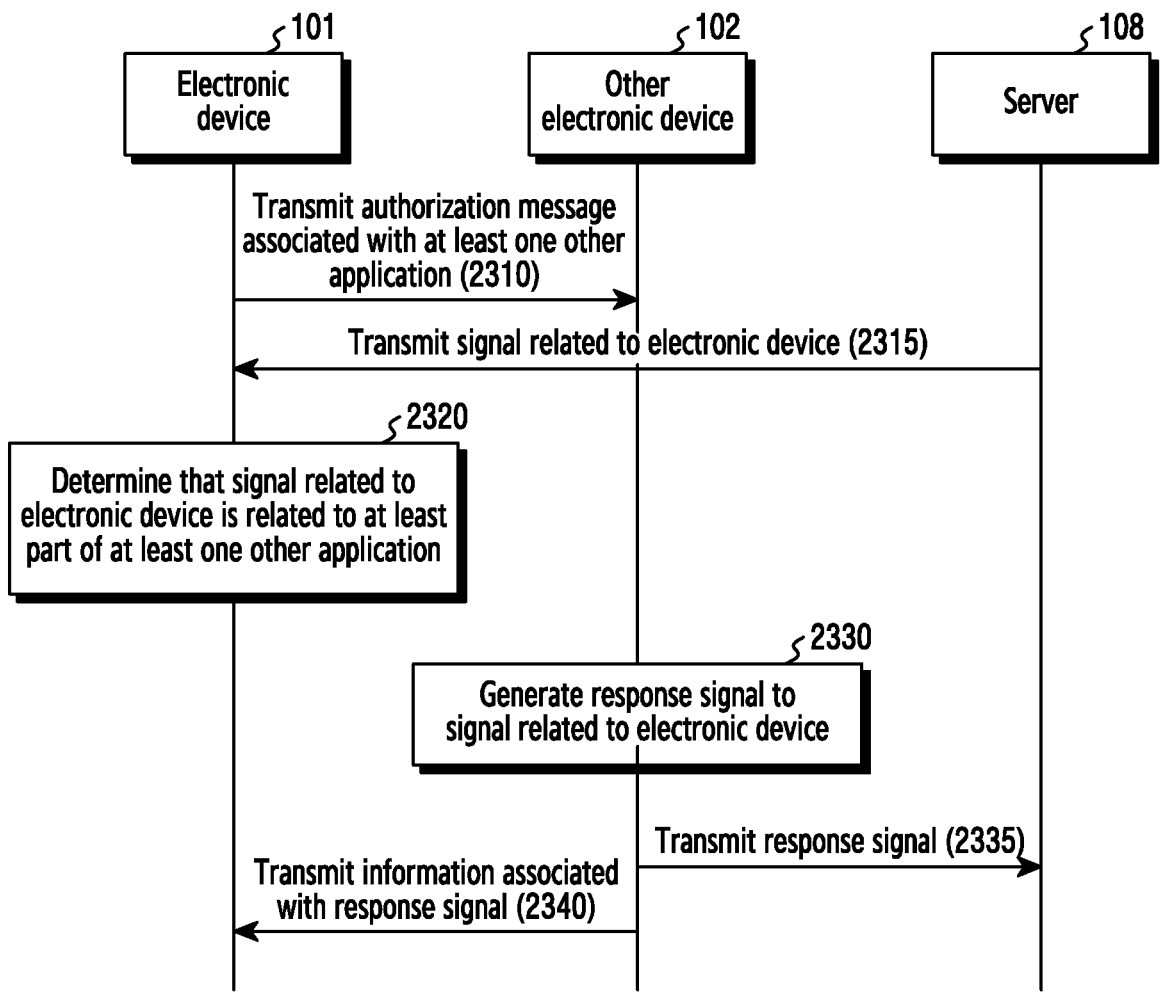
FIG. 23 is a signal flow diagram illustrating an example of a signal flow between an electronic device and other entities according to various embodiments.

FIG. 23 is a signal flow diagram illustrating an example of a signal flow between an electronic device and other entities according to various embodiments. Such signal flow may, for example, and without limitation, be performed by the electronic device 101, the other electronic device 102, and the server 108 of FIG. 2.

Referring to FIG. 23, in operation 2310, the electronic device 101 may transmit an authorization message associated with at least one other application to the other electronic device 102. The authorization message may be an authorization message that is initially transmitted after authentication is completed, or may be a message transmitted in the state in which authorization is in progress. The authorization message may include resource information or the like required for controlling the at least one other application. When a signal related to the at least one other application from the server 108 is received by the electronic device 101, the resource information may include information for overhearing or tapping the same. For example, the resource information may include one or more from among information associated with a frequency resource (e.g., a band) in which the signal related to the at least one other application is received, information associated with a time resource (e.g., a frame), and information associated with a description key. The resource information may include information required when the other electronic device 102 operates as the electronic device 101. For example, the resource information may include one or more from among information associated with an encryption key used by the electronic device 101 and identification information used when the electronic device 101 communicates with the server 108. The other electronic device 102 may receive the authorization message. The other electronic device 102 may perform monitoring so as to over-hear the signal related to the at least one other application, based on the resource information included in the authorization message.

In operation 2315, the server 108 may transmit a signal related to the electronic device 101 to the electronic device 101. The electronic device 101 may receive the signal related to the electronic device 101. When the signal related to the electronic device 101 is related to at least a part of the at least one other application, the other electronic device 102 may receive the signal related to the electronic device 101, based on the resource information. The reception of the signal by the other electronic device 102 may be transparent from the perspective of the server 108. In other words, the reception of the signal by the other electronic device 102 may not be recognized by the server 108.

In operation 2320, the electronic device 101 may determine that the signal related to the electronic device is related to at least a part of the at least one other application. When the signal related to the electronic device is related to at least a part of the at least one other application, the signal related to the electronic device may be processed by the other electronic device 102 based on authorization, and thus, the electronic device 101 may not perform an additional operation for processing the signal related to the electronic device 101.

In operation 2330, the other electronic device 102 may generate a response signal to the signal related to the electronic device 101. In FIG. 23, upon reception of the authorization message, the other electronic device 102 operates as the electronic device 101 with respect to the server 108, and thus, identification information included in the response signal may be configured as identification information of the electronic device 101.

In operation 2335, the other electronic device 102 may transmit the response signal to the server 108. The other electronic device 102 may transmit the response signal to the server 108, but the transmission of the response signal by the other electronic device 102 may be transparent from the perspective of the server 108. The server 108 may receive the response signal from the other electronic device 102. Although the server 108 receives the response signal from the other electronic device 102, a sender of the response signal that the server 108 recognizes may be the electronic device 101.

In operation 2340, the other electronic device 102 may transmit information associated with the response signal to the electronic device 101. The other electronic device 102 may transmit the information associated with the response signal to the electronic device 101, so as to change the state of the electronic device 101 based on the response signal, or so as to share a result of processing the signal related to the electronic device 101.

As described above, the electronic device 101 according to various embodiments may provide resource information associated with the at least one other application which is set as an item to be delegated, to the other electronic device 102 via signaling associated with authorization, whereby the other electronic device 102 may operate as the electronic device 101 with respect to only the item that is delegated.

Figure 24:
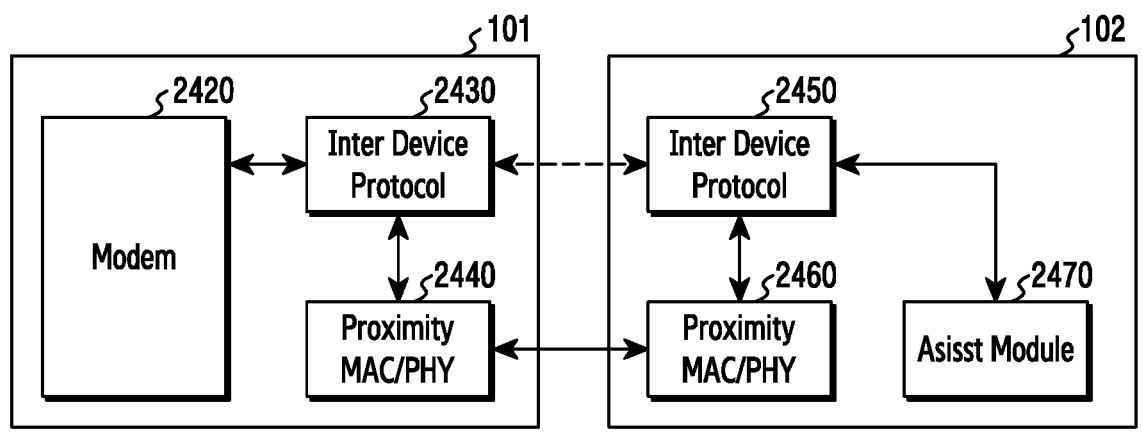
FIG. 24 is a block diagram illustrating an example of the protocol stacks of an electronic device and another electronic device, which provide over-hearing according to various embodiments.

FIG. 24 is a block diagram illustrating an example of the protocol stacks of an electronic device and another electronic device, which provide over-hearing according to various embodiments. Such protocol stacks may be included in the electronic device 101 and the other electronic device 102 of FIG. 1 or FIG. 4.

Referring to FIG. 24, the electronic device 101 may be configured to include a modem 2420, an inter-device protocol 2430, and a proximity MAC/PHY 2440.

The modem 2420 may communicate with the server 108 or the like. The modem 2420 may include protocol stacks (e.g., MAC, PHY) or the like for supporting broadband communication.

The inter-device protocol 2430 may include various circuitry and/or program elements to support an operation for resources associated with authorization by the electronic device 101. For example, the inter-device protocol 2430 may perform an operation for resources required for authorization designated (or determined) by the electronic device 101. For example, the inter-device protocol 2430 may identify an operation that a higher layer requests the electronic device 101 to perform, and may perform the identified operation. For example, the inter-device protocol 2430 may receive information associated with resources used for the authorization from the modem 2420. The inter-device protocol 2430 may determine resources or the like to be provided to the other electronic device 102, based on the information. The inter-device protocol 2430 may generate information associated with the determined resources. The inter-device protocol 2430 may transfer the generated information to the proximity MAC/PHY 2440. The proximity MAC/PHY 2440 may include various circuitry and/or program elements and be a MAC/PHY area where proximity communication is allowed. For example, the proximity MAC/PHY 2440 may perform proximity communication with the modem 2420 using other techniques (e.g., Wi-Fi, Bluetooth, or the like). The proximity MAC/PHY 2440 may perform an operation that is functionally independent from the modem 2420. The proximity MAC/PHY 2440 may transmit information transferred from the inter-device protocol 2430 to the other electronic device 102.

The other electronic device 102 may be configured to include an inter-device protocol 2450, a proximity MAC/PHY 2460, an assist module 2470, or the like.

The proximity MAC/PHY 2460 may include various circuitry and/or program elements and be a MAC/PHY area where proximity communication is allowed. For example, the proximity MAC/PHY 2460 may provide information received via the proximity MAC/PHY 2440 from the electronic device 101 to the inter-device protocol 2450. Also, the proximity MAC/PHY 2460 may transmit a report message (e.g., the information associated with the response signal in operation 2340 or the like) to the electronic device 101 via the proximity MAC/PHY 2460.

The inter-device protocol 2450 may include various circuitry and/or program elements to receive a request from the electronic device 101 via information provided from the proximity MAC/PHY 2460. The inter-device protocol 2450 may command the other electronic device 102 or a component included in the other electronic device 102 (e.g., the assist module 2470 or the like) to perform an operation associated with the received request of the electronic device 101. The inter-device protocol 2450 may provide, to the electronic device 101, a result associated with the command from the inter-device protocol 2450. In other words, the inter-device protocol 2450 may logically (or operably) perform communication with the inter-device protocol 2430 of the electronic device 101.

The assist module 2470 may include various circuitry and/or program elements to receive, from the inter-device protocol 2450, the whole or a part of the request from the electronic device 101. The assist module 2470 may perform various operations based on the received request.

The assist module 2470 may be configured as one of the various devices depending on the type of function delegated by the electronic device 101. For example, when the electronic device 101 requests reception of a wireless signal associated with a predetermined application, the assist module 2470 may be configured as a reception device associated with the predetermined application. The assist module 2470 may receive the wireless signal, based on the request. As another example, when the electronic device 101 requests reception and processing of a wireless signal associated with a predetermined application, the assist module 2470 may be configured as a reception device and a control device. The assist module 2470 may receive the wireless signal, and may process (control) the received wireless signal, based on the request.

The assist module 2470 may transfer, to the inter-device protocol 2450, a result associated with the request (or authorization) by the electronic device 101.

The inter-device protocol 2450 may generate a report message based on the result provided from the assist module 2470. The inter-device protocol 2450 may transfer the generated report message to the proximity MAC/PHY 2460.

The proximity MAC/PHY 2460 may transmit the report message to the electronic device 101 via the proximity MAC/PHY 2440.

The proximity MAC/PHY 2440 may transfer the received report message to the inter-device protocol 2430. The inter-device protocol 2430 may transfer the received report message to a higher layer, or to the modem 2420.

Figure 25:
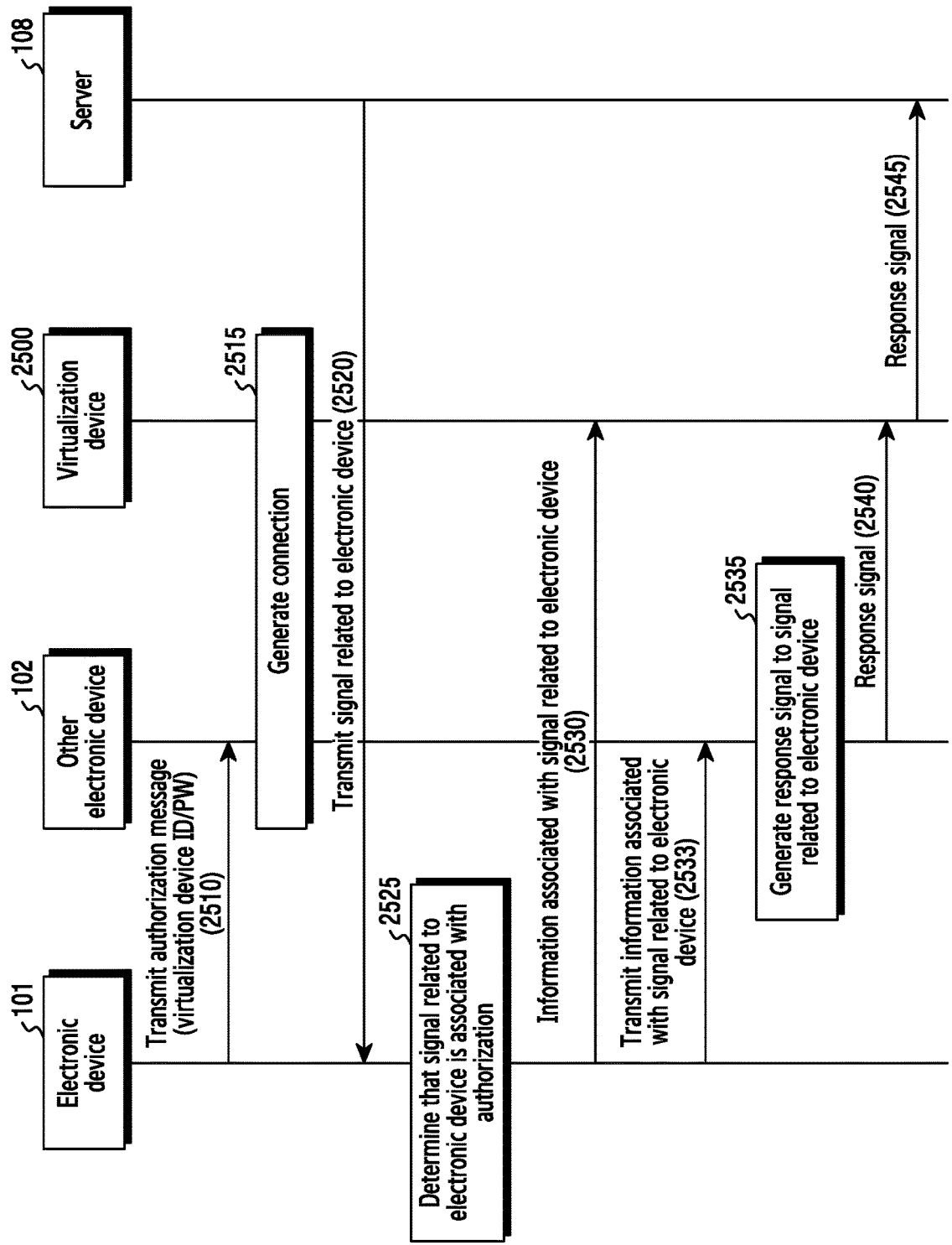
FIG. 25 is a signal flow diagram illustrating an example of another signal flow between an electronic device and other entities according to various embodiments.

FIG. 25 is a signal flow diagram illustrating an example of another signal flow between an electronic device and other entities according to various embodiments. Such signal flow may, for example, and without limitation, be performed by the electronic device 101, the other electronic device 102, and the server 108 of FIG. 2, and a virtualization device 2500.

Referring to FIG. 25, in operation 2510, the electronic device 101 may transmit an authorization message to the other electronic device 102. The authorization message may include information used for accessing and using the virtualization device 2500. For example, the authorization message may include information associated with an ID and a password of the virtualization device 2500. The other electronic device 102 may receive, from the electronic device 101, the authorization message including information used for accessing and using the virtualization device 2500.

In operation 2515, the other electronic device 102 may generate a connection with the virtualization device 2500, based at least in part on the information used for accessing and using the virtualization device 2500 included in the authorization message. The virtualization device 2500 may be a device for providing a work area to another device.

In operation 2520, the server 108 may transmit a signal related to the electronic device 101 to the electronic device 101.

In operation 2525, the electronic device 101 may determine that the signal related to the electronic device 101 is associated with authorization. For example, the electronic device 101 may determine that the signal related to the electronic device 101 is associated with authorization, in response to the identification that the signal related to the electronic device 101 is related to a function or an application delegated to the other electronic device 102.

In operation 2530, the electronic device 101 may provide information associated with the signal related to the electronic device 101 to the virtualization device 2500. The electronic device 101 may transmit the information associated with the signal related to the electronic device 101 to the virtualization device 2500, so as to transfer processing of the signal related to the electronic device 101 to the other electronic device 102. The virtualization device 2500 may receive information associated with the signal related to the electronic device 101.

In operation 2533, the electronic device 101 may transmit or provide the information associated with the signal related to the electronic device 101 to the other electronic device 102. The other electronic device 102 may receive the information associated with the signal related to the electronic device 101.

In operation 2535, the other electronic device 102 may generate a response signal to the signal related to the electronic device 101. The other electronic device 102 may generate a response signal to the signal related to the electronic device 101, via association with the virtualization device 2500. Although operation 2535 in FIG. 25 is shown in association with the other electronic device 102 in order to indicate that the operation is performed by the other electronic device 102, operation 2535 may be performed in the virtualization device 2500.

In operation 2540, the other electronic device 102 may provide the response signal generated by the other electronic device 102 in the virtualization device 2500 to the virtualization device 2500.

In operation 2545, the virtualization device 2500 may provide the response signal to the server 108. Although not illustrated in FIG. 25, the virtualization device 2500 may provide information associated with the response signal to the electronic device 101.

As described above, the electronic device 101 according to various embodiments may use the virtualization device 2500 in signaling for authorization, whereby the other electronic device 102 may perform an application or function that is delegated even though the application or function that is delegated is beyond the capability of the other electronic device 102 (e.g., the corresponding application is not stored in the other electronic device 102 or the like).

Figure 26:
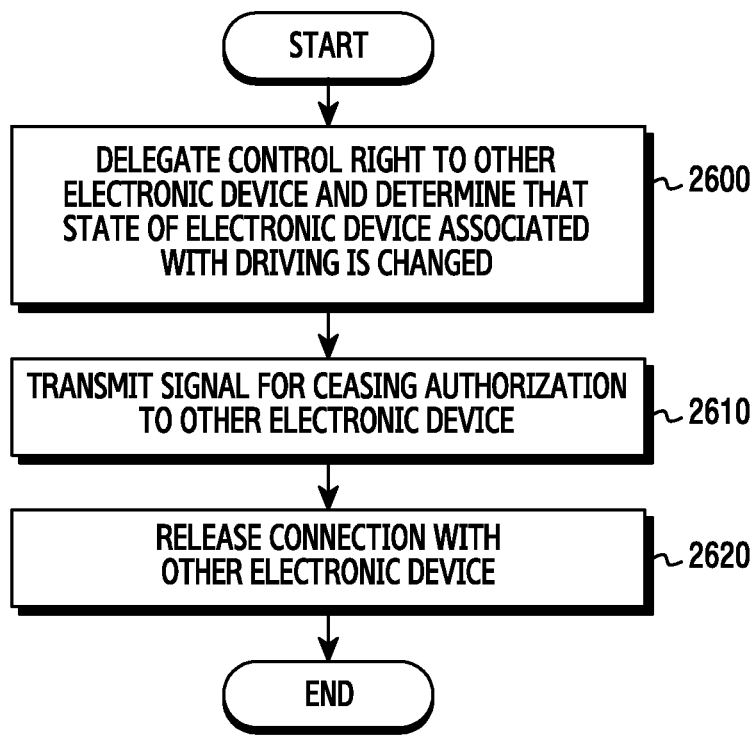
FIG. 26 is a flowchart illustrating an example of an operation of an electronic device for releasing a connection for authorization according to various embodiments.

FIG. 26 is a flowchart illustrating an example of an operation of an electronic device for releasing a connection for authorization according to various embodiments. Such operation may, for example, and without limitation, be performed by the electronic device 101 or a component (e.g., the processor 120 or the like) of the electronic device 101 illustrated in FIG. 1 or FIG. 4.

Figure 27:
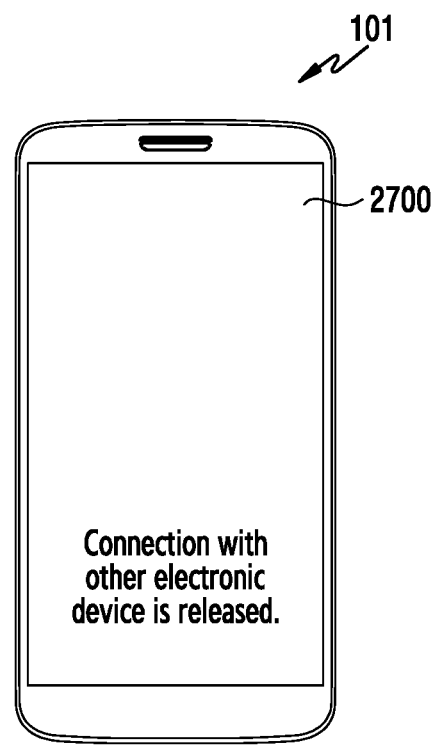
FIG. 27 is a diagram illustrating an example of a screen displayed in an electronic device that releases a connection according to various embodiments.

FIG. 27 is a diagram illustrating an example of a screen displayed in an electronic device that releases a connection according to various embodiments.

Referring to FIG. 26, in operation 2600, the processor 120 may determine that the state of the electronic device 101 associated with driving is changed, after delegating the control right to the other electronic device 102. According to various embodiments, the processor 120 may determine that the state of the electronic device 101 associated with driving is changed, based on a signal related to a vehicle or driving, which is transmitted from the electronic device 101, is generated in the electronic device 101, or is received by the electronic device 101. For example, based on identifying that the location of the electronic device 101 is changed from the inside of the vehicle to the outside, based on the signal, the processor 120 may determine that the state of the electronic device 101 is not associated with driving (e.g., the state associated with driving is changed). In this instance, it is required to withdraw the delegated control right from the other electronic device 102.

In operation 2610, the processor 120 may transmit a signal for ceasing authorization to the other electronic device 102. The signal for ceasing the authorization may include information indicating cancelation of the whole or a part of the delegated function. For example, the signal for ceasing (or releasing) the authorization may include information indicating an item of which delegation is to be cancelled, information associated with a point in time at which the delegation is cancelled, and the like.

In operation 2620, the processor 120 may release a connection with the other electronic device 102. According to various embodiments, the processor 120 may release the connection with the other electronic device 102, when an acknowledgement message from the other electronic device 102 is received in response to the signal for ceasing the authorization. When the connection is released, the processor 120 may display a message indicating that the connection is released. For example, referring to FIG. 27, the processor 120 may display a message indicating that the connection with the other electronic device is released in a screen 2700 via the display 160.

As described above, when the state of the electronic device 101 associated with driving is changed, the electronic device 101 according to various embodiments may cancel or release an item associated with authorization, whereby the privacy of a user who is in the state associated with driving may be protected. The electronic device 101 according to various embodiments may cancel the whole or a part of the item associated with authorization, whereby the amount of power consumed by signaling for the authorization may be decreased.

Figure 28:
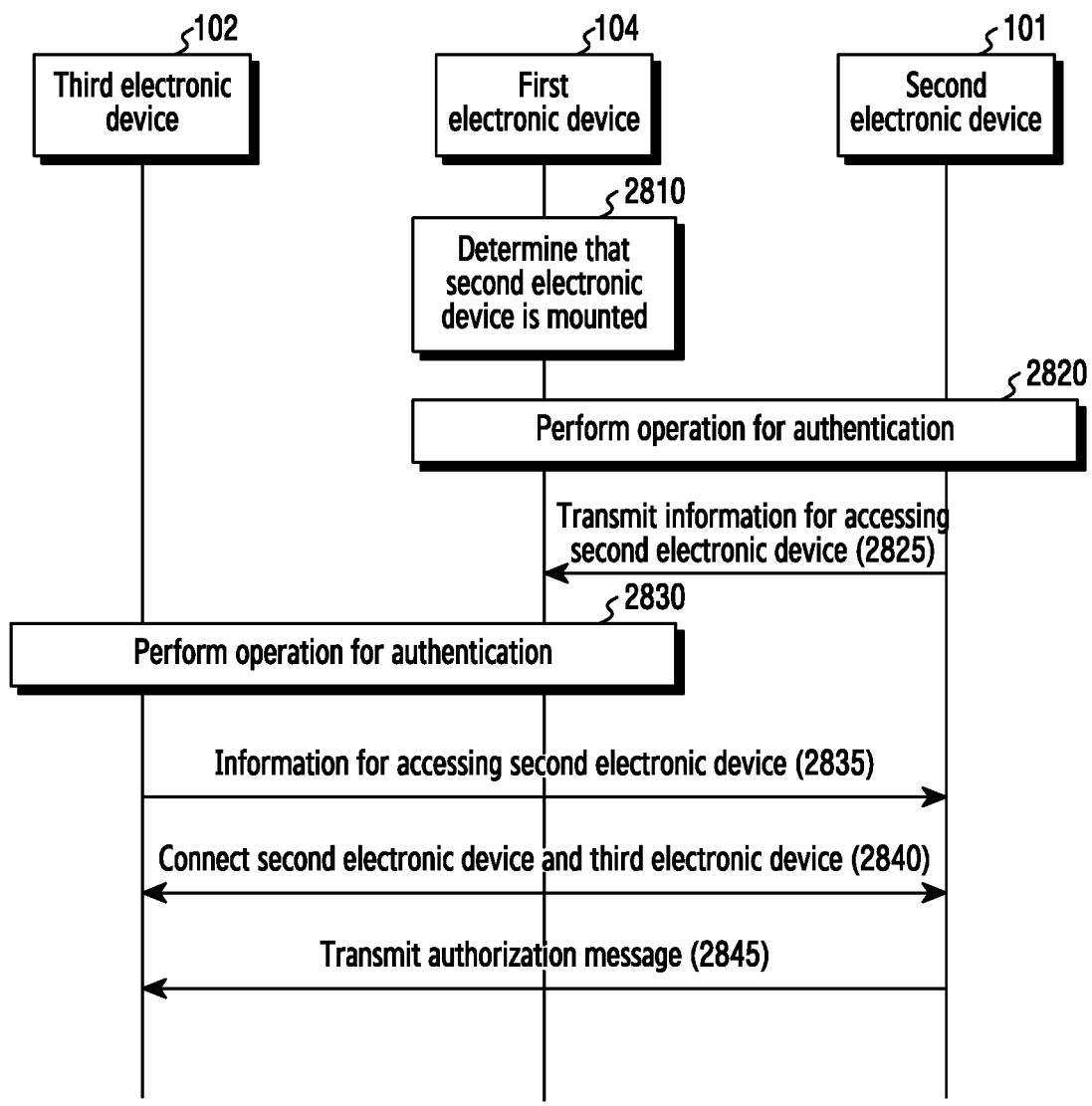
FIG. 28 is a signal flow diagram illustrating another example of a signal flow between an electronic device and other entities according to various embodiments.

FIG. 28 is a signal flow diagram illustrating another example of a signal flow between an electronic device and other entities according to various embodiments. Such signal flow may, for example, and without limitation, be performed by the second electronic device 101, the third electronic device 102, the first electronic device 104, and the server 108 of FIG. 1 or FIG. 3.

Referring to FIG. 28, in operation 2810, the first electronic device 104 may identify (determine) that the second electronic device 101 is mounted. The first electronic device 104 may be a device that may be embedded in the vehicle or attached to the inside of the vehicle. The first electronic device 104 may be a device for providing power to the mounted second electronic device 101. The first electronic device 104 may identify that the second electronic device 101 is wirelessly or wiredly connected for charging.

In operation 2820, the first electronic device 104 and the second electronic device 101 may perform an operation for authentication. For example, the authentication may be an operation of tagging the second electronic device 101 to the first electronic device 104. The authentication may be performed in the same manner as described in FIGS. 16 to 19.

In operation 2825, the second electronic device 101 may transmit, to the first electronic device 104, information for accessing the second electronic device 101. In response to completion of the authentication, the second electronic device 101 may transmit, to the first electronic device 104, information for accessing the second electronic device 101. The information for accessing the second electronic device 101 may be transmitted to the first electronic device 104 so as to provide the information for accessing the second electronic device 101 to a counterpart to be authorized by the second electronic device 101. In other words, the information for accessing the second electronic device 101 may be provided to another electronic device (e.g., the third electronic device 102 or the like) via the first electronic device 104. The information for accessing the second electronic device 101 may be removed from the first electronic device 104 or may be changed to an invalid state as a designated period of time elapses for the security of the second electronic device 101.

In operation 2830, the first electronic device 104 may perform an operation of authentication with the third electronic device 102. For example, the authentication may be an operation of tagging the third electronic device 102 to the first electronic device 104. The authentication may be performed in the same manner as described in FIGS. 16 to 19. Although not illustrated in FIG. 28, when the authentication is successfully performed or when the authentication is in progress, the information for accessing the second electronic device 101 may be provided to the third electronic device 102 from the first electronic device 104.

In operation 2835, the third electronic device 102 may attempt to access the second electronic device 101 using the information for accessing the second electronic device 101.

In operation 2840, the third electronic device 102 and the second electronic device 101 may generate a connection.

In operation 2845, the second electronic device 101 may transmit an authorization message to the third electronic device 102 via the generated connection.

As described above, the second electronic device 101 according to various embodiments may use the first electronic device 104, which is another electronic device associated with a vehicle, as a medium for sharing access information, thereby efficiently performing signaling associated authorization.

According to various embodiments, the second electronic device 101 and the third electronic device 102 may perform operations 2820 and 2830 for authentication via the first electronic device 104. Each of the electronic devices (e.g., the second electronic device 101, the third electronic device 102, or the like) that perform authentication with the first electronic device 104 may establish (or configure) the relationship with a plurality of electronic devices in the vehicle via the authorization message. For example, the hierarchy between the second electronic device 101 and the third electronic device 102 may be established according to various criteria, such as whether the second electronic device 101 is held, the order of authentication, an electronic device that is previously designated as a master (e.g., a main device), and the like, based on the authorization message.

Figure 29:
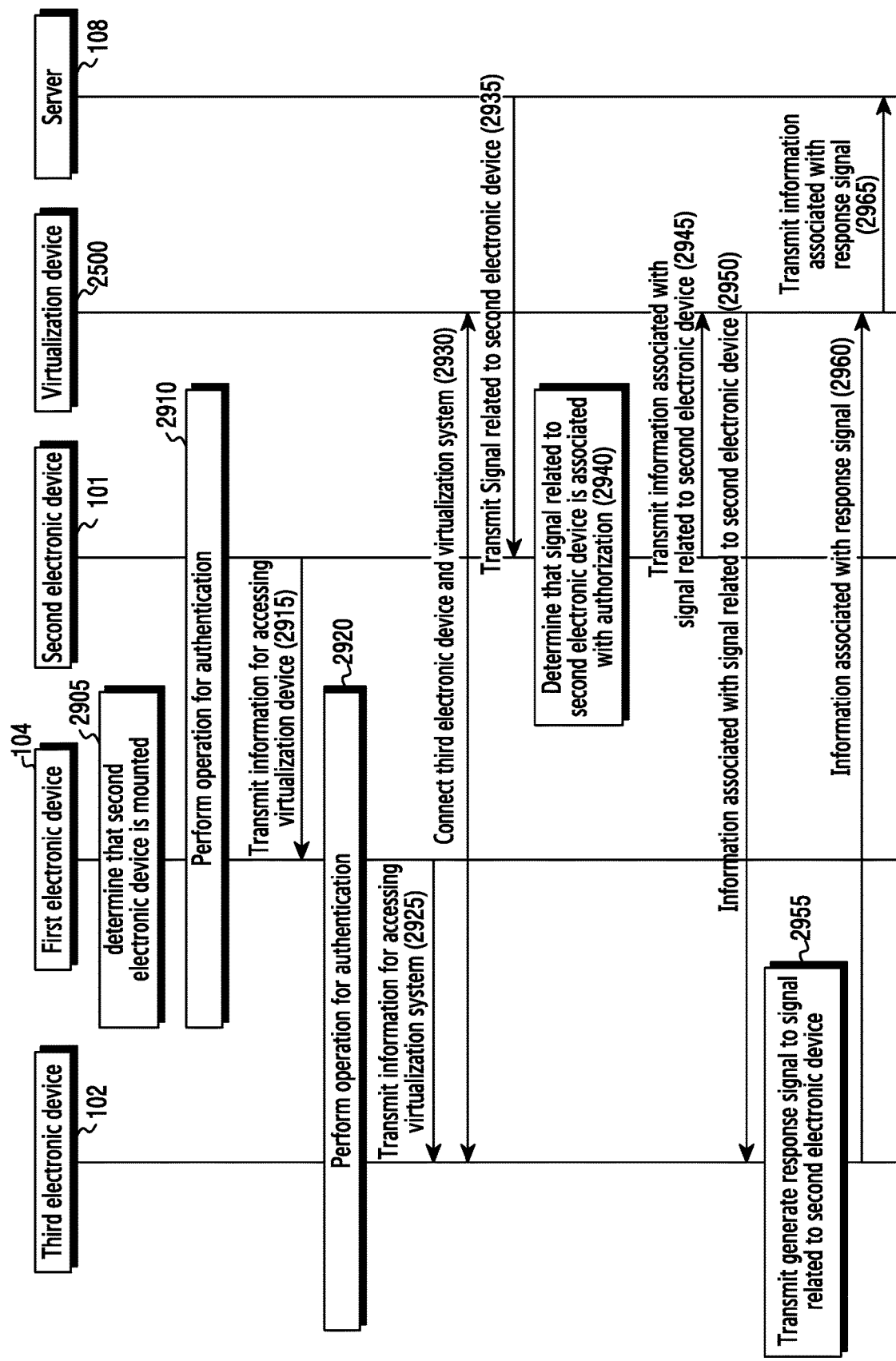
FIG. 29 is a signal flow diagram illustrating another example of a signal flow between an electronic device and other entities according to various embodiments.

FIG. 29 is a signal flow diagram illustrating another example of a signal flow between an electronic device and other entities according to various embodiments. Such signal flow may, for example, and without limitation, be performed by the second electronic device 101, the third electronic device 102, the first electronic device 104, and the server 108 of FIG. 1 or FIG. 3.

Referring to FIG. 29, operation 2905 and operation 2910 may correspond to operation 2810 and operation 2820 illustrated in FIG. 28.

In operation 2915, the second electronic device 101 may transmit, to the first electronic device 104, information for accessing the virtualization device 2500. The second electronic device 101 may transmit the information for accessing the virtualization device 2500 to the first electronic device 104, so as to provide the information for accessing the virtualization device 1500 to another electronic device (e.g., the third electronic device 102). The first electronic device 104 may receive the information for accessing the virtualization device 2500 from the second electronic device 101.

Operation 2920 may correspond to operation 2830 of FIG. 28.

In operation 2925, the first electronic device 104 may transmit, to the third electronic device 102, the information for accessing the virtualization device 2500 provided from the second electronic device 101.

In operation 2930, the third electronic device 102 may generate a connection with the virtualization device 2500. Via the connection, the third electronic device 102 may use an interface in the virtualization device 2500 as its work field.

In operation 2935, the server 108 may transmit a signal related to the second electronic device 101. The second electronic device 101 may receive the signal related to the second electronic device 101.

In operation 2940, the second electronic device 101 may determine that the signal related to the second electronic device 101 is related to authorization associated with the third electronic device 102.

In operation 2945, the second electronic device 101 may transmit information associated with the signal related to the second electronic device 101 to the virtualization device 2500, based on the determination. The virtualization device

2500 may receive the information associated with the signal related to the second electronic device 101.

In operation 2950, the virtualization device 2500 may provide the information associated with the signal related to the second electronic device 101 to the third electronic device 102. For example, the virtualization device 2500 may provide the information associated with the signal related to the second electronic device 101 to the third electronic device 102 via the interface of the virtualization device 2500.

In operation 2955, the third electronic device 102 may generate a response signal to the signal related to the second electronic device 101, via the interface of the virtualization device 2500. The third electronic device 102 may generate the response signal in the interface provided by the virtualization device 2500, using the capability of the third electronic device 102.

In operation 2960, the third electronic device 102 may provide information associated with the response signal to the virtualization device 2500. The third electronic device 102 may provide the information associated with the response signal to the virtualization device 2500 via the interface of the virtualization device 2500.

In operation 2965, the virtualization device 2500 may transmit the information associated with the response signal to the server 108. Although not illustrated in FIG. 29, the virtualization device 2500 may transmit the information associated with the response signal to the second electronic device 101.

As described above, the second electronic device 101 according to various embodiments is capable of performing authorization using the virtualization device 2500 even though an application or a function that is delegated is not installed in the third electronic device 102.

Figure 30:
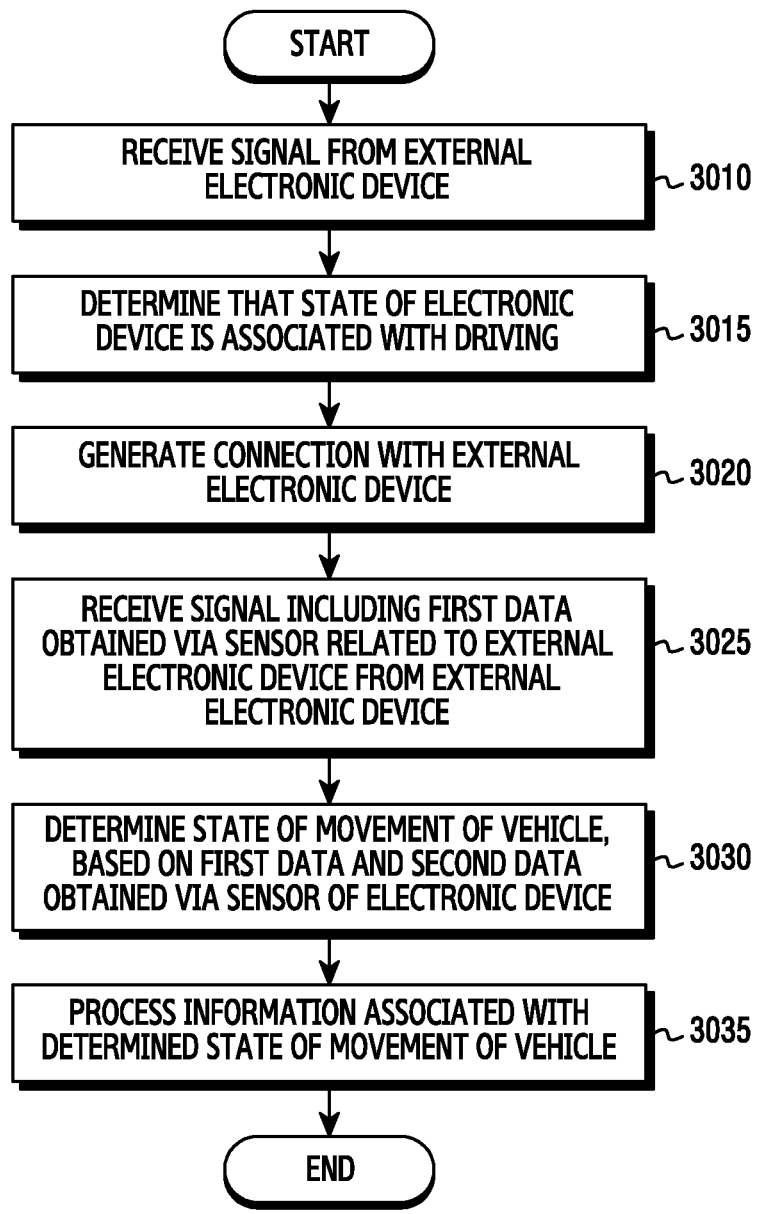
FIG. 30 is a flowchart illustrating an example of an operation of an electronic device for determining the state of movement of a vehicle according to various embodiments.

FIG. 30 is a flowchart illustrating an example of an operation of an electronic device for determining the state of movement of a vehicle according to various embodiments. Such operation may, for example, and without limitation, be performed by the electronic device 101 or a component (e.g., the processor 120 or the like) of the electronic device 101 illustrated in FIG. 1 or FIG. 4.

Referring to FIG. 30, in operation 3010, the processor 120 may receive a signal from an external electronic device (e.g., the first electronic device 104 of FIG. 3 or the like). The external electronic device may be a charging device embedded in a vehicle or attached to the internal surface of the vehicle. The external electronic device may transmit the signal so as to provide power to the electronic device 101. According to embodiments, the signal may include identification information of the external electronic device.

In operation 3015, the processor 120 may determine that the state of the electronic device 101 is associated with driving. For example, the processor 120 may determine that the state of the electronic device 101 is associated with driving via the process, such as operation 510.

In operation 3020, the processor 120 may generate a connection with the external electronic device. According to various embodiments, the processor 120 may generate the connection with the external electronic device, in response to the determination.

In operation 3025, the processor 120 may receive, from the external electronic device, a signal including first data obtained via a sensor related to the external electronic device. The sensor related to the external electronic device may be a sensor included in the external electronic device, or may be a sensor included inside the vehicle operably coupled with the external electronic device. According to various embodiments, the signal including the first data obtained via the sensor related to the external electronic device may be received based on a request (not illustrated) from the electronic device 101. According to various embodiments, the signal including the first data obtained via the sensor related to the external electronic device may be received based on a protocol, without a separate request from the electronic device 101.

In operation 3030, the processor 120 may determine the state of movement of the vehicle, based on the first data and second data obtained via the sensor module 176 of the electronic device 101. The electronic device 101 and the external electronic device may exist in different environments depending on the state of movement of the vehicle. Accordingly, combining the first data and the second data is to accurately determine the state of movement of the vehicle.

In operation 3035, the processor 120 may process information associated with the determined state of movement of the vehicle. According to various embodiments, the processor 120 may store the information associated with the determined state of movement of the vehicle. According to various embodiments, the processor 120 may provide the information associated with the determined state of movement of the vehicle to another electronic device, such as the server 108. The provided information associated with the state of movement of the vehicle may be used for checking the state of the vehicle, or may be used for obtaining information associated with driving habits of a driver related to the electronic device 101. According to various embodiments, the processor 120 may display the information associated with the determined state of movement of the vehicle via the display 160.

As described above, the electronic device 101 according to various embodiments may determine the state of movement of the vehicle where the electronic device 101 is located, based on data obtained via the sensor related to the external electronic device in addition to data obtained via the sensor of the electronic device 101. Via the determination performed in this manner, the electronic device 101 may provide more accurate information.

Figure 31:
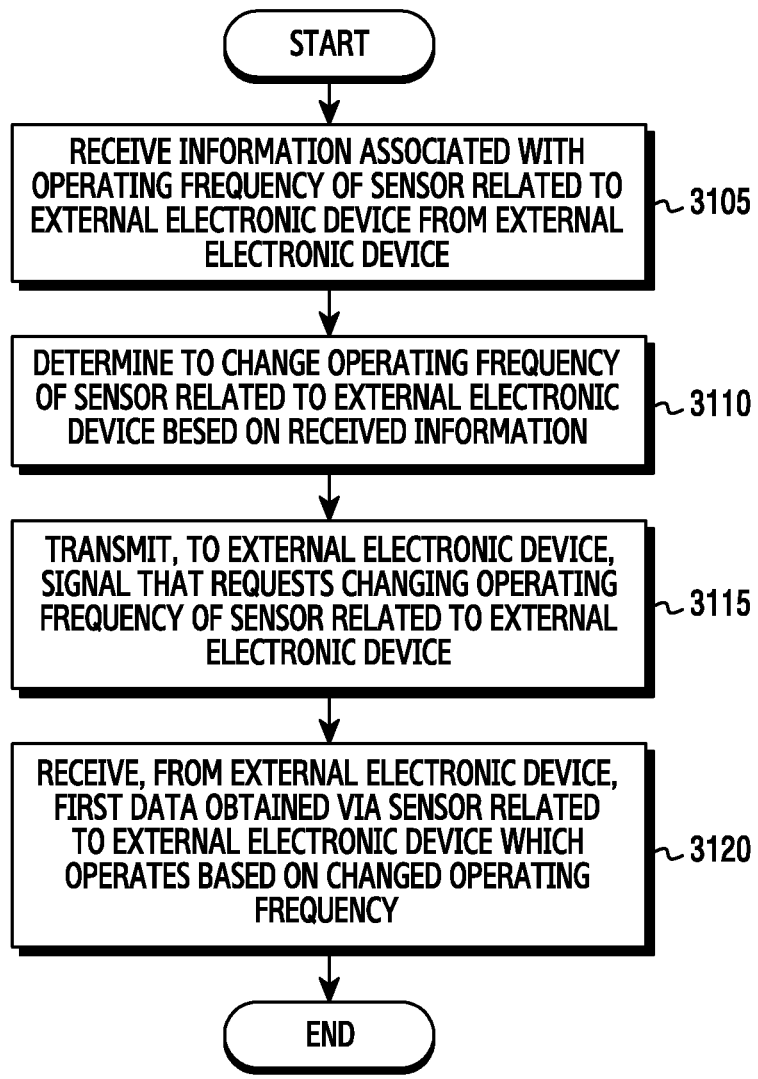
FIG. 31 is a flowchart illustrating an example of an operation of an electronic device for controlling an operating frequency of a sensor according to various embodiments.

FIG. 31 is a flowchart illustrating an example of an operation of an electronic device for controlling an operating frequency of a sensor according to various embodiments. Such operation may, for example, and without limitation, be performed by the electronic device 101 or a component (e.g., the processor 120 or the like) of the electronic device 101 illustrated in FIG. 1 or FIG. 4.

In FIG. 31, operations 3105 to 3120 may be associated with operation 3025.

Referring to FIG. 31, in operation 3105, the processor 120 may receive, from an external electronic device, information associated with the operating frequency of a sensor related to the external electronic device. According to various embodiments, the processor 120 may receive the information associated with the operating frequency of the sensor related to the external electronic device, which is transmitted from the external electronic device in response to generation of a connection with the external electronic device.

In operation 3110, the processor 120 may determine to change the operating frequency of the sensor related to the external electronic device, based on the received information. For example, the operating frequency included in the sensor module 176 of the electronic device 101 is the same as or similar to the operating frequency of the sensor related to the external electronic device, the processor 120 may determine to change the operating frequency of the sensor related to the external electronic device in order to secure diversity for measurement. For example, the processor 120 may determine to increase or decrease the operating frequency of the sensor related to the external electronic device.

In operation 3115, the processor 120 may transmit a signal that requests changing the operating frequency of the sensor related to the external electronic device to the external electronic device. For example, the signal that requests changing the operating frequency of the sensor related to the external electronic device may include information associated with a value or a range indicating a changed operating frequency, information associated with a point in time at which the operating frequency is to be changed, or the like.

In operation 3120, the processor 120 may receive, from the external electronic device, first data obtained via the sensor related to the external electronic device that operates based on the changed operating frequency. According to various embodiments, the processor 120 may receive the first data measured based on the changed frequency.

As described above, the electronic device 101 according to various embodiments may secure the diversity for measurement by changing the operating frequency of the sensor, whereby the state of movement of the vehicle where the electronic device 101 is located may be accurately recognized.

Figure 32:
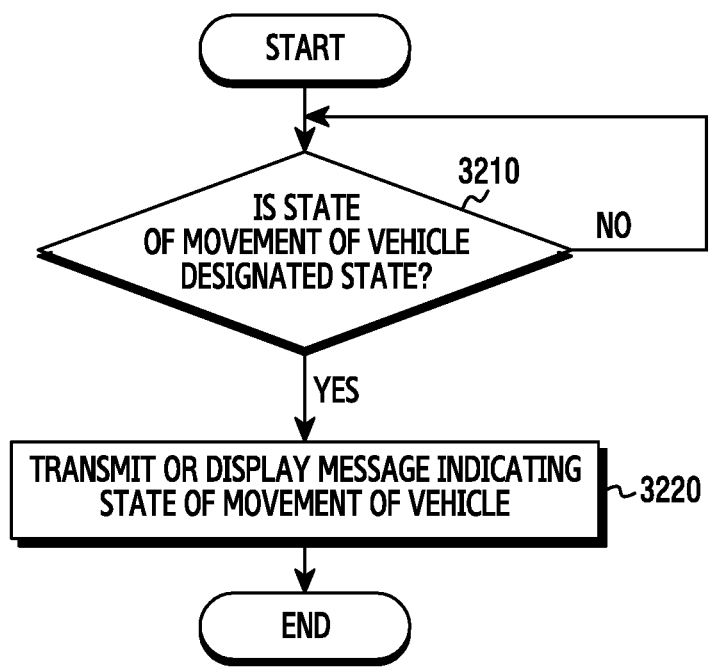
FIG. 32 is a flowchart illustrating an example of an operation of an electronic device for processing information associated with the state of movement of a vehicle according to various embodiments.

FIG. 32 is a flowchart illustrating an example of an operation of an electronic device for processing information associated with the state of movement of a vehicle according to various embodiments. Such operation may, for example, and without limitation, be performed by the electronic device 101 or a component (e.g., the processor 120) of the electronic device 101 illustrated in FIG. 1 or FIG. 4.

Figure 33:
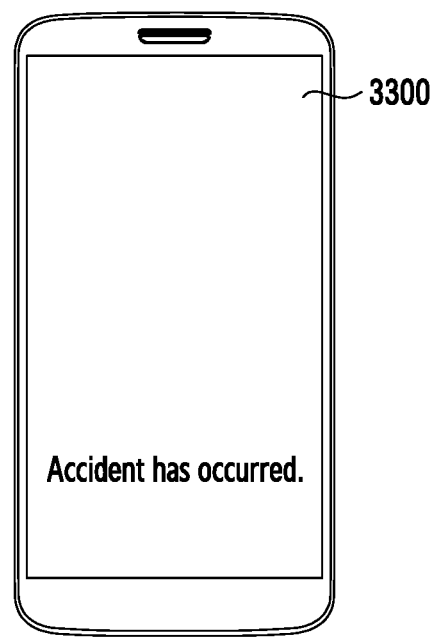
FIG. 33 is a diagram illustrating an example of the configuration of display of information associated with the state of movement of a vehicle according to various embodiments.

FIG. 33 is a diagram illustrating an example of the configuration of display of information associated with the state of movement of a vehicle according to various embodiments.

In FIG. 32, operation 3210 and operation 3220 may be associated with operation 3035.

Referring to FIG. 32, in operation 3210, the processor 120 may identify (determine) whether the state of movement of a vehicle is a designated state. The designated state may be used for identifying whether the state of movement of the vehicle is normal. For example, the designated state indicates an event in which a difference between first data and second data falls outside the designated range. The fact that the difference between the first data and the second data is relatively high may indicate that a difference between the state of the electronic device 101 and the state of an external electronic device or the vehicle is high. In other words, the fact that the difference between the first data and the second data is relatively high may indicate that the state of the vehicle is abnormal (e.g., accident state). When the state of movement of the vehicle is different from the designated state, the processor 120 may continuously perform identification according to operation 3210. Unlike the above, when the state of movement of the vehicle is the designated state, the processor 120 may perform operation 3220.

In operation 3220, the processor 120 may transmit or display a message indicating the state of movement of the vehicle. For example, the processor 120 may transmit the message indicating the state of movement of the vehicle to another electronic device related to a number designated by setting or a user, or an electronic device related to an organization that provides a disaster service. The message may indicate that the vehicle has an accident, or may indicate that the situation calls for action for the vehicle. As another example, the processor 120 may display a message indicating the state of movement of the vehicle by the display 160 or another electronic device. For example, referring to FIG. 33, the processor 120 may display a message indicating that an accident has occurred on a screen 3300. The subject that displays the message may be the electronic device 101, or another electronic device that interoperates with the electronic device 101.

As described above, the electronic device 101 according to various embodiments may determine the state of movement of the vehicle, based on data obtained via the sensor in the electronic device 101 and data obtained via another sensor associated with the vehicle, whereby the emergency situation may be accurately recognized and a quick action for the emergency situation may be led.

As described above, the method of an electronic device according to various embodiments may include: receiving, from an external electronic device operably coupled to the electronic device, a request associated with transferring a portion of the right capable of controlling the electronic device; if the electronic device is performing a function associated with driving, based at least on the request, transferring the portion of the right to the external electronic device; and if the electronic device is performing a function not associated with driving, based at least on the request, restricting to transfer the portion of the right to the external electronic device. According to various embodiments, the method may further include: receiving, from another external electronic device embedded in a vehicle or attachable to the vehicle, a first signal; and in response to the reception of the first signal, determining that the electronic device is performing the function associated with driving. For example, the first signal is received from the other external electronic device so as to provide power to the battery of the electronic device, and includes information for identifying the vehicle or the other external electronic device. For example, the other external electronic device may be a beacon device that periodically transmits the first signal when power is provided to the other external electronic device, and the operation of determining that the electronic device is performing the function associated with driving may include: determining, based on identification information of the beacon device included in the first signal, that the electronic device is located within the vehicle; and determining, based on determining that the electronic device is located within the vehicle, that the electronic device is performing the function associated with driving.

According to various example embodiments, the method may further include: transmitting, toward the vehicle, a first signal for releasing a door lock of the vehicle; and determining that the electronic device is performing the function associated with driving, in response to the transmission of the first signal.

According to various example embodiments, the method may include: generating a first signal indicating the movement velocity of the electronic device using one or more sensors of the electronic device; and in response to identifying that the movement velocity is higher than or equal to a reference velocity, determining that the electronic device is performing the function associated with driving.

According to various example embodiments, the method may further include: receiving, from another external electronic device including at least one sensor, a first signal including identification information of the other external electronic device, the other external electronic device being embedded in a vehicle or attachable to the vehicle; generating a connection between the other external electronic device and the electronic device, based at least in part on the identification information of the other external electronic device; transmitting, to the other external electronic device via the connection, a second signal requesting first data obtained via the at least one sensor; receiving, from the other external electronic device via the connection, a third signal including the first data obtained via the at least one sensor; determining the state of movement of the vehicle, based at least in part on the first data and second data obtained via one or more sensors of the electronic device; and transmitting, to other electronic device, information associated with the state of the movement of the vehicle. For example, the operation of transmitting the information associated with movement of the vehicle to the other electronic device may include: identifying whether the state of the movement of the vehicle corresponds to a designated state; and transmitting the information associated with the state of the movement of the vehicle to the other electronic device in response to identifying that the state of the movement of the vehicle corresponds to the designated state. For example, the operation of transmitting the information associated with the state of movement of the vehicle may include: in response to identifying that a difference between the first data and the second data falls outside a designated range, identifying that the state of the movement of the vehicle corresponds to the designated state; and transmitting, to the other electronic device, the information associated with the state of the movement of the vehicle that includes data indicating that an accident associated with the vehicle occurs, in response to identifying that the state of the movement of the vehicle corresponds to the designated state.

According to various example embodiments, the operation of restricting transferring the portion of the right to the external electronic device may include: determining that the electronic device does not perform the function associated with driving based at least in part on a signal that is generated, transmitted, or received by the electronic device, after transferring the portion of the right to the external electronic device; and in response to identifying that the electronic device does not perform the function associated with driving, restricting transferring the portion of the right to the external electronic device.

According to various example embodiments, the method may include: determining that the electronic device is performing the function associated with driving based at least in part on a first signal that is generate, transmitted, or received by the electronic device; in response to the determination, transmitting a request signal for authentication and displaying, via the display, first information associated with an application for driving; receiving, while displaying the first information, a response signal for the authentication including identification of the external electronic device from the external electronic device; in response to the reception of the response signal, displaying second information associated with the application and generating a connection between the external electronic device and the electronic device, based at least in part on the identification information of the external electronic device; and transferring the portion of the right to the external electronic device by transmitting, to the external electronic device, a second signal for controlling at least one function provided via the second information in the external electronic device. For example, the method may further include: receiving, based at least in part on the second signal, a third signal transmitted via the connection from the external electronic device; and displaying, via the display, third information changed from the second information, based on the third signal. For example, a first communication scheme used for the transmission of the request signal for the authentication and the reception of the response signal for the authentication may be different from a second communication scheme used for the reception of the second signal and the third signal. For example, the first information includes one or more of text and an image for providing guidance for the authentication, and the second information includes one or more of text and an image for providing a navigation service. For example, the second signal is further used for controlling one or more functions of another application distinct from the application in the external electronic device, and the method may include: receiving a fourth signal via the other application from another external electronic device; identifying that the fourth signal is associated with at least a portion of the one or more functions; and transmitting, to the external electronic device via the connection, a signal including information associated with the fourth signal, in response to the identification. For example, each of the transmission of the request signal for the authentication and the reception of the response signal for the authentication is performed via near field communication (NFC) or magnetic secure transmission (MST).

A method of an electronic device according to various embodiments may include: receiving, from a first external electronic device functionally connected to the electronic device, a request associated with transferring a portion of the right to control the electronic device by the electronic device to a second external electronic device functionally connected to the first external electronic device; transferring, if the electronic device is performing a function associated with driving, the portion of the right to the second external electronic device, based at least on the request; and restricting transferring, if the electronic device is performing a function not associated with driving, the portion of the right to the second external electronic device, based at least on the request.

A method of an electronic device according to various embodiments may include: determining that the state of the electronic device is associated with driving, based at least in part on a first signal generated, transmitted, or received by the electronic device; in response to the determination, transmitting a request signal for authentication and displaying first information associated with an application for driving; receiving, from another electronic device, a response signal for authentication including identification information of the other electronic device while displaying the first information; in response to the reception of the response signal, displaying second information associated with the application and generating a connection between the other electronic device and the electronic device, based at least in part on the identification information of the other electronic device; and transmitting, to the other electronic device via the connection, a second signal for controlling at least one function provided via the second information in the other electronic device.

According to various example embodiments, the method may further include: receiving, based at least in part on the second signal, a third signal transmitted via the connection from the other electronic device; and displaying third information changed from the second information, based on the third signal. A first communication scheme used for the transmission of the request signal for the authentication and the reception of the response signal for the authentication may be different from a second communication scheme used for the reception of the second signal and the third signal.

According to various example embodiments, the first information includes one or more of text and an image for providing guidance for the authentication, and the second information includes one or more of text and an image for providing a navigation service.

According to various example embodiments, the second signal is further used for controlling one or more functions of another application distinct from the application in the other electronic device, and the method may include: receiving a fourth signal via the other application from an external electronic device; identifying that the fourth signal is associated with at least a portion of the one or more functions; and transmitting, to the other electronic device via the connection, a signal including information associated with the fourth signal, in response to the identification.

According to various example embodiments, the operation of determining that the state of the electronic device is associated with driving may include: receiving the first signal from an external electronic device that is embedded in the vehicle or attachable to the vehicle; and in response to the reception of the signal, determining that the state of the electronic device is associated with driving. The first signal is received from the other external electronic device so as to provide power to the battery of the electronic device, and includes information for identifying the vehicle or the external electronic device. The external electronic device may be a beacon device that periodically transmits the first signal when power is provided to the external electronic device, and the operation of determining that the state of the electronic device is associated with driving may include: determining, based on identification information of the beacon device included in the first signal, that the electronic device is located within the vehicle; and determining, based on determining that the electronic device is located within the vehicle, that the state of the electronic device is associated with driving.

According to various example embodiments, the operation of determining that the state of the electronic device is associated with driving may include: transmitting the first signal for releasing door lock of the vehicle toward the vehicle; and in response to the transmission of the first signal, determining that the state of the electronic device is associated with driving.

According to various example embodiments, the operation of determining that the state of the electronic device is associated with driving may include: generating the first signal indicating the movement velocity of the electronic device using one or more sensors of the electronic device; and in response to identifying that the movement velocity is higher than or equal to a reference velocity, determining that the state of the electronic device is associated with driving.

According to various example embodiments, the first signal is received from an external electronic device that includes at least one sensor and is embedded in the vehicle or attachable to the vehicle, and includes identification information of the external electronic device, and the method may further include: generating another connection between the external electronic device and the electronic device, based at least in part on the identification information of the external electronic device; transmitting, to the external electronic device via the other connection, a third signal requesting first data obtained via the at least one sensor; receiving, from the external electronic device via the other connection, a fourth signal including the first data obtained via the at least one sensor; determining the state of movement of the vehicle, based at least in part on the first data and second data obtained via one or more sensors of the electronic device; and transmitting, to another external electronic device, information associated with the state of the movement of the vehicle. The method may further include: identifying whether the state of movement of the vehicle corresponds to a designated state; and transmitting information associated with the state of movement of the vehicle to the other external electronic device in response to identifying that the state of movement of the vehicle corresponds to the designated state. The operation of transmitting the information associated with the state of movement of the vehicle may include: in response to identifying that a difference between the first data and the second data falls outside a designated range, identifying that the state of the movement of the vehicle corresponds to the designated state; and transmitting, to the other external electronic device, the information associated with the state of the movement of the vehicle that includes data indicating that an accident associated with the vehicle occurs, in response to identifying that the state of the movement of the vehicle corresponds to the designated state.

According to various example embodiments, the method may further include: determining that the state of the electronic device associated with driving is changed, based at least in part on the first signal, after transmitting the second signal to the other electronic device; and in response to the determination that the state of the electronic device associated with driving is changed, transmitting, to the other electronic device, a third signal for ceasing that the at least one function is controlled in the other electronic device; and releasing the connection.

According to various example embodiments, each of the transmission of the request signal for the authentication and the reception of the response signal for the authentication is performed via near field communication (NFC) or magnetic secure transmission (MST).

A method of an electronic device according to various embodiments may include: receiving a request signal for authentication transmitted from another electronic device in response to determination that the state of the other electronic device is associated with driving; transmitting, to the other electronic device, a response signal for authentication including identification information of the electronic device; generating a connection between the electronic device and the other electronic device, based at least in part on the identification information of the electronic device; receiving, from the other electronic device via the connection, a signal for enabling the electronic device to control at least one function interoperating with first information associated with an application for driving, which is displayed in the other electronic device; in response to the reception of the signal for controlling the at least one function, displaying second information corresponding to the first information; in response to the detection of at least one input on the second information, transmitting the information associated with the at least one input to the other electronic device, based at least in part on the signal for controlling the at least one function, so as to display third information changed from the first information in the other electronic device, and displaying fourth information which is changed from the second information and corresponds to the third information.

According to various example embodiments, each of the first information, the second information, the third information, and the fourth information may include one or more of text and an image for providing a navigation service. The operation of displaying the second information may include displaying a virtual keypad superimposed on the second information. The operation of transmitting the information associated with the at least one input and displaying the fourth information may include: in response to detection of the at least one input on the virtual keypad, transmitting, to the other electronic device, the information associated with the at least one input, based at least in part on a signal for controlling the at least one input so as to display the third information changed from the first information in the other electronic device; and displaying the fourth information which is changed from the second information and corresponds to the third information.

According to various example embodiments, the signal for controlling the at least one function may be further used for controlling one or more functions of another application distinct from the application in the electronic device, and the method may further include: in response to identifying that another signal received by the other electronic device via the other application from an external electronic device is associated with at least a portion of the one or more functions, receiving a signal including information associated with the other signal transmitted from the other electronic device.

According to various example embodiments, the method may further include: receiving a signal for ceasing that the at least one function is controlled in the electronic device from the other electronic device via the connection, and the signal for ceasing that the at least one function is controlled may be transmitted from the other electronic device in response to the fact that the state of the other electronic device associated with driving is changed.

According to various example embodiments, each of the reception of the request signal for the authentication and the transmission of the response signal for the authentication is performed via near field communication (NFC) or magnetic secure transmission (MST).

Methods stated in claims and/or specifications according to various embodiments may be implemented by hardware, software, or any combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the present disclosure as defined by the appended claims and/or disclosed herein.

The programs (software modules or software) may be stored in non-volatile memories including a random access memory and a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs), or other type optical storage devices, or a magnetic cassette. Any combination of some or all of the may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described example embodiments of the present disclosure, a component included in the present disclosure is expressed in the singular or the plural according to a presented detailed embodiment. However, the singular form or plural form is selected for convenience of description suitable for the presented situation, and various embodiments of the present disclosure are not limited to a single element or multiple elements thereof. Further, either multiple elements expressed in the description may be configured into a single element or a single element in the description may be configured into multiple elements.

While the present disclosure has been illustrated and described with reference to certain embodiments thereof, it will be understood by those skilled in the art that various changes in form and details may be made therein without departing from the scope of the present disclosure. Therefore, the scope of the present disclosure should not be defined as being limited to the embodiments, but should be defined by the appended claims and equivalents thereof.

What is claimed is:

1. An electronic device, comprising:
    a communication module comprising communication circuitry; and
    a processor configured to:
    receive, from an external electronic device functionally connected with the electronic device, a request associated with transferring a portion of one or more rights capable of controlling the electronic device, via the communication module;
    in response to the request, cause to transfer the portion of the one or more rights to the external electronic device if it is determined that the electronic device is performing a function associated with a driving; and
    in response to the request, restrict transferring the portion of the one or more rights to the external electronic device if it is determined that the electronic device is performing a function not associated with the driving.

2. The electronic device of claim 1, wherein the processor is further configured to:
    receive, from another external electronic device embedded in a vehicle or attachable to the vehicle, a first signal; and
    determine, based at least on receiving the first signal, whether the electronic device is performing the function associated with the driving.

3. The electronic device of claim 2, wherein the first signal received from the another external electronic device is configured to provide power to the electronic device, and includes information associated with the vehicle and/or the another external electronic device.

4. The electronic device of claim 2, wherein the another external electronic device comprises a beacon device comprising beacon circuitry configured to transmit the first signal based on a designated periodicity if power is provided from the another external electronic device to the electronic device, and
    wherein the processor is further configured to:
    determine, based on identification information of the beacon device included in the first signal, whether the electronic device is located within the vehicle; and
    determine, based on determining that the electronic device is located within the vehicle, whether the electronic device is performing the function associated with the driving.

5. The electronic device of claim 1, wherein the processor is further configured to:
    cause to be transmitted, toward a vehicle, a first signal for releasing a door lock of the vehicle; and determine, based on transmission of the first signal, whether the electronic device is performing the function associated with the driving.

6. The electronic device of claim 1, further comprising:
one or more sensors,
wherein the processor is further configured to:
determine movement velocity of the electronic device via the one or more sensors;
generate a first signal associated with the movement velocity; and
determine that the electronic device is performing the function associated with the driving if the movement velocity is greater than or equal to a designated value.

7. The electronic device of claim 1, wherein the processor is further configured to:
receive, from another external electronic device comprising at least one sensor, a first signal associated with identification information of the another external electronic device, the another external electronic device embedded in a vehicle and/or attachable to the vehicle;
generate a connection between the another external electronic device and the electronic device, based at least on the identification information of the another external electronic device;
cause to be transmitted, to the another external electronic device through the connection, a second signal requesting first data obtained via the at least one sensor;
receive, from the another external electronic device through the connection, a third signal including the first data obtained via the at least one sensor;
determine a state of movement of the vehicle, based at least on the first data and/or second data obtained via one or more sensors of the electronic device; and
cause to be transmitted, to another electronic device, information associated with the state of the movement of the vehicle.

8. The electronic device of claim 7, wherein the processor is further configured to:
determine whether the state of the movement of the vehicle corresponds to a designated state; and
cause to be transmitted, if determining that the state of the movement of the vehicle corresponds to the designated state, the information associated with the state of the movement of the vehicle to the another electronic device.

9. The electronic device of claim 8, wherein the processor is further configured to:
determine that the state of the movement of the vehicle corresponds to the designated state if it is determined that a difference between the first data and the second data is outside a designated range; and
cause to be transmitted, to the another electronic device, the information associated with the state of the movement of the vehicle that includes data indicating that an accident associated with the vehicle occurs, if it is determined that the state of the movement of the vehicle corresponds to the designated state.

10. The electronic device of claim 1, wherein the processor is further configured to:
determine whether the electronic device performs the function associated with the driving; and
restrict transferring the portion of the one or more rights to the external electronic device if it is determined that the electronic device does not perform the function associated with the driving.

11. The electronic device of claim 1, further comprising:
a display,
wherein the processor is further configured to:
determine, based at least on a first signal, that the electronic device is performing the function associated with the driving;
cause to be transmitted, in response to the determination, a request signal for authentication and display, through the display, first information and second information associated with an application for driving;
receive, while displaying the first information, a response signal for the authentication including identification of the external electronic device from the external electronic device;
generate a connection between the external electronic device and the electronic device, based at least on the identification information of the external electronic device, in response to receiving the response signal; and
cause to transfer, by transmitting a second signal for controlling at least one function provided through the second information in the external electronic device to the external electronic device, the portion of the one or more rights to the external electronic device.

12. The electronic device of claim 11, wherein the processor is further configured to:
receive, based at least on the second signal, a third signal transmitted from the external electronic device; and
cause to display, through the display, third information different from the second information, based on the third signal.

13. The electronic device of claim 12, wherein a first communication scheme used for the transmission of the request signal for the authentication and the reception of the response signal for the authentication is at least partially distinct from a second communication scheme used for the reception of the second signal and the third signal.

14. The electronic device of claim 11, wherein the first information includes one or more of: a text and an image for providing guidance for the authentication, and
wherein the second information includes one or more of: a text and an image for providing a navigation service.

15. The electronic device of claim 11, wherein the electronic device is configured to use the second signal for controlling one or more functions of another application distinct from the application in the external electronic device, and
wherein the processor is further configured to:
receive a fourth signal through the another application from another external electronic device;
determine that the fourth signal is associated with at least a portion of the one or more functions; and
cause to transmit, to the external electronic device through the connection, a signal including information regarding the fourth signal, in response to determining that the fourth signal is associated with at least the portion of the one or more functions.

16. The electronic device of claim 11, wherein the electronic device is configured to perform each of the transmission of the request signal for the authentication and the reception of the response signal for the authentication through near field communication (NFC) and/or magnetic secure transmission (MST).

17. An electronic device comprising:
a communication module comprising communication circuitry; and
a processor configured to:
receive, from a first external electronic device functionally connected to the electronic device, a request associated with transferring a portion of a right capable of controlling the electronic device using the first external electronic device to a second external electronic device functionally connected to the first external electronic device;

in response to the request, cause to transfer, if the electronic device is performing a function associated with driving, the portion of the right to the second external electronic device; and in response to the request, restrict transferring, if the electronic device is performing a function not associated with the driving, the portion of the right to the second external electronic device.

18. An electronic device comprising:

a memory for storing instructions;

a communication interface comprising communication circuitry;

a display; and one or more processors operably coupled to the communication interface, the memory and the display, the one or more processor configured to execute the stored instructions to cause the electronic device to:

receive a request signal for authentication transmitted from another electronic device in response to determining that a state of the another electronic device is associated with driving;

transmit, to the another electronic device, a response signal for the authentication including identification information of the electronic device;

generate a connection between the electronic device and the another electronic device, based at least in part on the identification information of the electronic device;

receive, from the another electronic device through the connection, a signal for controlling at least one function that is associated with first information, wherein the first information is associated with an application for driving and is being displayed in the another electronic device;

display second information corresponding to the first information, in response to receiving the signal for controlling the at least one function; and in response to detecting at least one input on the second information:

transmit, to the another electronic device, information regarding the at least one input, based at least in part on a signal for controlling the at least one function to display third information different from the first information in the another electronic device, and display fourth information, which is different from the second information and corresponds to the third information.

19. The electronic device of claim 18, wherein each of the first information, the second information, the third information, and the fourth information includes one or more of: an image and/or a text for providing a navigation service, and wherein one or more processors are configured to execute the stored instructions to cause the electronic device to:

display a virtual keypad superimposed on the second information; and in response to detecting the at least one input on the virtual keypad:

transmit, to the another electronic device, the information regarding the at least one input based at least in part on the signal for controlling the at least one function to display the third information different from the first information in the another electronic device; and display the fourth information which is different from the second information and corresponds to the third information.

20. The electronic device of claim 18, wherein the electronic device is configured to use the signal for controlling the at least one function for controlling one or more functions of another application distinct from the application in the electronic device, and wherein the one or more processors are configured to execute the stored instructions to cause the electronic device to receive, in response to determining that another signal received at the another electronic device through the another application from an external electronic device is associated with at least a portion of the one or more functions, a signal including information regarding the another signal transmitted from the another electronic device.

* * * * *